(12) United States Patent
Wexler et al.

(10) Patent No.: US 11,006,162 B2
(45) Date of Patent: May 11, 2021

(54) SYSTEMS AND METHODS FOR ANALYZING INFORMATION COLLECTED BY WEARABLE SYSTEMS

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days.

(21) Appl. No.: 15/253,547

(22) Filed: Aug. 31, 2016

(65) Prior Publication Data

US 2017/0061213 A1    Mar. 2, 2017

Related U.S. Application Data

(60) Provisional application No. 62/211,880, filed on Aug. 31, 2015, provisional application No. 62/214,323, (Continued)

(51) Int. Cl.
*H04N 21/2668* (2011.01)
*G06K 9/00* (2006.01)
(Continued)

(52) U.S. Cl.
CPC ......... *H04N 21/2668* (2013.01); *G06F 1/163* (2013.01); *G06F 16/9535* (2019.01);
(Continued)

(58) Field of Classification Search
None
See application file for complete search history.

(56) References Cited

U.S. PATENT DOCUMENTS

2002/0178085 A1* 11/2002 Sorensen ............... G06Q 30/02
705/7.29
2004/0111454 A1*  6/2004 Sorensen ............... G06Q 30/02
708/200
(Continued)

OTHER PUBLICATIONS

Mathy Vanhoef et al., "Why MAC Address Randomization is not Enough: An Analysis of Wi-Fi Network Discovery Mechanisms," Asia CCS '16, May 30-Jun. 3, Xi'an, China (12 pages).

*Primary Examiner* — David Perlman
(74) *Attorney, Agent, or Firm* — Finnegan, Henderson, Farabow, Garrett & Dunner, LLP

(57) ABSTRACT

A system is provided for analyzing information collected by a plurality of wearable camera systems. In one implementation, the system may include a memory storing executable instructions and at least one processing device. The at least one processing device may be programmed to execute the instructions to receive information derived from image data captured by the wearable camera systems; analyze the derived information to identify a commonality related to the image data captured by at least two of the wearable camera systems; determine, based on the commonality, statistical data related to users of the at least two of the wearable camera systems; and select, based on the statistical data, at least one content item for at least one of the users of the wearable camera systems who share the commonality.

20 Claims, 55 Drawing Sheets

Related U.S. Application Data filed on Sep. 4, 2015, provisional application No. 62/214,330, filed on Sep. 4, 2015, provisional application No. 62/214,334, filed on Sep. 4, 2015, provisional application No. 62/214,342, filed on Sep. 4, 2015, provisional application No. 62/275,531, filed on Jan. 6, 2016.

(51) Int. Cl.

| | | |
|---|---|---|
| *H04N 7/18* | (2006.01) | |
| *H04N 21/4223* | (2011.01) | |
| *H04N 21/422* | (2011.01) | |
| *H04N 21/442* | (2011.01) | |
| *G06F 16/9535* | (2019.01) | |
| *H04N 5/232* | (2006.01) | |
| *G06F 1/16* | (2006.01) | |
| *G06K 9/46* | (2006.01) | |
| *G06Q 30/02* | (2012.01) | |
| *H04L 29/08* | (2006.01) | |
| *H04N 5/247* | (2006.01) | |
| *G06T 7/11* | (2017.01) | |
| *G10L 15/30* | (2013.01) | |

(52) U.S. Cl.
CPC ..... *G06K 9/00255* (2013.01); *G06K 9/00288* (2013.01); *G06K 9/00308* (2013.01); *G06K 9/00335* (2013.01); *G06K 9/00671* (2013.01); *G06K 9/00677* (2013.01); *G06K 9/00711* (2013.01); *G06K 9/00718* (2013.01); *G06K 9/4652* (2013.01); *G06Q 30/0201* (2013.01); *G06T 7/11* (2017.01); *H04L 67/306* (2013.01); *H04N 5/232* (2013.01); *H04N 5/23218* (2018.08); *H04N 5/23219* (2013.01); *H04N 5/247* (2013.01); *H04N 7/185* (2013.01); *H04N 21/4223* (2013.01); *H04N 21/42203* (2013.01); *H04N 21/44218* (2013.01); *G06K 2009/00738* (2013.01); *G06K 2209/01* (2013.01); *G06T 2207/30221* (2013.01); *G10L 15/30* (2013.01)

(56) References Cited

U.S. PATENT DOCUMENTS

| | | | |
|---|---|---|---|
| 2008/0243614 A1* | 10/2008 | Tu | G06Q 30/02 705/14.66 |
| 2008/0306756 A1* | 12/2008 | Sorensen | G06Q 30/02 705/27.1 |
| 2009/0271251 A1* | 10/2009 | Sorensen | G06Q 30/02 348/14.01 |
| 2011/0161163 A1* | 6/2011 | Carlson | G06Q 30/02 705/14.44 |
| 2012/0229909 A1* | 9/2012 | Clavin | G02B 27/017 359/630 |
| 2015/0128284 A1* | 5/2015 | LaFever | G06F 21/6254 726/26 |
| 2015/0309705 A1* | 10/2015 | Keeler | G06N 7/005 705/27.2 |
| 2015/0379238 A1* | 12/2015 | Connor | G06F 19/3475 702/19 |
| 2016/0165409 A1* | 6/2016 | Bulut | G06F 1/163 715/734 |
| 2016/0171514 A1* | 6/2016 | Frank | G06F 16/337 705/7.29 |

* cited by examiner

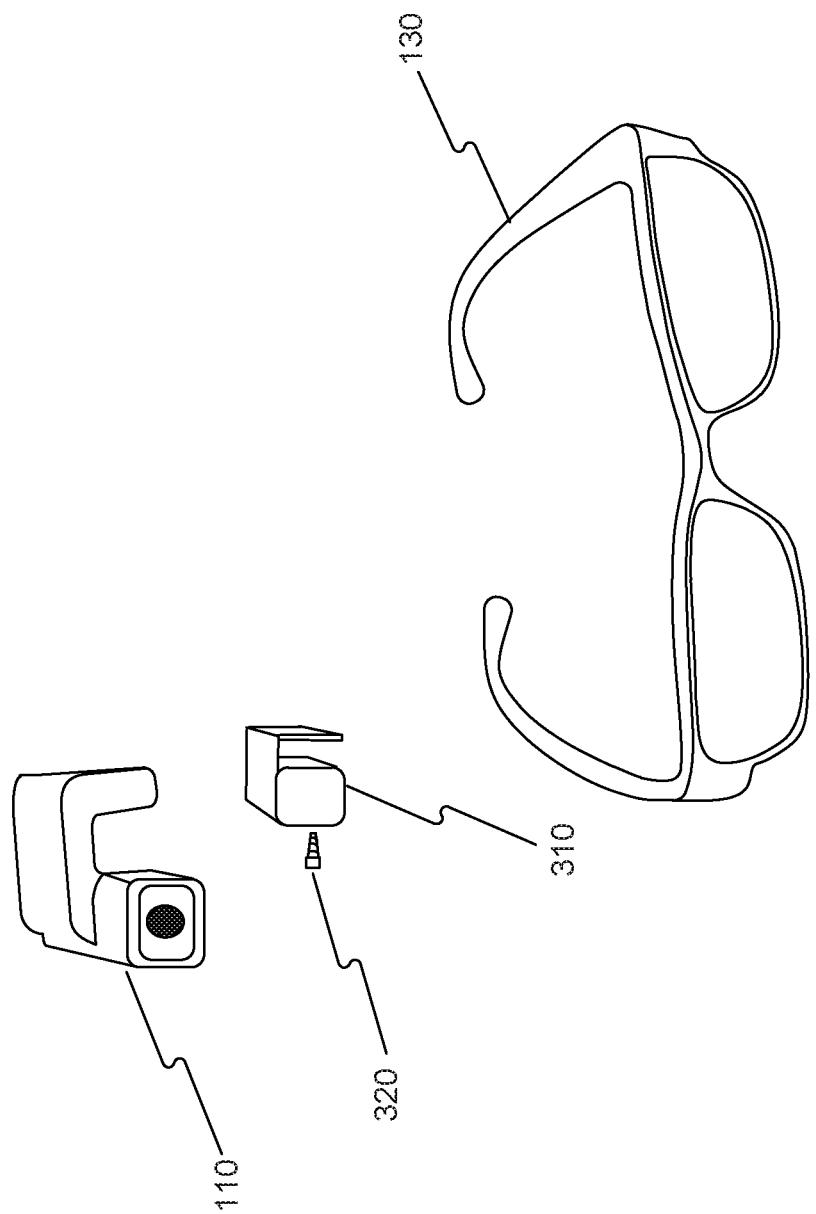

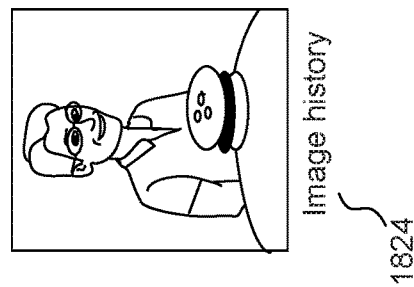
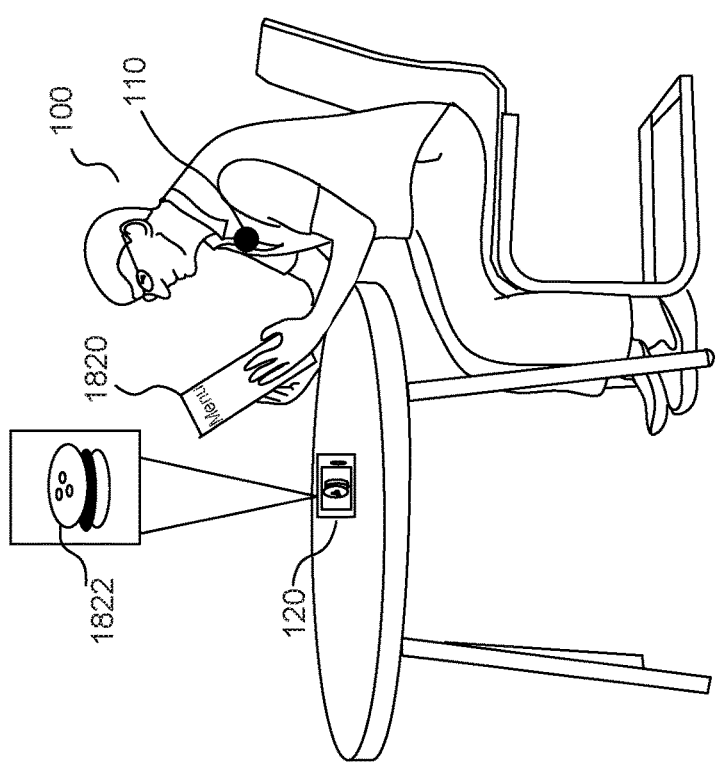
Fig. 18B

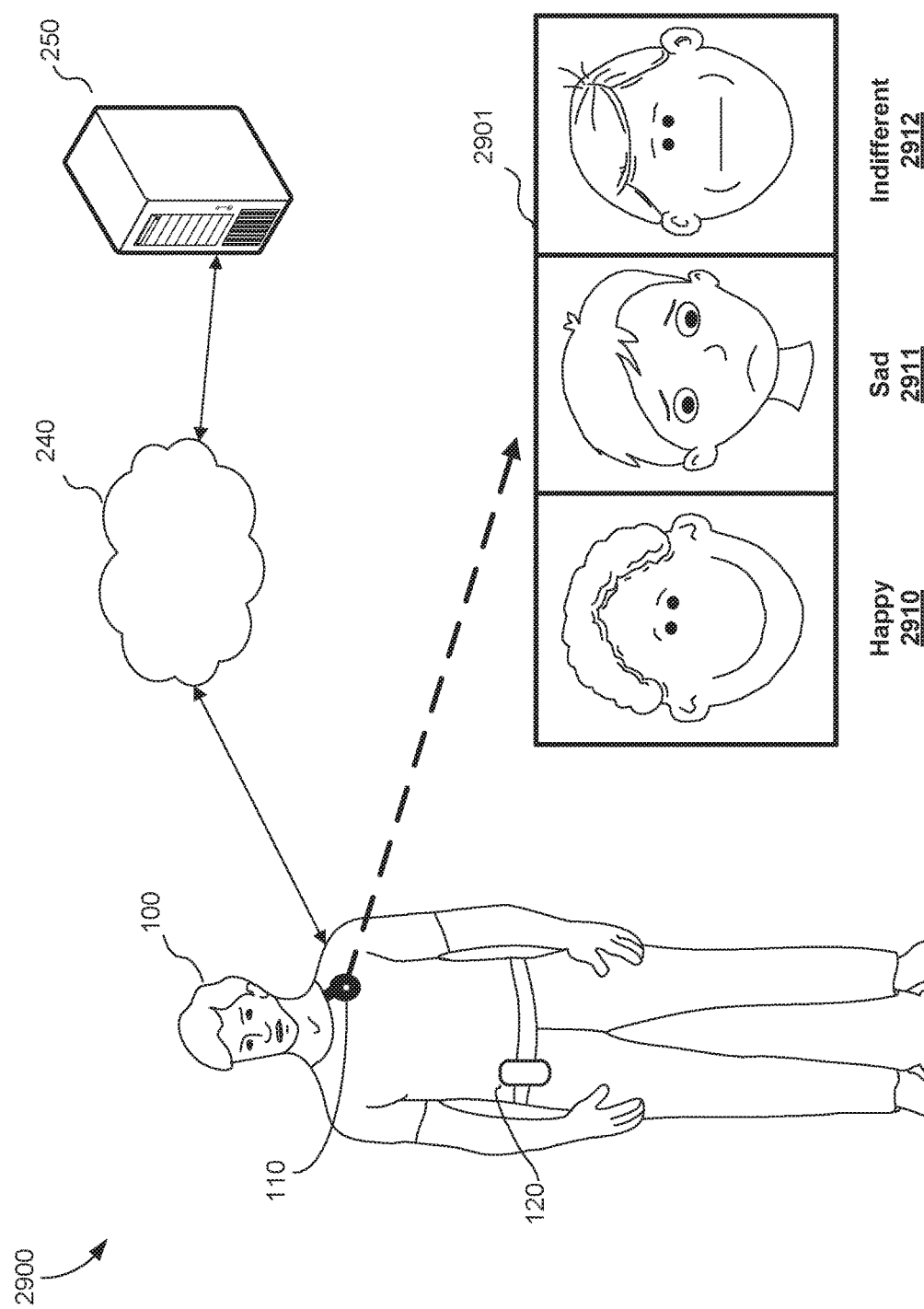

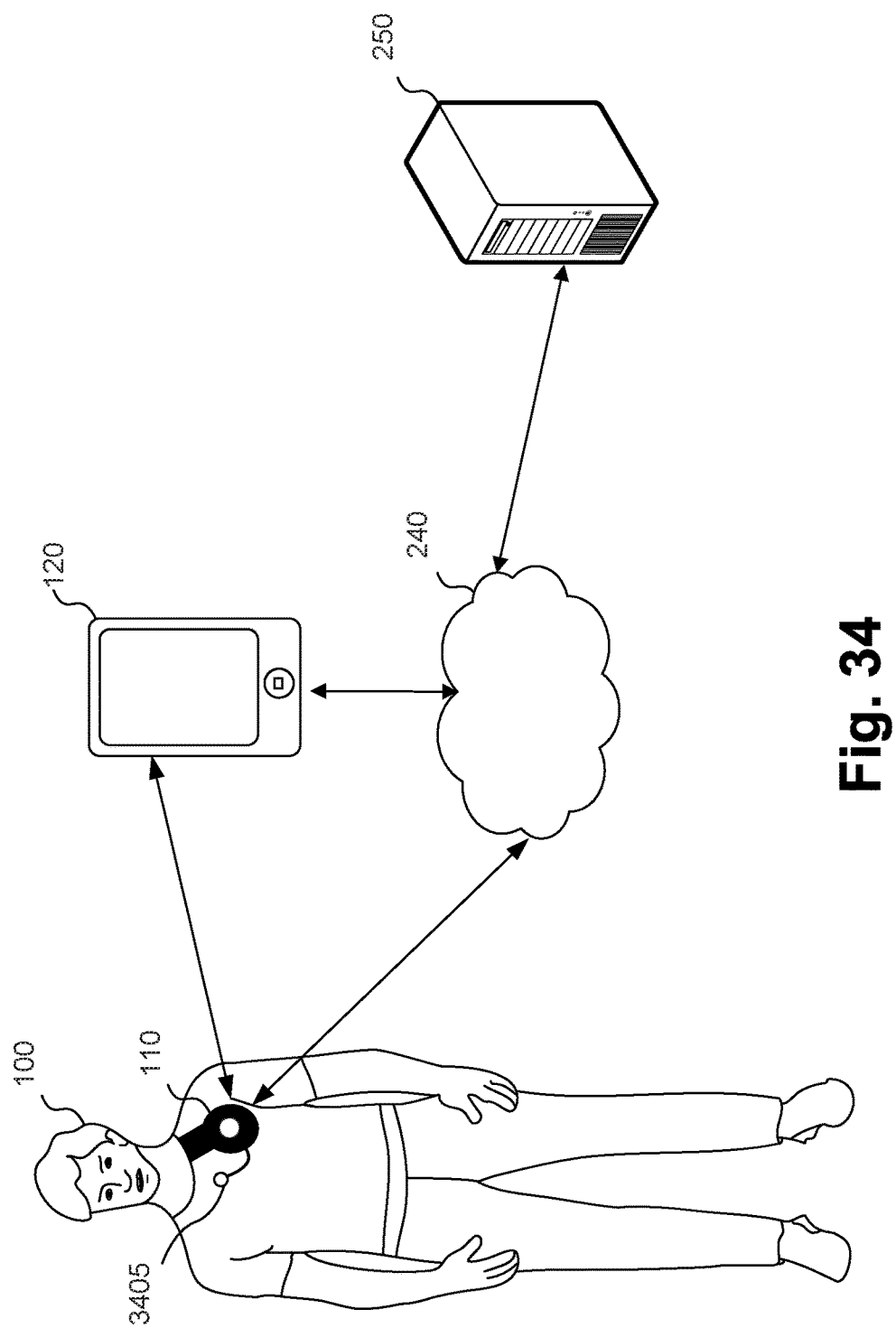

SYSTEMS AND METHODS FOR ANALYZING INFORMATION COLLECTED BY WEARABLE SYSTEMS

CROSS REFERENCES TO RELATED APPLICATIONS

This application claims the benefit of priority of U.S. Provisional Patent Application No. 62/211,880, filed Aug. 31, 2015; U.S. Provisional Patent Application No. 62/214,323, filed Sep. 4, 2015; U.S. Provisional Patent Application No. 62/214,330, filed Sep. 4, 2015; U.S. Provisional Patent Application No. 62/214,334, filed Sep. 4, 2015; U.S. Provisional Patent Application No. 62/214,342, filed Sep. 4, 2015; and U.S. Provisional Patent Application No. 62/275,531, filed Jan. 6, 2016. All of the foregoing applications are incorporated herein by reference in their entirety.

BACKGROUND

Technical Field

This disclosure generally relates to devices and methods for capturing and processing images from an environment of a user, and using information derived from captured images. More particularly, this disclosure relates to devices and methods for using a wearable device including a camera for capturing information related to the user's environment, and to systems for processing data received from the wearable device.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images to provide useful information to users of the apparatuses, and for systems and methods to process and leverage information gathered by the apparatuses.

SUMMARY

Embodiments consistent with the present disclosure provide devices and methods for automatically capturing and processing images from an environment of a user, and systems and methods for processing information related to images captured from the environment of the user.

In accordance with a disclosed embodiment, a system may select content for a user of a wearable apparatus based on the user's behavior. The system may include a memory storing executable instructions and at least one processing device programmed to execute the instructions. The at least one processing device may be programmed to execute the instructions to analyze a plurality of images captured by a wearable image sensor included in the wearable apparatus to identify one or more of the plurality of images that depict a behavior of the user. The at least one processing device may also be programmed to execute the instructions to determine, based on the analysis, information associated with the one or more images depicting the behavior of the user. The at least one processing device may be further programmed to execute the instructions to select, based on the information associated with the one or more images depicting the behavior of the user, at least one content item.

In accordance with a disclosed embodiment, a method may select content for a user of a wearable apparatus based on the user's behavior. The method may include analyzing a plurality of images captured by a wearable image sensor included in a wearable apparatus to identify one or more of the plurality of images that depict a behavior of the user. The method may also include determining, based on the analysis, information associated with the one or more images depicting the behavior of the user. The method may further include selecting, based on the information associated with the one or more images depicting the behavior of the user, at least one content item.

In accordance with a disclosed embodiment, a system may analyze information collected by a plurality of wearable camera systems. The system may include a memory storing executable instructions and at least one processing device programmed to execute the instructions. The at least one processing device may be programmed to execute the instructions to receive information derived from image data captured by the wearable camera systems. The at least one processing device may also be programmed to execute the instructions to analyze the derived information to identify a commonality related to the image data captured by at least two of the wearable camera systems. The at least one processing device may further be programmed to execute the instructions to determine, based on the commonality, statistical data related to users of the at least two of the wearable camera systems. In addition, the at least one processing device may be programmed to execute the instructions to select, based on the statistical data, at least one content item for at least one of the users of the wearable camera systems who share the commonality.

In accordance with a disclosed embodiment, a method may analyze information collected by a plurality of wearable camera systems. The method may include receiving information derived from image data captured by the wearable camera systems. The method may also include analyzing the derived information to identify a commonality related to the image data captured by at least two of the wearable camera systems. The method may further include determining, based on the commonality, statistical data related to users of the at least two of the wearable camera systems. In addition, the method may include selecting, based on the statistical data, at least one content item for at least one of the users of the wearable camera systems who share the commonality.

In accordance with a disclosed embodiment, a wearable apparatus for identifying exposure to a recognizable item includes a wearable image sensor configured to capture a plurality of images from an environment of a user of the wearable apparatus. At least one processing device is programmed to analyze the plurality of images to identify one or more of the plurality of images that include the recognizable item; determine, based on analysis of the one or more of the plurality of images that include the recognizable item, information associated with the recognizable information; and transmit, to an external device, the information associated with the recognizable item and information identifying the user of the wearable apparatus.

In accordance with a disclosed embodiment, a system for identifying exposure to recognizable items by a population of users of a plurality of wearable camera systems includes a memory storing executable instructions and at least one processing device programmed to execute the instructions to perform a series of steps. One step is to receive information associated with the recognizable item, the information having been derived from image data captured by the plurality of wearable camera systems. Another step is to analyze the information to determine an exposure level of the users to the recognizable item, wherein the exposure level represents an aggregated value of an exposure per unit time for a group of one or more users of the population of users of the plurality of wearable camera systems.

In accordance with a disclosed embodiment, a method for identifying exposure to recognizable item s by a population of users of a plurality of wearable camera systems includes receiving information associated with the recognizable item, the information having been derived from image data captured by the plurality of wearable camera systems. The method also includes analyzing the information to determine an exposure level of the users to the recognizable item, wherein the exposure level represents an aggregated value of an exposure per unit time for a group of one or more users of the population of users of the plurality of wearable camera systems.

In accordance with a disclosed embodiment, a wearable apparatus for monitoring activities includes a wearable image sensor configured to capture a plurality of images from an environment of a user of the wearable apparatus. The wearable apparatus also includes at least one processing device programmed to analyze the plurality of images to identify in one or more of the plurality of images at least one indicator of an activity and transmit, to an external device, the at least one indicator of the activity.

In accordance with a disclosed embodiment, a method for monitoring activities using a wearable apparatus includes obtaining a plurality of images from an environment of a user of the wearable apparatus and analyzing the plurality of images to identify in one or more of the plurality of images at least one indicator of the activity.

In accordance with a disclosed embodiment, a wearable apparatus determines an emotional environment of a user of the wearable apparatus. The wearable apparatus may include a wearable image sensor configured to capture one or more images from the environment of the user and at least one processing device. The at least one processing device may be programmed to analyze the one or more images in order to identify a facial expression of a person in the environment of the user. The wearable apparatus may also transmit information associated with the facial expression to an external device.

In accordance with a disclosed embodiment, a method determines an emotional environment of a user of a wearable apparatus. The method may include obtaining one or more images of at least a portion of an environment of the user and analyzing the one or more images to identify a facial expression of the person in the environment of the user.

In accordance with a disclosed embodiment, a wearable apparatus is provided for identifying a person in an environment of a user of the wearable apparatus based on non-facial information. The wearable apparatus includes a wearable image sensor configured to capture a plurality of images from the environment of the user. The wearable apparatus also includes a processing device programmed to analyze a first image of the plurality of images to determine that a face appears in the first image. The processing device is also programmed to analyze a second image of the plurality of images to identify an item of non-facial information appearing in the second image that was captured within a time period including a time when the first image was captured. The processing device is further programmed to determine identification information of a person associated with the face based on the item of non-facial information.

In accordance with a disclosed embodiment, a system is provided for identifying a person in an environment of a user of a wearable apparatus. The system includes a memory storing executable instructions. The system also includes a processing device programmed to execute the instructions to determine, based on information associated with the user, a plurality of persons who are scheduled to attend an event that the user is scheduled to attend. The processing device is also programmed to obtain image data captured by the wearable apparatus at a location associated with the event, wherein the image data includes a representation of a face. The processing device is also programmed to compare information derived from the image data with stored information associated with at least a subset of the plurality of persons. The processing device is further programmed to determine identification information of a person associated with the face based on the comparison.

In accordance with a disclosed embodiment, a method is provided for identifying a person in an environment of a user of a wearable apparatus based on non-facial information. The method includes obtaining a plurality of images captured from the environment of the user by a wearable image sensor included in the wearable apparatus. The method also includes analyzing a first image of the plurality of images to determine that a face appears in the first image. The method also includes analyzing a second image of the plurality of images to identify an item of non-facial information appearing in the second image that was captured within a time period including a time when the first image is captured. The method further includes determining identification information of a person associated with the face based on the item of non-facial information.

In accordance with a disclosed embodiment, a method is provided for identifying a person in an environment of a user of a wearable apparatus. The method includes determining, based on information associated with the user, a plurality of persons who are scheduled to attend an event that the user is scheduled to attend. The method also includes obtaining image data captured by the wearable apparatus at a location associated with the event, wherein the image data includes a representation of a face. The method also includes comparing information derived from the image data with stored information associated with at least a subset of the plurality of persons. The method further includes determining identification information of a person associated with the face based on the comparison.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 18B is a schematic illustration of another exemplary application of personalized content selection.

FIG. 29 is a schematic illustration of an example system consistent with the disclosed embodiments.

FIG. 34 illustrates exemplary connections between wearable apparatus and other devices.

DETAILED DESCRIPTION

Figure 1A:
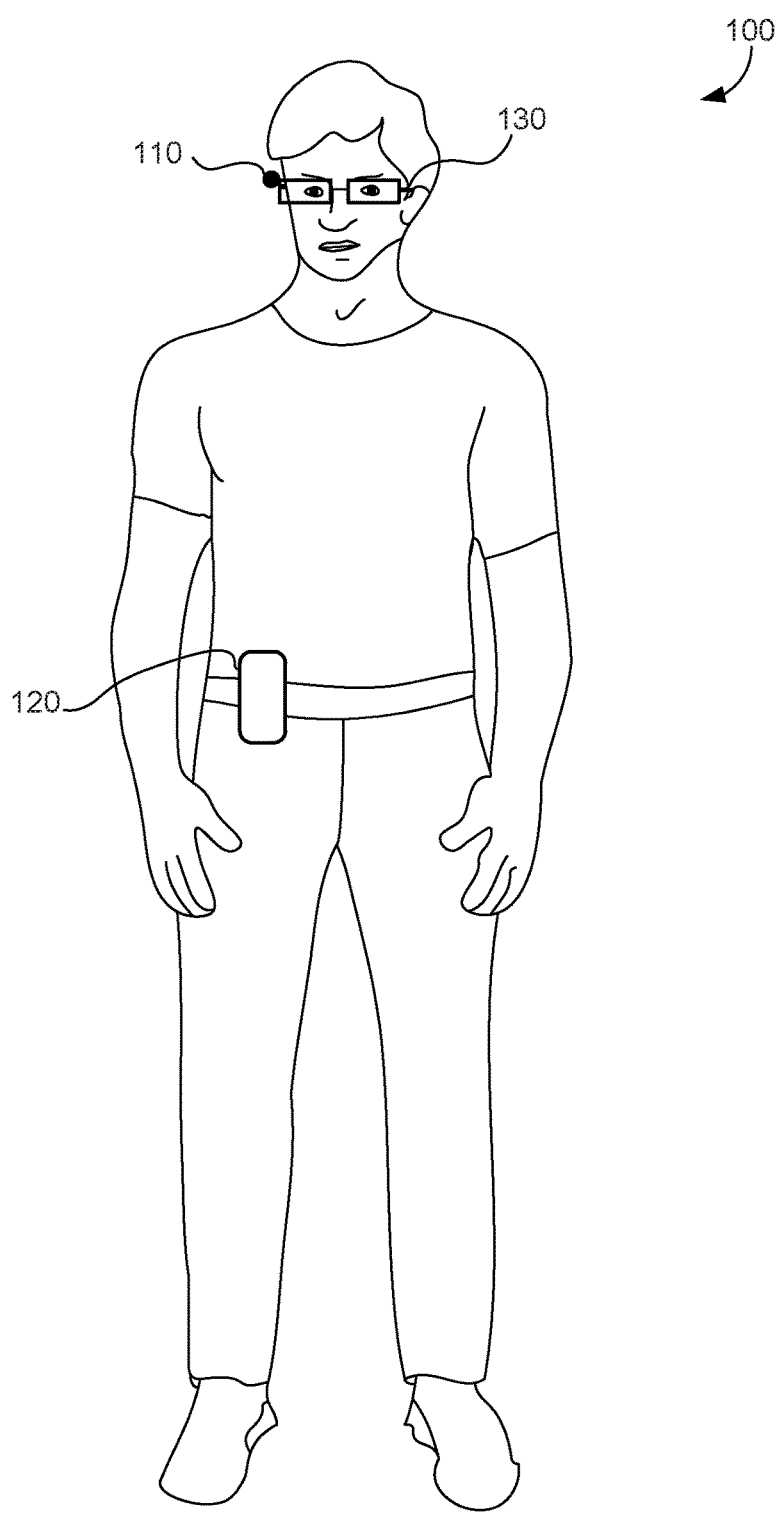
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
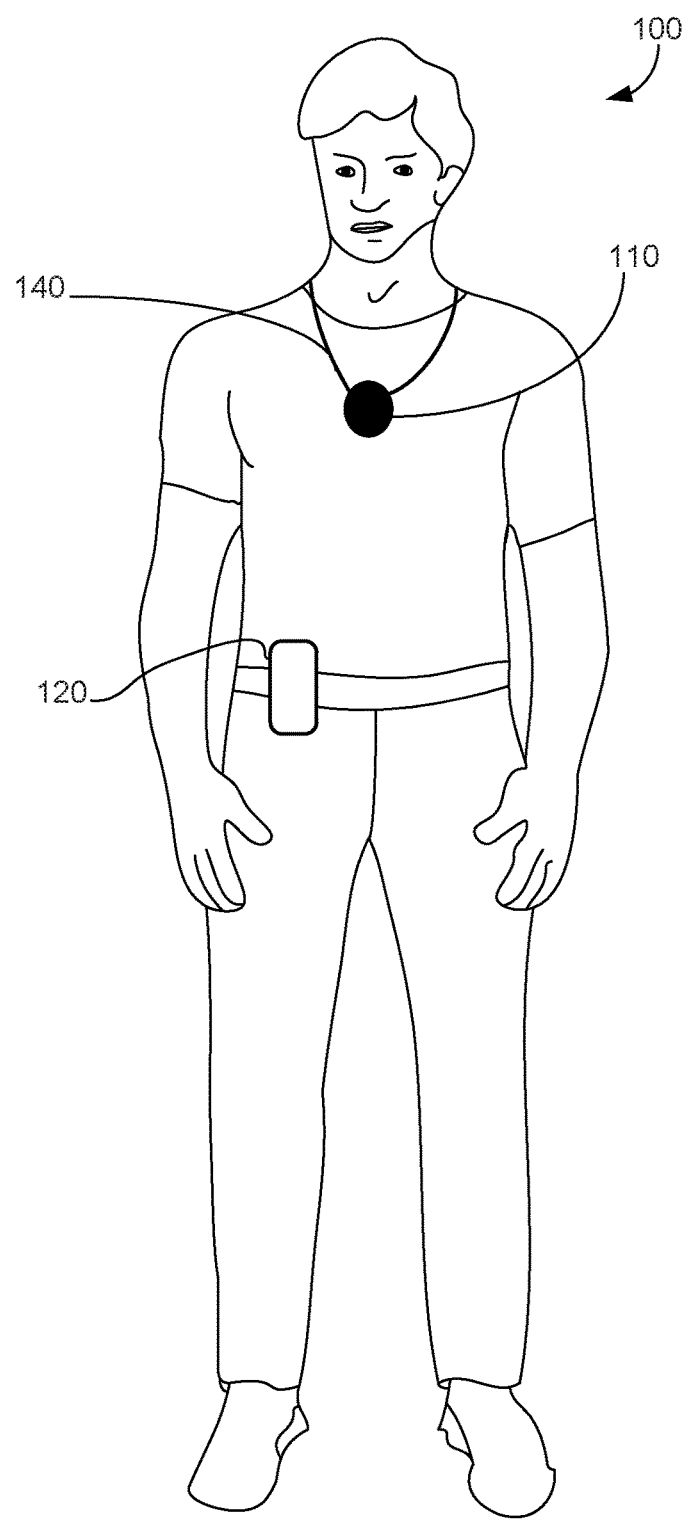
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
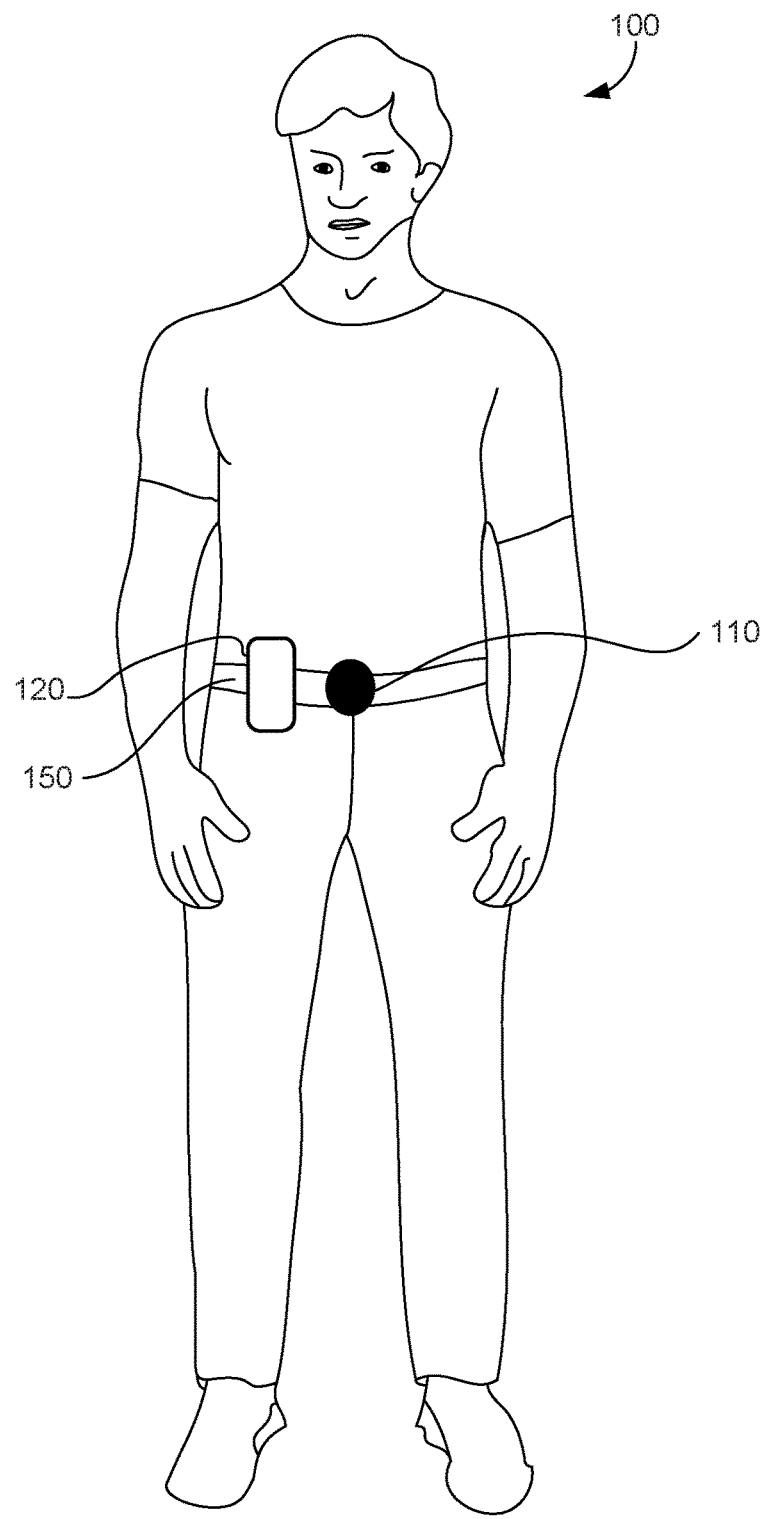
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
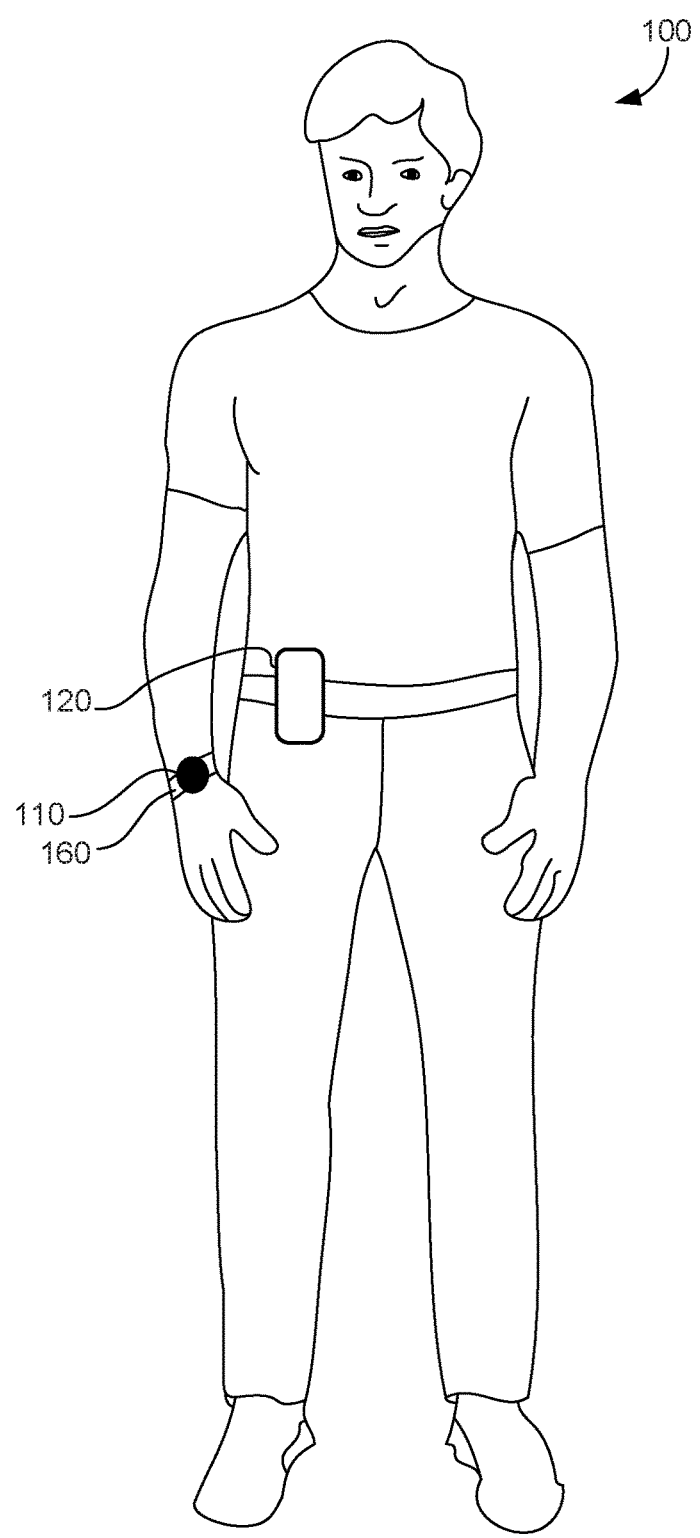
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
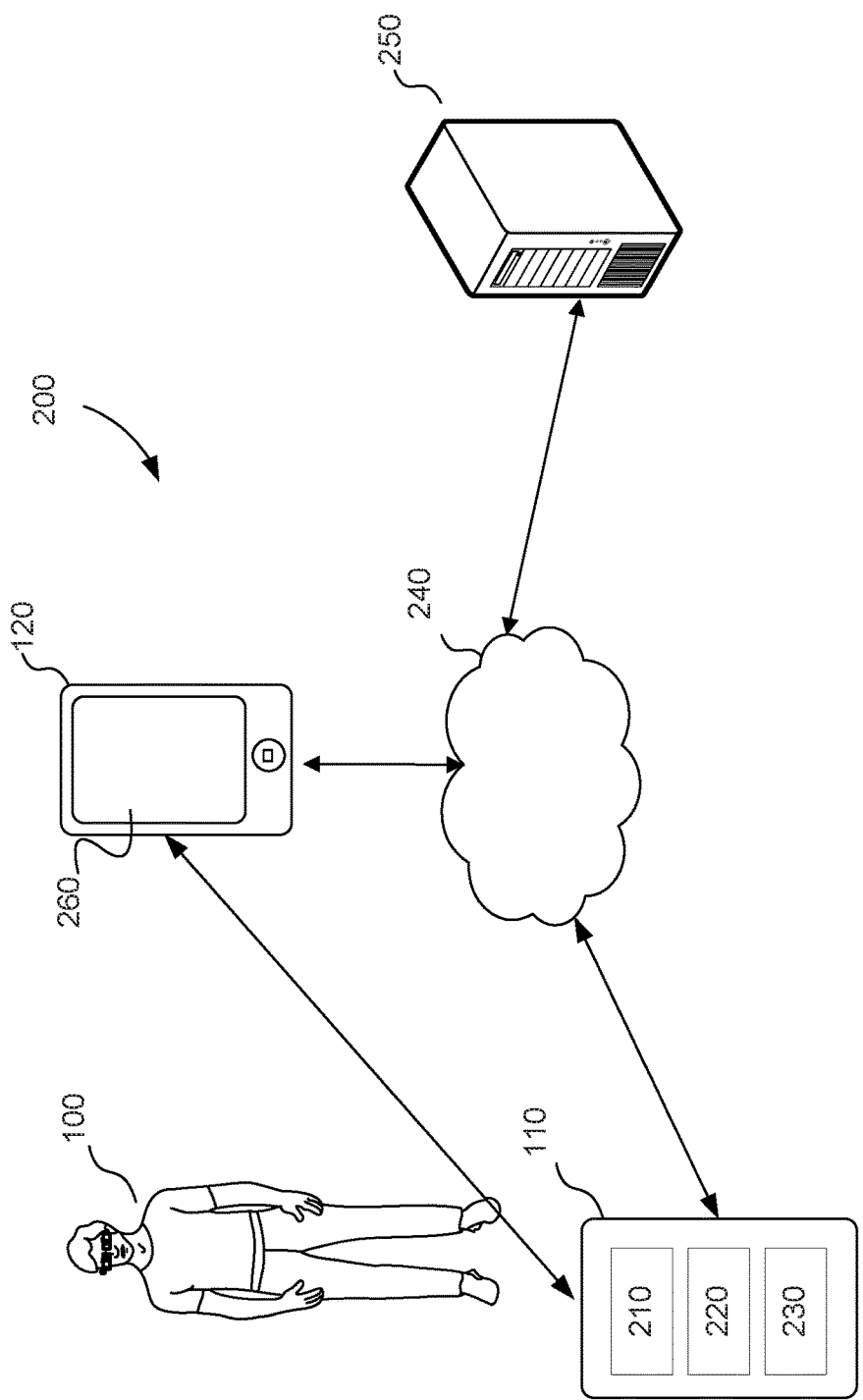
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
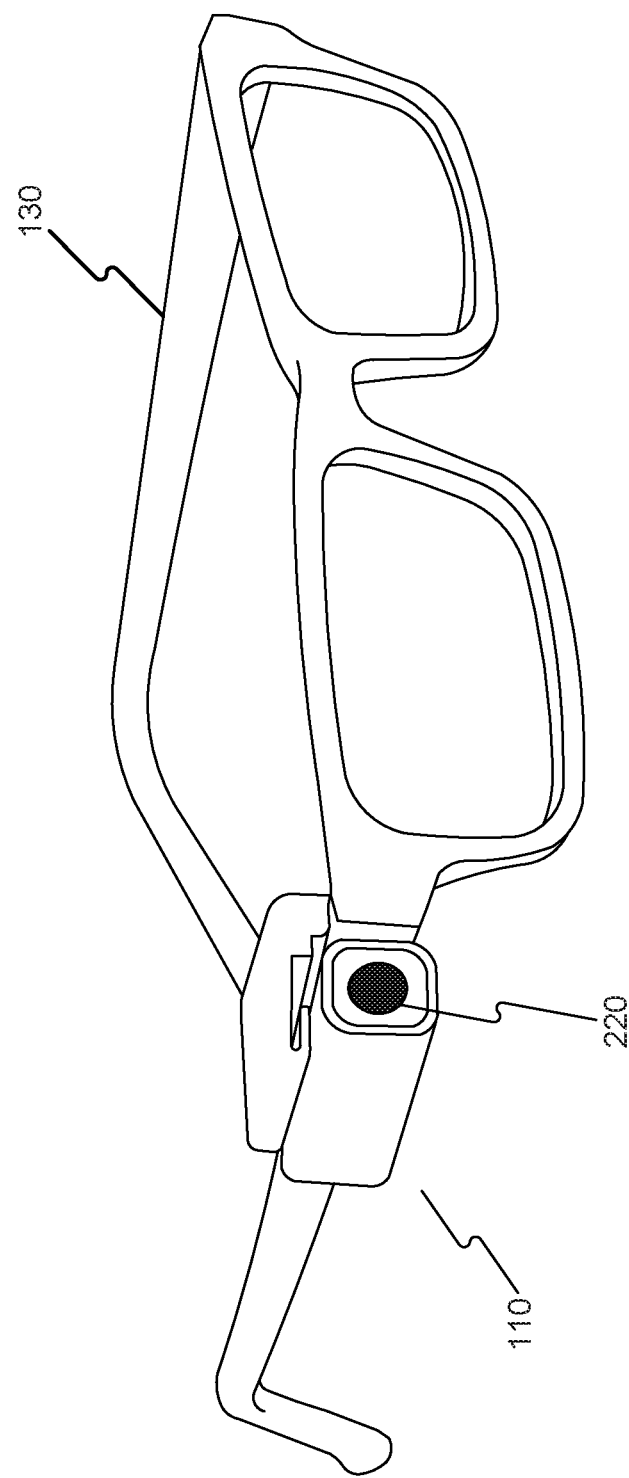
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
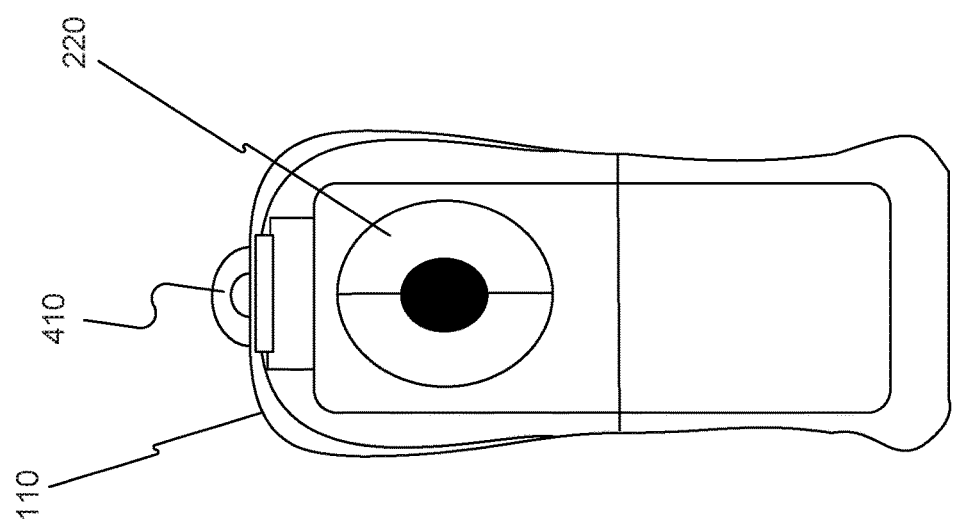
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
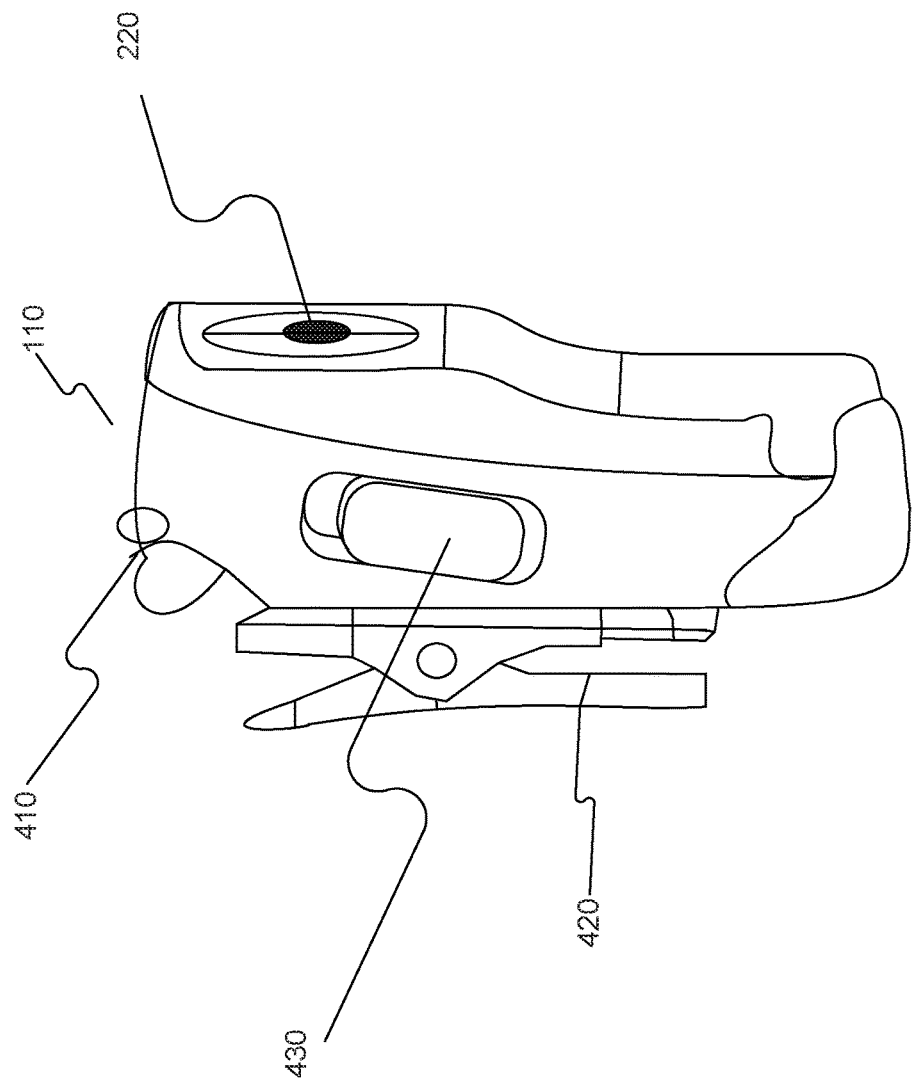
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
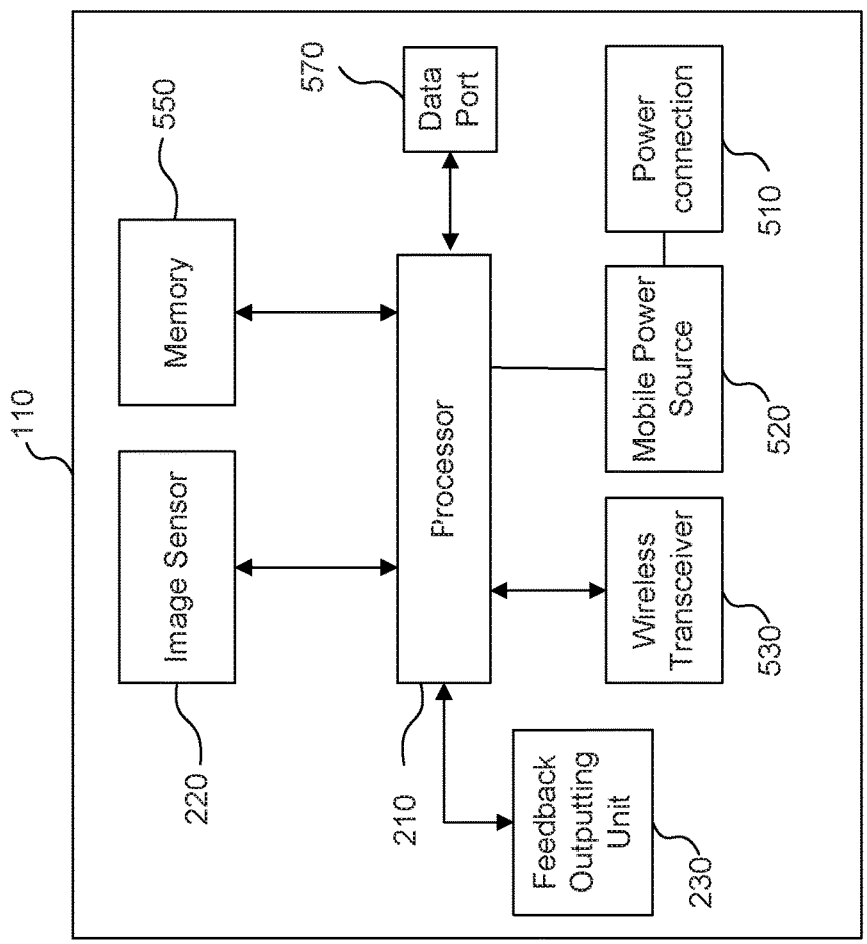
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
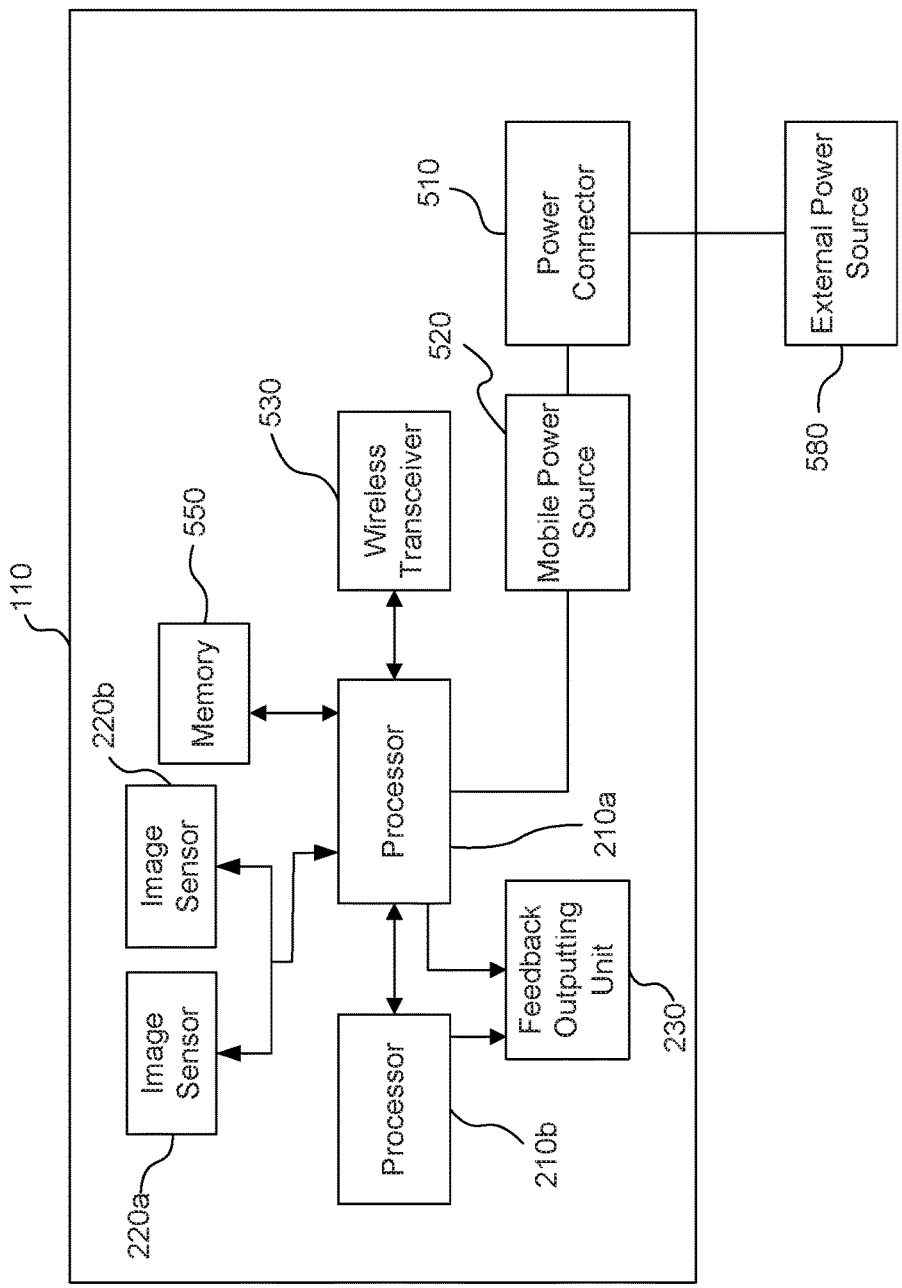
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
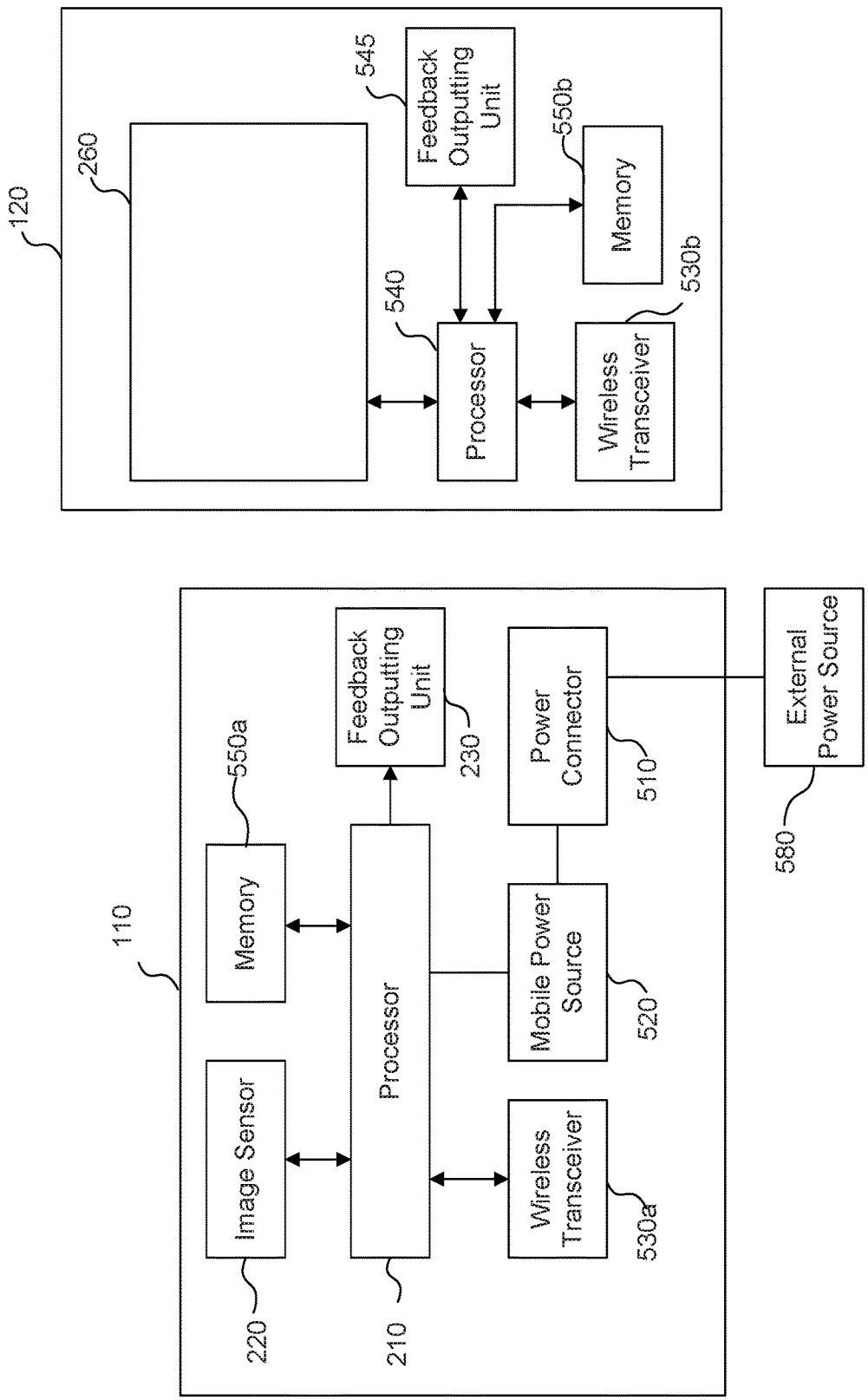
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
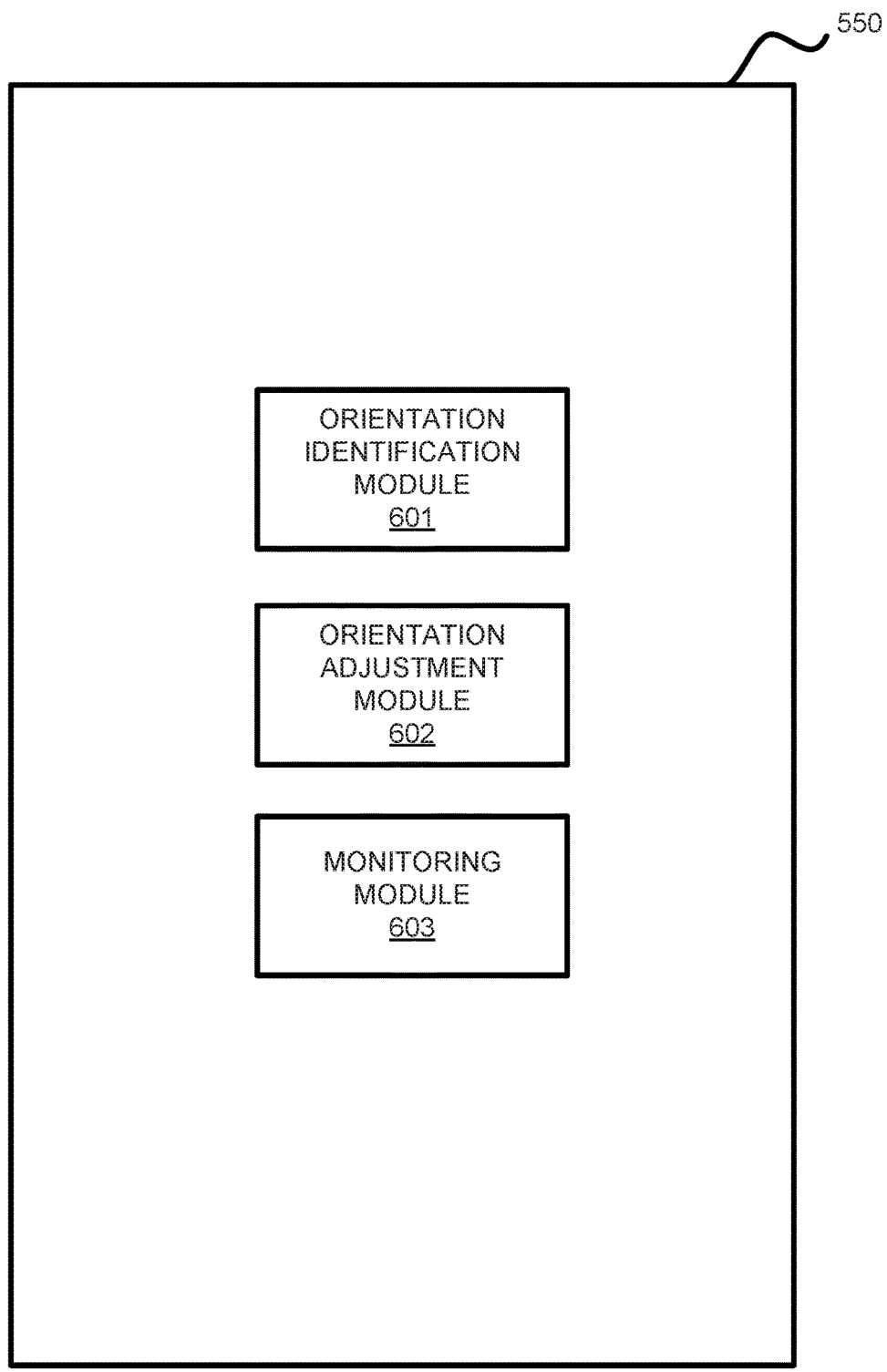
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
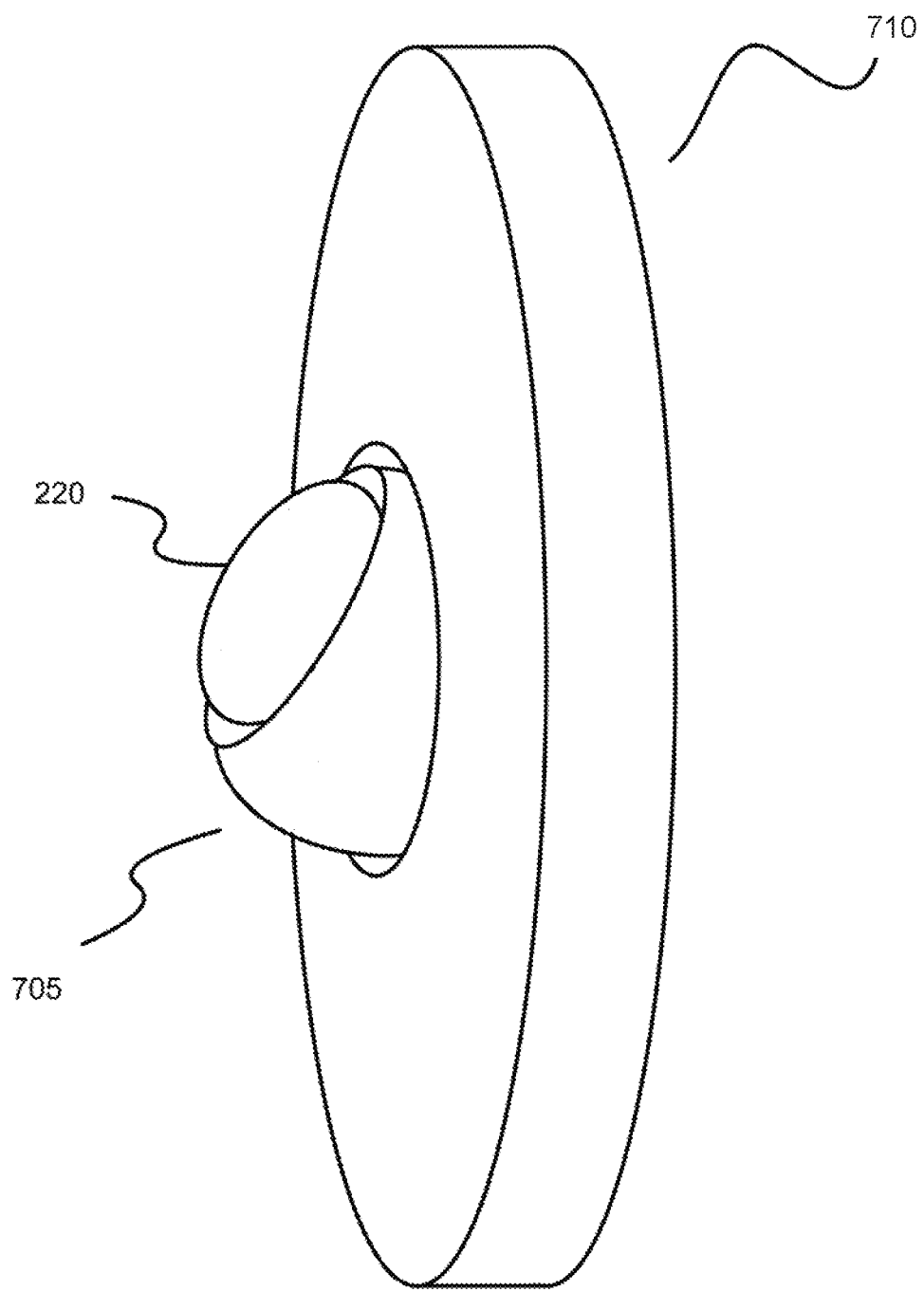
FIG. 7 is a schematic illustration of an embodiment of a wearable apparatus including an orientable image capture unit

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
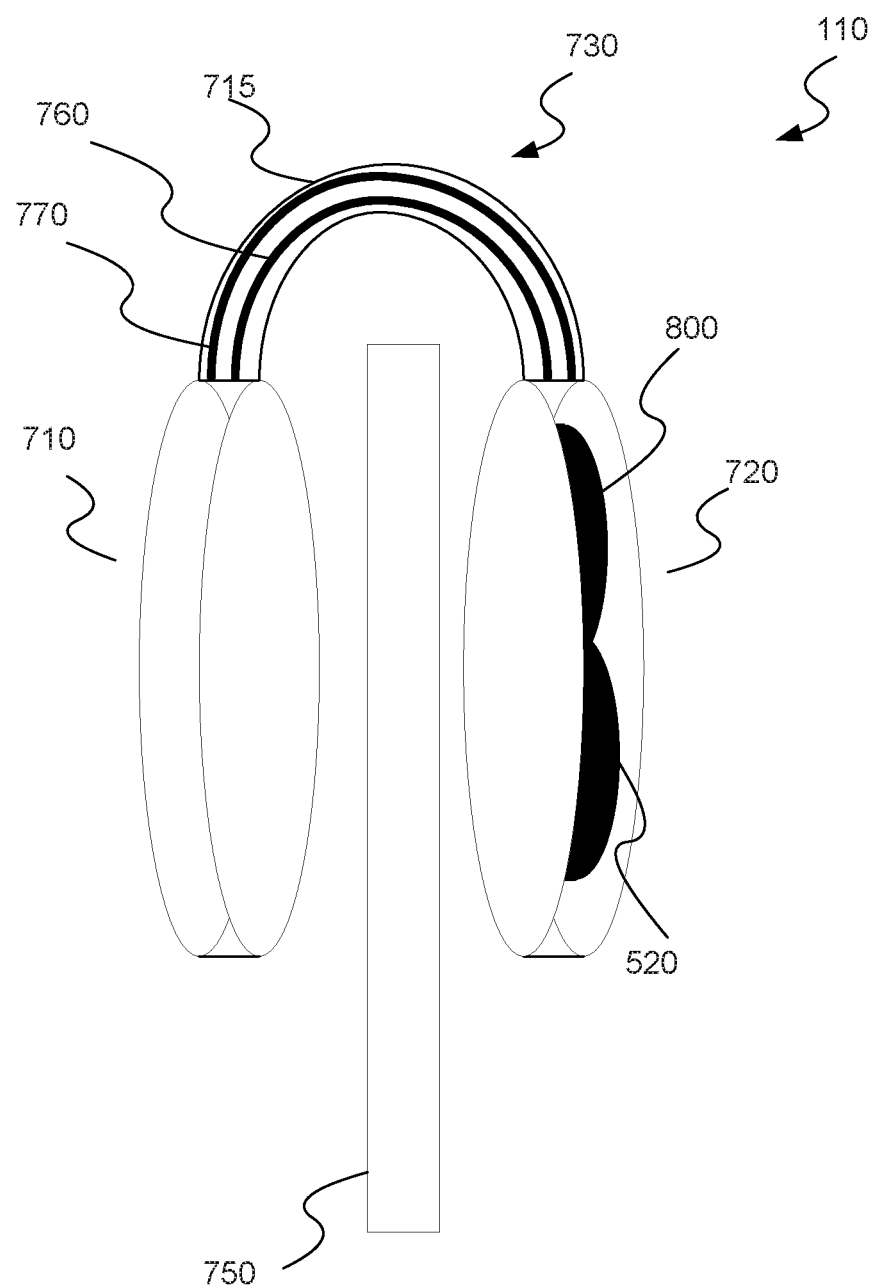
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
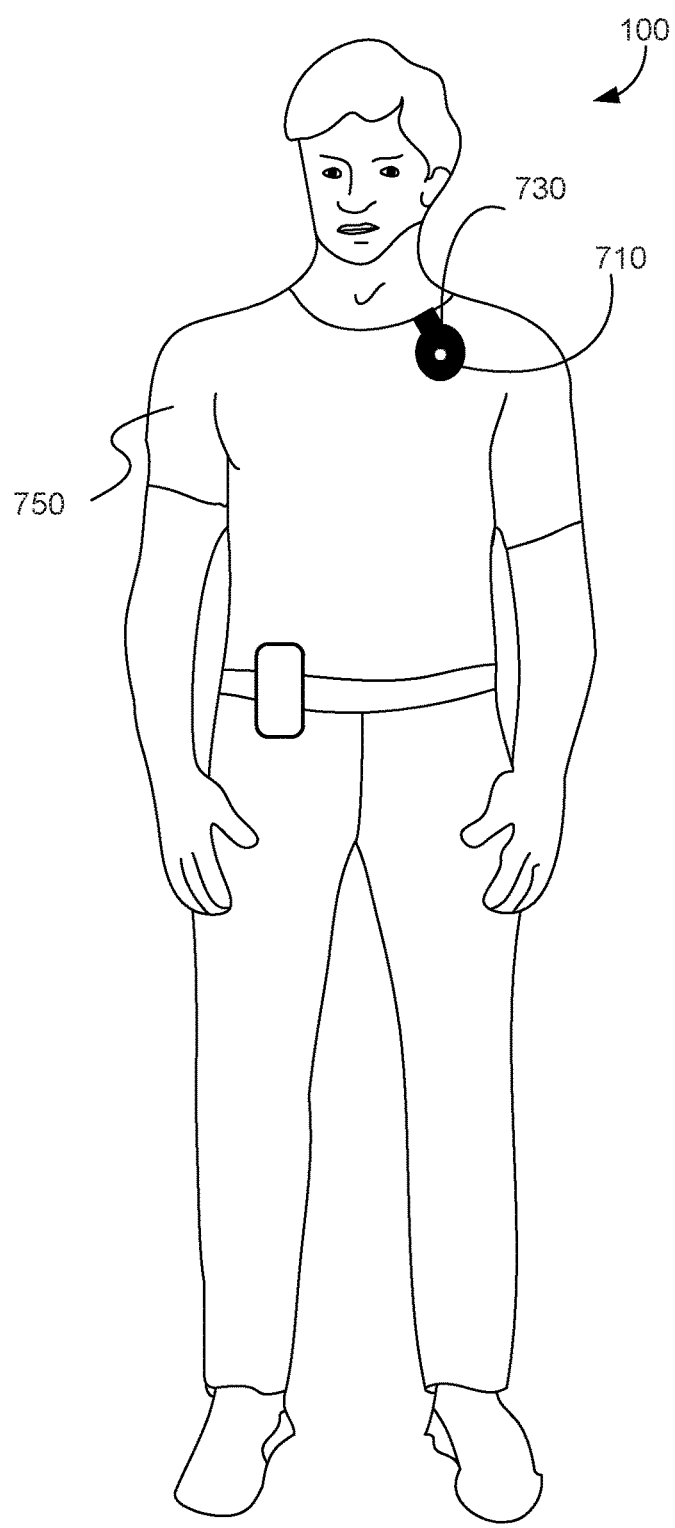
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
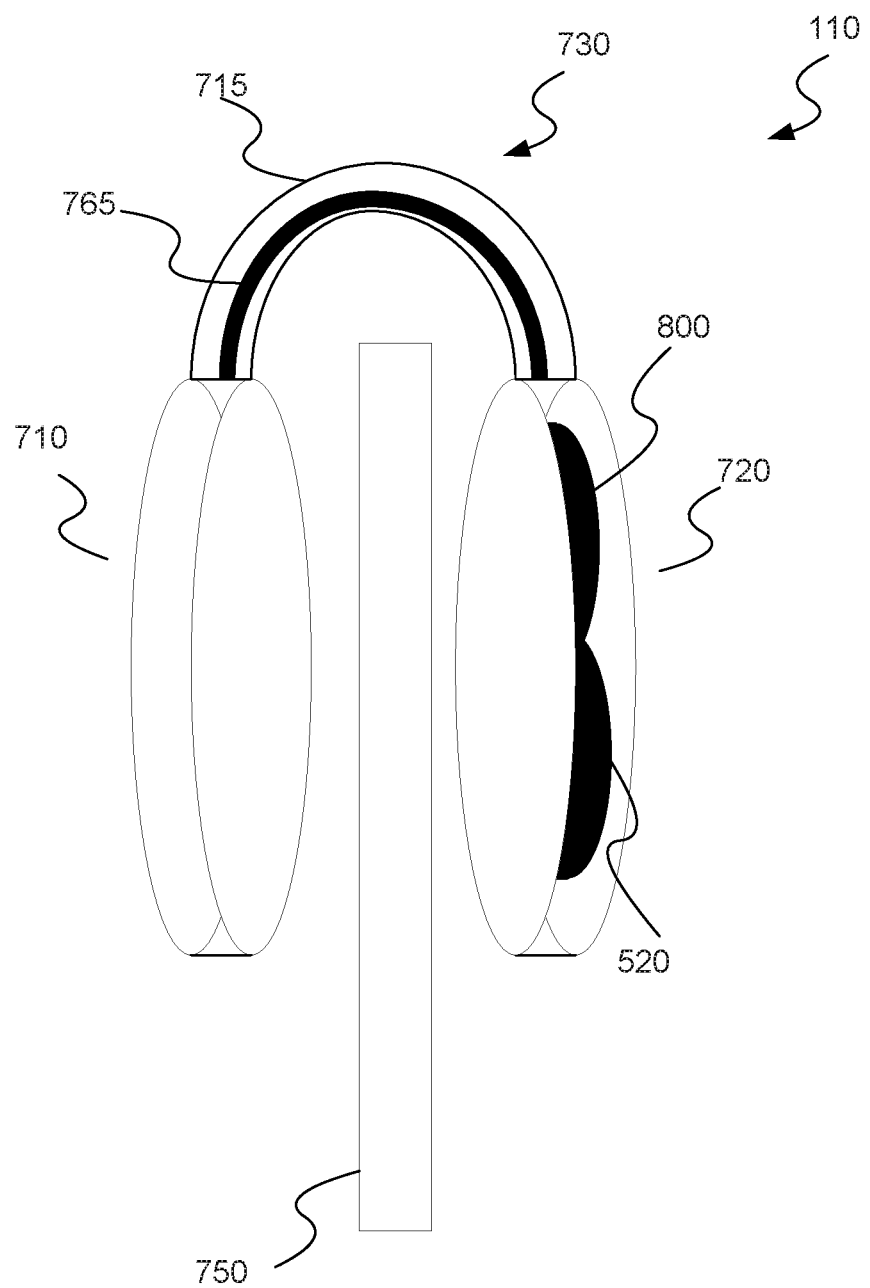
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
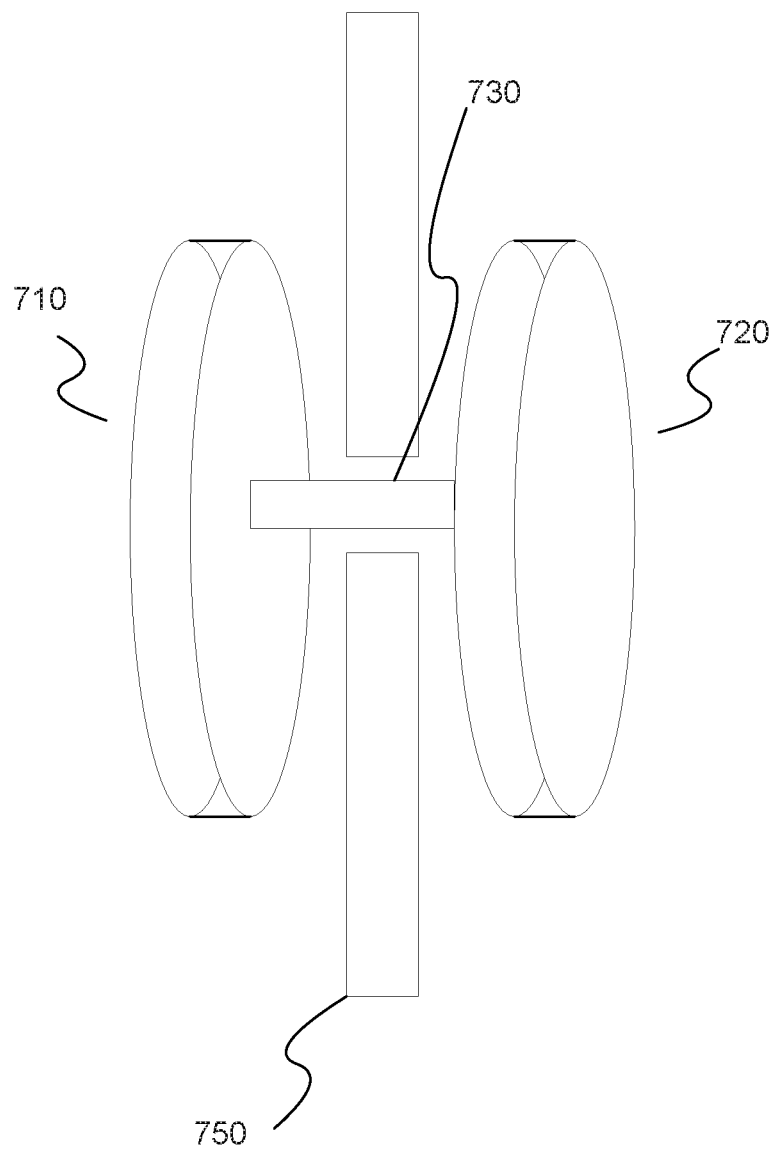
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
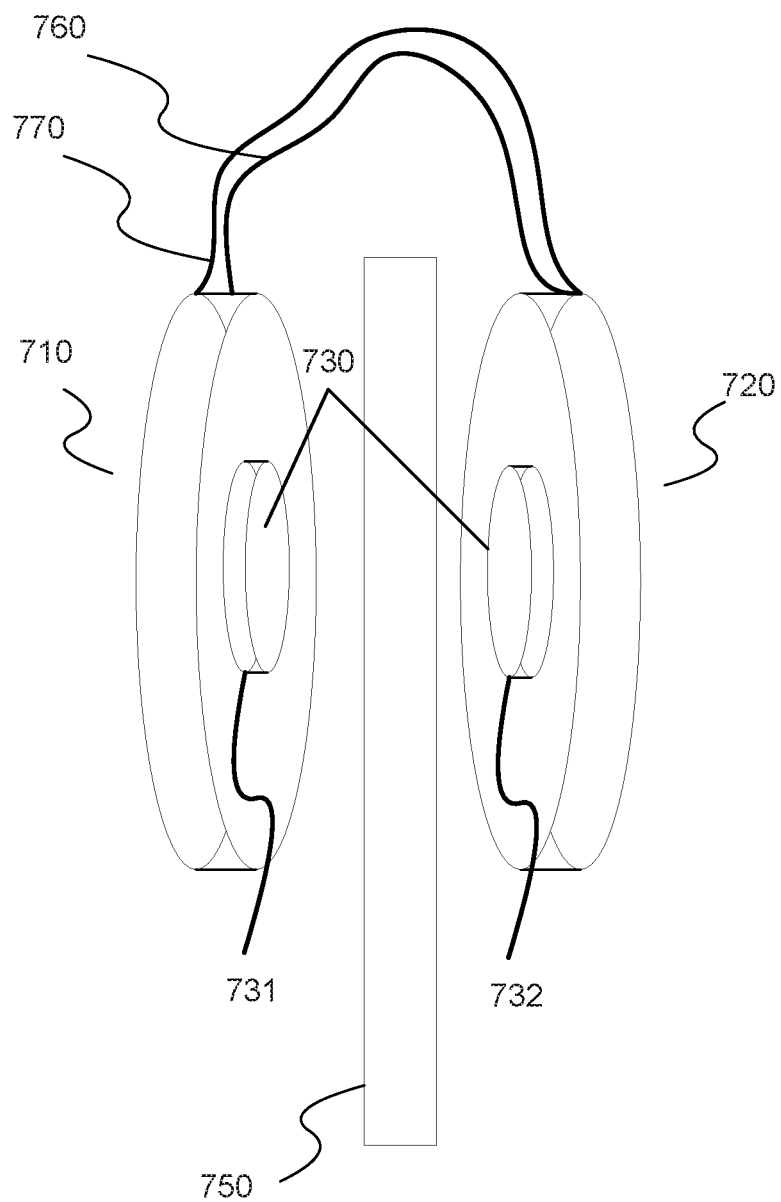
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770.

Figure 13:
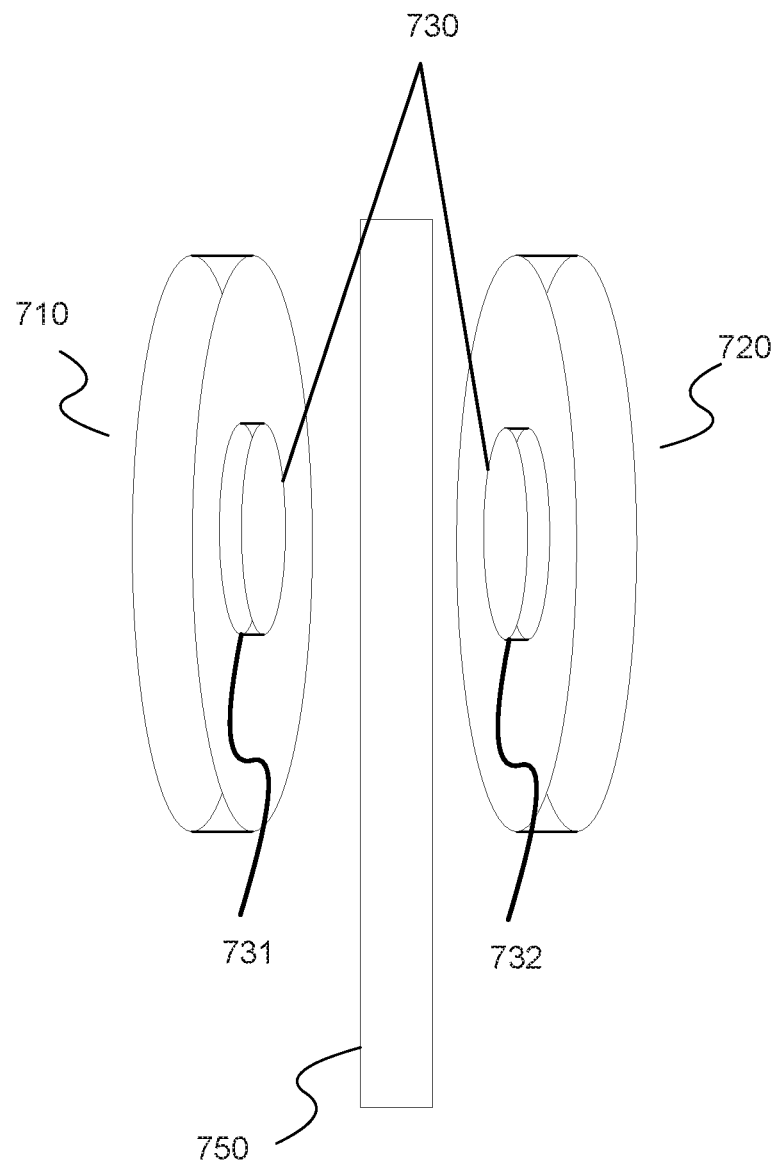
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
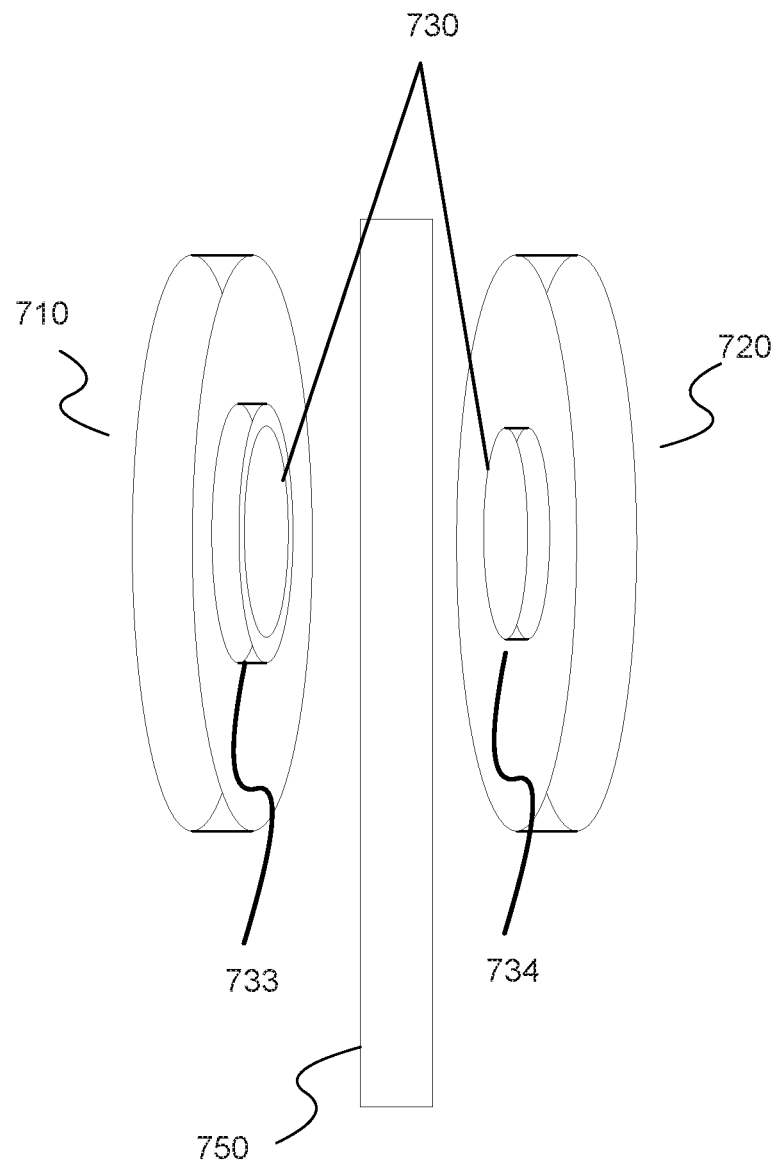
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
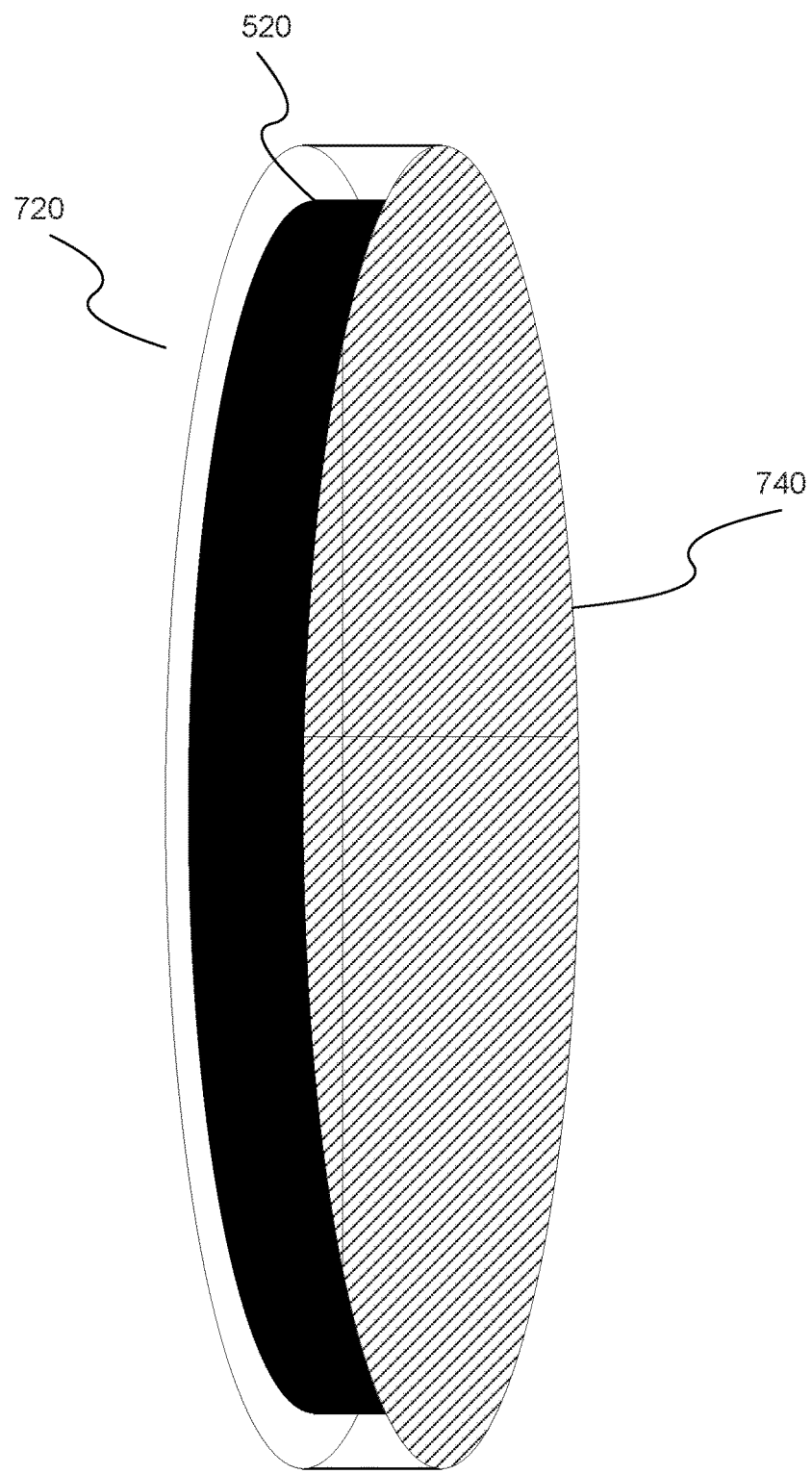
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
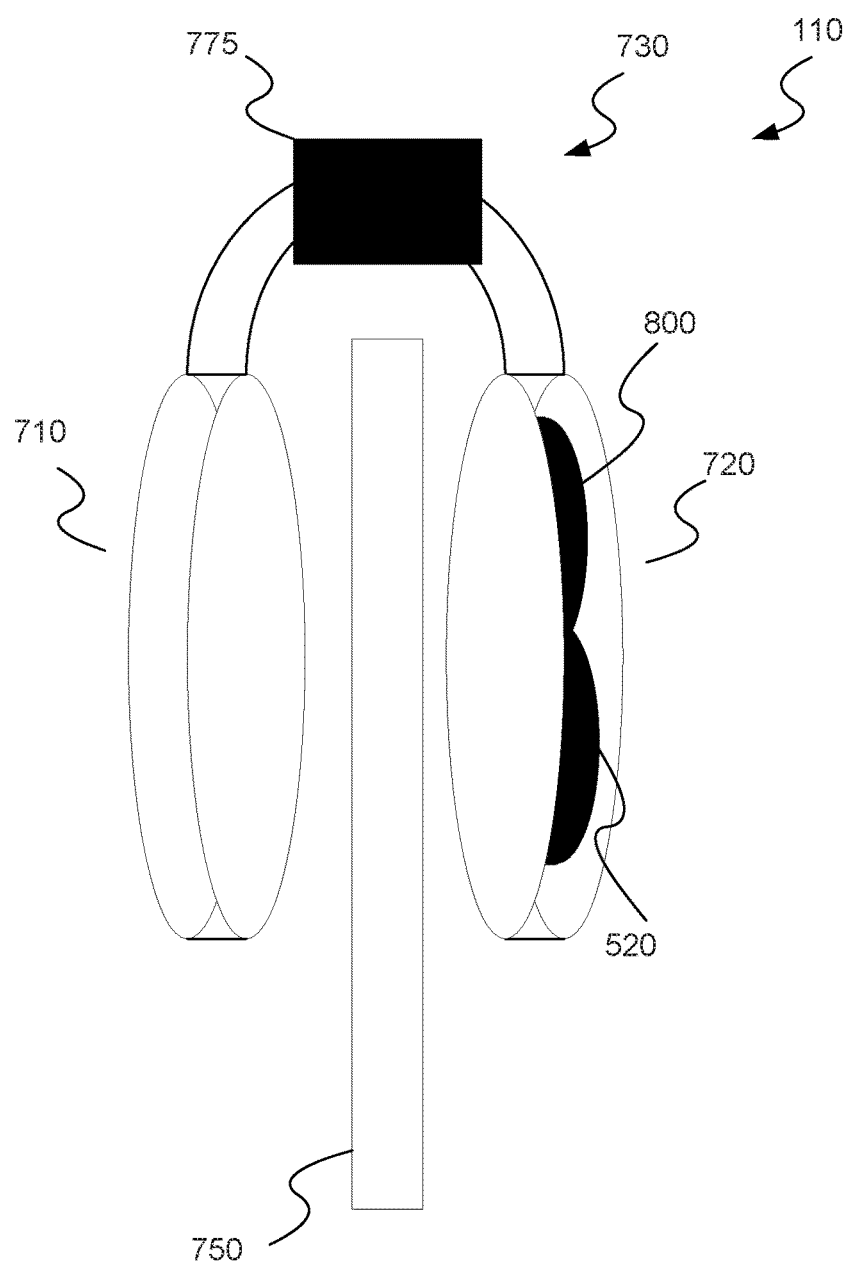
FIG. 16 is a schematic illustration of an exemplary embodiment of a wearable apparatus including protective circuitry.

In further embodiments, an apparatus securable to an article of clothing may further include protective circuitry associated with mobile power source 520 housed in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, smartwatch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some embodiments of the present application may involve systems, methods, and software products for determining at least one keyword. For example, at least one keyword may be determining based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, showtimes, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Personalized Content Selection Based on a User's Behavior

Some embodiments of the present application may involve systems, methods, and software products for selecting content for a user of a wearable apparatus based on the user's behavior. As used herein, the term "content" includes any data, media, substance, or material suitable for conveying information that is useful, pertinent, or relevant to a user. Exemplary contents may include an advertisement, a promotion for sales, a recommendation or review of services or products, an article or any form of text, an image, an audio work, a video clip, a sign, a signal of notification or alert, or any other suitable form of information that can be sensed or experienced by the user.

Some embodiments may analyze data collected by apparatus 110 to determine the behavior of a user, e.g., user 100. As used herein, the term "behavior" refers to the way in which user 100 acts or conducts him/herself, including a regular or normal practice of tendency (e.g., a habit), interaction with others, a pattern or way of work, life, eating, drinking, moving, driving, exercising, entertaining, etc. In some cases, a user's behavior may also include acts or conducts that are irregular or abnormal.

Some embodiments may select content based on the determined user behavior, and the selected content may be personalized to the user. The personalized content may be selected from a pool of various contents that may be supplied by various content providers. The content selection may be based on one or more user behaviors that are determined from analyzing data collected (e.g., by wearable apparatus 110) for a particular user (e.g., user 100) such that the selected content may be of particular relevance to the user or may match a particular interest of the user. Thus, the term "personalized content" refers to content undergone such a selection process such that the selected content may have an enhanced value to a particular user.

Figure 17A:
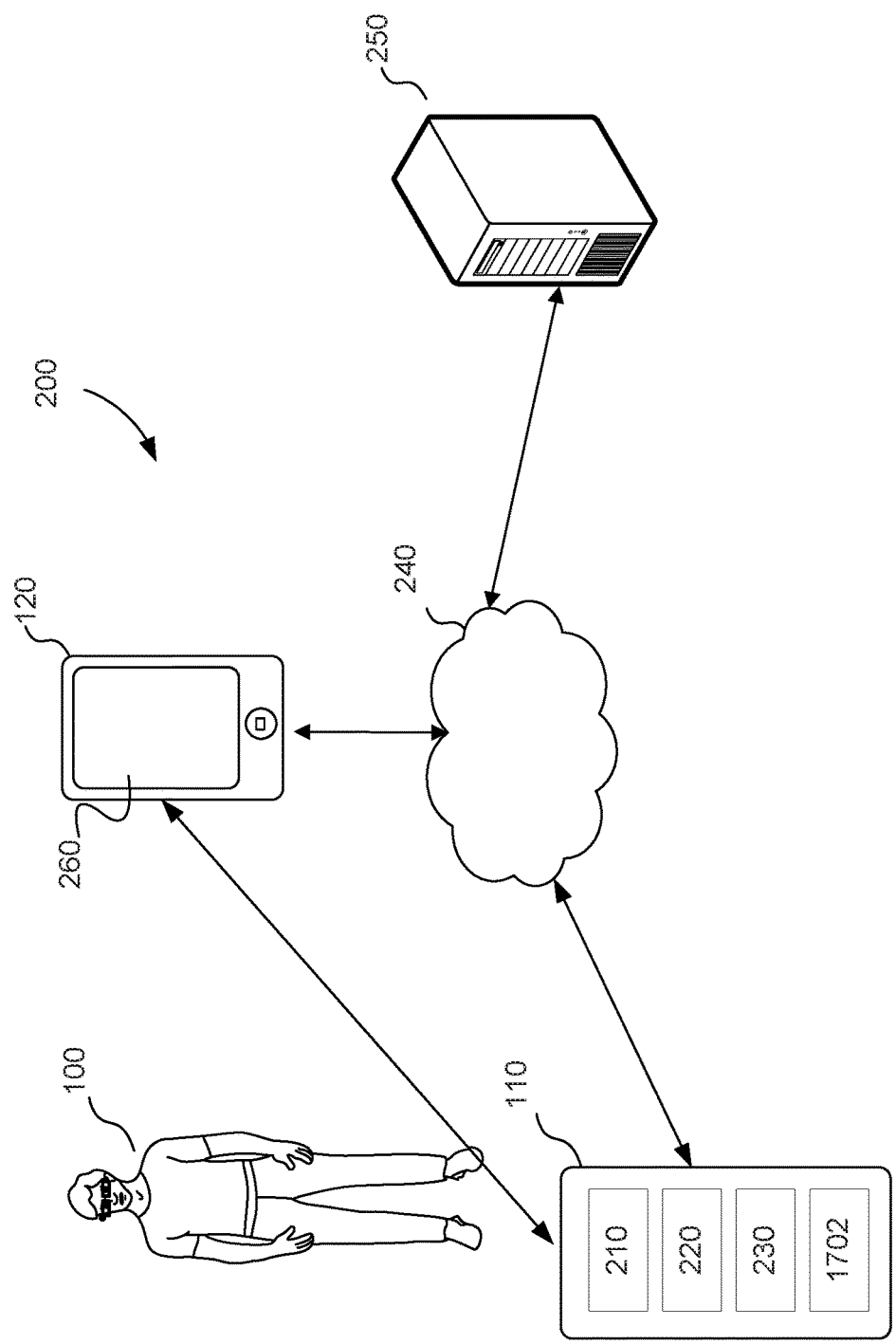
FIG. 17A is a block diagram of an exemplary embodiment of a system for selecting content for a user based on the user's behavior.

In some embodiments, personalized content selection may be achieved using system 200, as previously shown in FIG. 2 and reproduced in FIG. 17A. FIG. 17A is similar to FIG. 2 and includes all the features of FIG. 2, with the only difference being the addition of an audio sensor 1702 depicted in apparatus 110. Adding audio sensor 1702 in FIG. 17A is only for the ease of description and reference. It does not imply that the system shown in FIG. 2 does not include such an audio sensor or that audio sensor 1702 is a necessary component in the system shown in FIG. 17A. As described above in connection with FIG. 5A, other sensors including a microphone (e.g., an example of audio sensor 1702) may be included in apparatus 110. On the other hand, some embodiments may omit audio sensor 1702.

Figure 17B:
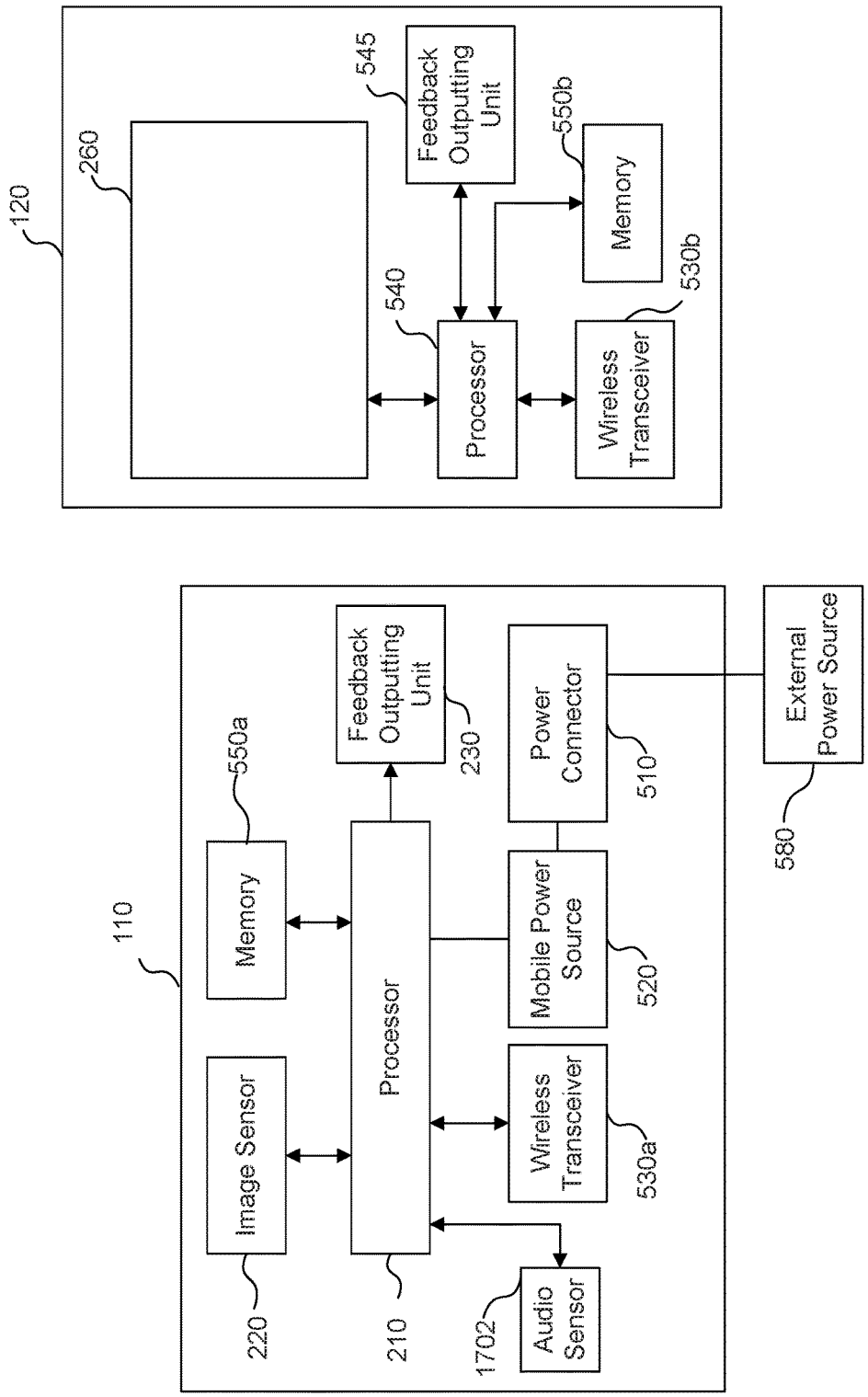
FIG. 17B is a block diagram illustrating an example of the components of the system shown in FIG. 17A.

FIG. 17B is a block diagram illustrating components of apparatus 110 according to an exemplary embodiment. FIG. 17B is similar to FIG. 5C and includes all the features of FIG. 5C, with the only different being the addition of audio sensor 1702 in the figure. Again, adding audio sensor 1702 in FIG. 17B is only for the ease of description and reference. It does not imply that the system shown in FIG. 5C does not include such an audio sensor or that audio sensor 1702 is a necessary component in the system shown in FIG. 17B.

Audio sensor 1702 may also be similarly added to FIGS. 5A and 5B. However, because the interaction between audio sensor 1702 and processor 210 (as in FIG. 5A) or between audio sensor 1702 and processor(s) 210a/210b (as in FIG. 5B) is similar to the interaction between audio sensor 1702 and processor 210 in FIG. 17B, figures showing audio sensor 1702 being added to FIGS. 5A and 5B are omitted.

Referring back to FIG. 17A, system 200 may be configured to select content for user 100 based on the user's behavior determined based on analysis of information collected by wearable apparatus 110. As described above, wearable apparatus 110 may be worn by user 100 in various ways. Wearable apparatus 110 may collect data in the environment of user 100, such as capturing images, recording sound, etc. The collected data, which may or may not be preprocessed by apparatus 110, may be transmitted to computing device 120, which may be paired with wearable apparatus 110 through a wired or wireless communication link. Computing device 120 may analyze the received data, alone or in combination with server 250 through network 240, to identify data that depict a behavior of user 100, to determine information associated with the identified data depicting the behavior of user 100, and/or to select at least one content item based on the determined information. The content item may be selected from a content pool stored in computing device 120 and/or server 250, and may be displayed on display 260.

Referring to FIG. 17B, wearable apparatus 110 may establish wireless communication (also referred to as wireless pairing) with computing device 120 (also referred to as a paired device or an external device). As described above, computing device 120 may include one or more smartphones, one or more tablets, one or more smartwatches, or a combination thereof. In some embodiments, wearable apparatus 110 and computing device 120 may be paired through a short range communication link such as Bluetooth, WiFi, etc. In some embodiments, wearable apparatus 110 may be connected to network 240 and communicate with computing device 120 and/or server 250 through network 240. For example, wireless pairing may be established via communication between wireless transceiver 530a in wearable apparatus 110 and wireless transceiver 530b in computing device 120. Wireless transceiver 530a may act as a transmitter to send image and/or sound data captured by image sensor 220 and/or audio sensor 1702 to wireless transceiver 530b, which may act as a receiver, for processing and analysis by computing device 120, alone or in combination with server 250. In some embodiments, wireless transceiver 530a may transmit information associated with the captured image/sound data to computing device 120. In some embodiments, after a content item is selected by computing device 120, the selected content item may be transmitted by wireless transceiver 530b, which may act as a transmitter, to wireless transceiver 530a, which may act as a receiver. The content item may then be output to user 100 through feedback outputting unit 230.

In some embodiments, wearable apparatus 110 may be configured to collect data (e.g., image and/or audio data) and transmit the collected data to computing device 120 and/or server 250 without preprocessing the data. For example, processor 210 may control image sensor 220 to capture a plurality of images and/or control audio sensor 1702 to record sound. Then, processor 210 may control wireless transceiver 530a to transmit the captured images/sound data, and/or information associated with the images/sound, to computing device 120 and/or server 250 for analysis without performing preprocessing or analysis using the computational power of processor 210. In some embodiments, processor 210 may perform limited preprocessing on the collected data, such as identifying trigger in the images, performing optical character recognition (OCR), compressing the image/sound data, sampling the image/sound data, identifying user behavior related images/sound, etc. The preprocessed data may then be transmitted to computing device 120 and/or server for further analysis. In some embodiments, processor 210 may perform user behavior analysis onsite. For example, processor 210 may analyze the data captured by image sensor 220 and/or audio sensor 1702 to identify the image/sound data that depict a behavior of user 100. For example, the image data depicting the behavior of user 100 may include two or more images. Processor 210 may then determine information associated with the identified image/sound data and select one or more content items based on the information. The one or more content items may be selected from a content pool stored in memory 550a of wearable apparatus 110, in memory 550b of computing device 120, and/or in server 250. The selected content item(s) may then be output to user 100 through feedback outputting unit 230 of apparatus 110, through display 260 of computing device 120, and/or through feedback outputting unit 545 of computing device 120.

In some embodiments, computing device 120 may be configured to perform some or all tasks for selecting personalized content based on user behavior determination. For example, wearable apparatus 110 may transmit image/sound data, either unprocessed or preprocessed, to computing device 120. After receiving the data, processor 540 may analyze the data to identify, for example, one or more images that depict a behavior of user 100. In some embodiments, processor 540 may identify two or more images that depict the behavior of user 100. Processor 540 may then determine, based on the analysis, information associated with the one or more images. The information may include a scene, a person, an object, a trigger, etc. that is included in the image(s). The information may also include the time and/or location of capturing the image(s). The information may also include historical data relating to the behavior depicted in the image(s). Other suitable information relating to the user behavior may also be determined. Based on the information, processor 540 may select at least one content item. The content item may include an advertisement, a promotion (e.g., a coupon), a recommendation of product(s)/service(s), etc. In some cases, the content item may be selected from a content pool stored in memory 550b and/or in server 250. In some cases, a parameter of the content item may be selected. Examples of such a parameter include: a time, a location, a quantity, a discount amount, and so forth.

As described above, one or more tasks for selecting personalized content may also be performed by server 250 and/or wearable apparatus 110. Tasks such as image/sound data analysis, information determination, and content selection, may be divided among wearable apparatus 110, computing device 120, and server 250 in any suitable manner. In some embodiments, two or more devices (110, 120, and/or 250) may also collaboratively perform any one task. For example, wearable apparatus 110 may preprocess the captured image data, select a plurality of images that are likely related to the behavior(s) of user 100, and transmit the plurality of images to computing device 120. Computing device 120 may analyze the plurality of images to identify one or more images that depict a behavior of the user, and transmit the identified one or more images to server 250. Server 250 may determine user behavior related information based on the one or more images, select at least one content item from a content depository based on the information, and transmit the selected content item to computing device 120.

In another example, after identifying the one or more images depicting the user behavior, computing device 120 may determine user behavior related information and send the information to server 250. Server 250 may select at least one content item based on the received information and transmit the selected content item to computing device 120. There are various ways of distributing and dividing tasks or subtasks among wearable apparatus 110, computing device 120, and server 250. Regardless of which task or subtask is performed by which device, any suitable allocation of computation power among the devices for performing the above-described tasks are within the purview of the present application. In another example, wearable apparatus 110 may analyze the plurality of images to identify one or more images that depict a behavior of the user, determine user behavior related information based on the one or more images, select at least one content item from a content depository based on the information, and in some cases transmit the selected content item to computing device 120.

Figure 17C:
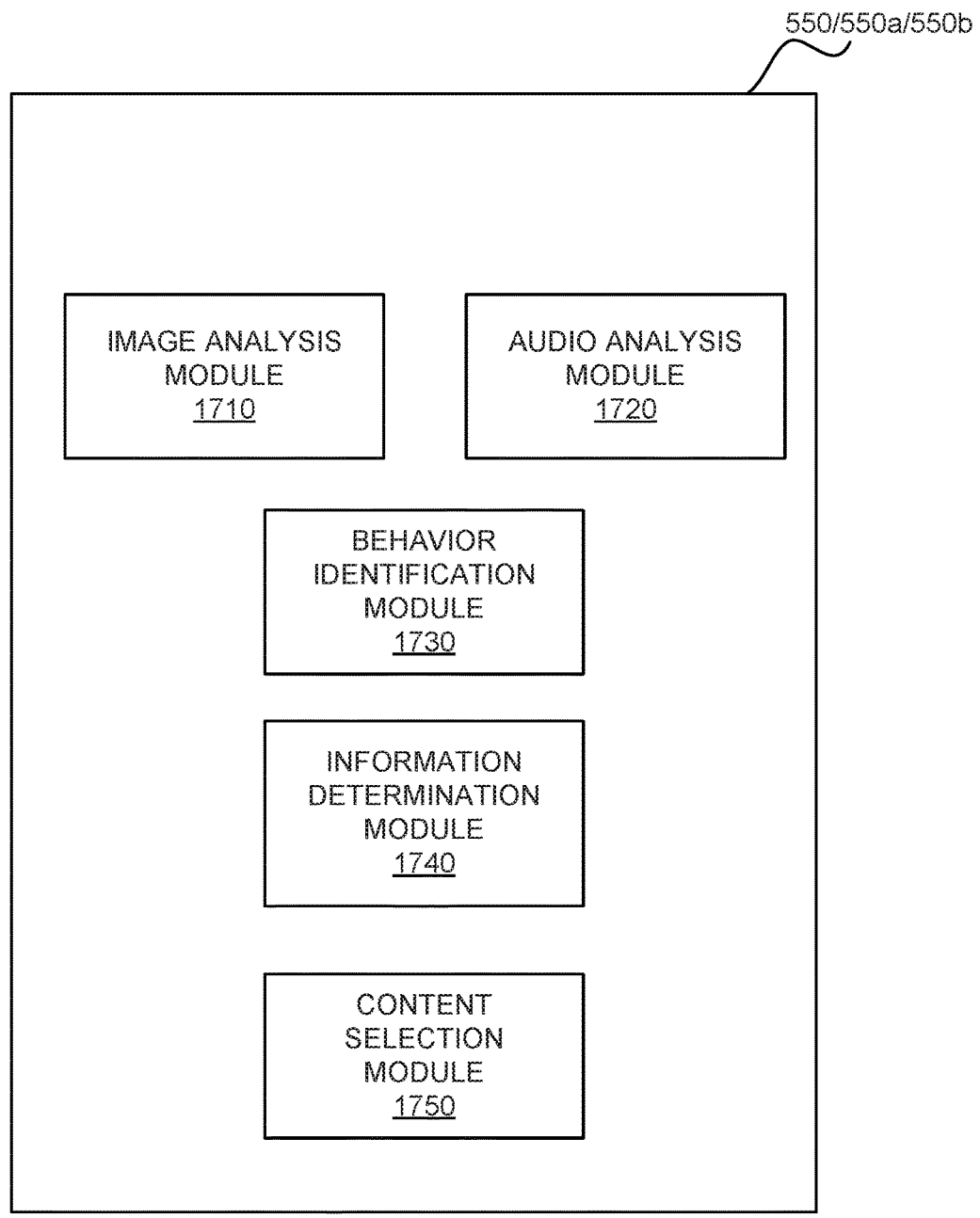
FIG. 17C is a block diagram of an exemplary memory of the system shown in FIG. 17A storing software modules.

FIG. 17C illustrates exemplary software modules contained in one or more memory units. As shown in FIG. 17C, the exemplary software modules include an image analysis module 1710, an audio analysis module 1720, a behavior identification module 1730, a information determination module 1740, and a content selection module 1750. As described above, computational tasks involved in system 200 for personalized content selection may be allocated among wearable apparatus 110, computing device 120, and server 250. Therefore, software modules shown in FIG. 17C, which are functionally similar to the computational tasks, are not necessarily stored in a single memory unit. Rather, the software modules can be allocated, similar to the computational tasks, among the various devices having computational power in system 200. For example, memory 550a may contain modules 1710 and 1720, while memory 550b may contain modules 1730, 1740, and 1750. In another example, all modules shown in FIG. 17C may be contained in memory 550b. In yet another example, all modules shown in FIG. 17C may be contained in memory 550 (as shown in FIGS. 5A and 5B). In some embodiments, multiple memory units, for example memories 550a and 550b, may both contain certain modules, such as modules 1710 and 1720, and the computational tasks of image/audio analysis may be dynamically allocated or shifted between wearable apparatus 110 and computing device 120, depending on their respective work load. Therefore, the memory unit shown in FIG. 17C is collectively referred to as 550/550a/550b, indicating that the software modules shown in FIG. 17C may or may not be contained in a single memory unit.

Similar to modules 601, 602, and 603 shown in FIG. 6, the software modules shown in FIG. 17C may contain software instructions for execution by at least one processing device, e.g., processor 210 and/or processor 540. Image analysis module 1710, audio analysis module 1720, behavior identification module 1730, information determination module 1740, and content selection module 1750 may cooperate to provide personalized content selection based on user behavior.

In some embodiments, image analysis module 1710 may contain software instructions for performing optical character recognition (OCR) of at least one image captured by image sensor 220. For example, referring to FIG. 17B, processor 210 may execute the image analysis module 1710 stored in memory 550a to perform OCR of one or more images captured by image sensor 220, and transmit the OCR result to computing device 120 via wireless transceiver 530a. Processor 540 of computing device 120 may be programmed to receive the OCR result via wireless transceiver 530b. After receiving the OCR result, processor 540 may execute software instructions of behavior identification module 1730 stored in memory 550b to identify the behavior of user 100 based on the OCR result. Based on the identified behavior, processor 540 may determine information associated with the behavior by executing software instruction of information determination module 1740. Processor 540 may then execute software instructions of content selection module 1750 to select at least one content item. The selected content item(s) may be displayed on display 260 and/or output by feedback outputting unit 230/545.

In some embodiments, audio analysis module 1720 may contain software instructions for analyzing sound recorded by audio sensor 1702. For example, audio sensor 1702 may record sound continuously and store the recorded sound data in memory 550a. Memory 550a may keep the sound data in a buffer, which may have a size sufficient for storing a predetermined length of sound, such as 5 seconds, 10 seconds, 30 sounds, 60 sounds, etc. Sound data stored in memory 550a may be transmitted to computing device 120 after a trigger is recognized in at least one of the captured images. For example, processor 210 may analyze the images captured by image sensor 220 to recognize the trigger, such as a hand gesture, a person, an object, a location, a scene, etc. After the triggered is recognized, processor 210 may transmit the sound data stored in memory 550a to computing device 120. Processor 210 may also transmit sound data recorded after the recognition of the trigger to computing device 120, for example, for a designated time period (e.g., 5 seconds, 10 seconds, 30 seconds, 60 seconds, etc.). After receiving the sound data, processor 540 may execute software instructions of audio analysis module 1720, for example, to extract information from the sound data recorded before and/or after the recognition of the trigger. Based on the analysis result, processor 540 may identify one or more behaviors of user 100 by executing software instructions of behavior identification module 1730, determine information associated with each behavior by executing software instructions of information determination module 1740, and select at least one content item by executing software instructions of content selection module 1750.

In some embodiments, behavior identification module may perform behavior identification based on either or both analysis results of modules 1710 and 1720. For example, behavior identification may be based on image(s) and/or OCR result without sound information. In another example, behavior identification may be based on sound information alone, such as identifying a person's name, an object, a place, a date, a time point, or other behavior related information from the sound. In another example, behavior identification may be based on both images and sound. As described above, a trigger can be identified from OCR result of one or more images. Based on the trigger, sound data may be analyzed by audio analysis module 1720. Behavior identification module 1730 may identify user behavior(s) based on both the OCR result and the analysis result of the sound data.

Figure 18A:
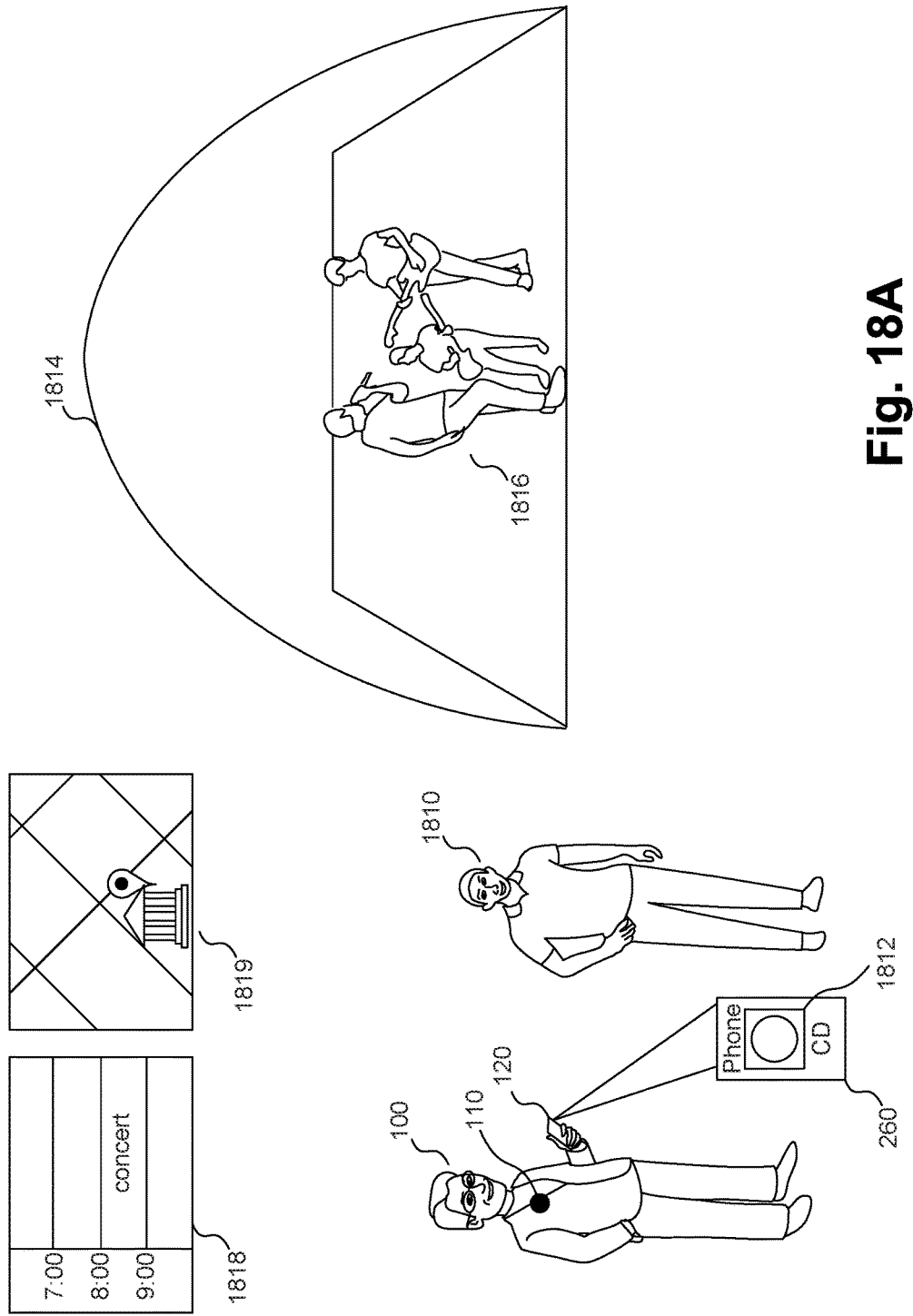
FIG. 18A is a schematic illustration of an exemplary application of personalized content selection.

System 200 may provide personalized content to user 100 in various applications, such as in various environments or scenarios. For example, FIG. 18A is a schematic illustration of an exemplary application. As shown in FIG. 18A, user 100 may wear wearable apparatus 110 while visiting an event venue, for example, a concert hall 1814. Apparatus 110 may capture images (e.g., using image sensor 220) of the event venue, such as images of a building (inside and/or outside), images of the name of the building (e.g., "National Theater"), image of iconic object(s) associated with the event venue (e.g., statue(s), chandelier(s), painting(s), column(s), layout of the stage/seating area/stairs, pattern of ceiling lamps, etc.). The images may be analyzed by image analysis module 1710 to recognize (e.g., by performing OCR) certain elements within the images, such as characters, logos, signs, unique patterns, profiles, etc. The recognized result may be processed by behavior identification module 1730 to identify the event venue, such as the particular concert hall user 100 is visiting. In some embodiments, images captured by image sensor 220 may be processed directly by behavior identification module 1730 to identify the event venue. In some embodiment, identification module 1730 may also identify the event venue based on other information, such as the location information 1819 of user 100 (e.g., via GPS information provided by computing device 120), calendar information 1818 (e.g., a concert event is scheduled at a particular time slot and the current time is within that time slot), image of another person 1810 (e.g., a friend who is also visiting the concert hall), etc. Based on the identified event venue, information determination module 1740 may determine information associated with the event venue. For example, the information may include a performer 1816 scheduled to perform at the event venue, such as a singer, an actor, a comedian, an athlete, a dancer, a musician, a director, etc. Such information may be obtained from server 250, through Internet search, or from information associated with user 100, such as the user's calendar, notes, email, purchase history, etc. Based on the determined information, content selection module 1750 may select at least one content item 1812. Content item 1812 may include information (e.g., an advertisement) regarding a music CD performed by the performer, a magazine featuring an article about the performer, an upcoming event featuring the performer, a movie or television show featuring the performer, a book written by the performer, a product sold or endorsed by the performer, a social media account or website associated with the performer, etc. The content item may be displayed on display 260 of computing device 120.

In some embodiments, a content item may also be selected based on a learned history of user 100. For example, FIG. 18B is an illustration of an application of personalized content selection based on a learned history of user 100. Referring to FIG. 18B, user 100 may wear wearable apparatus 110 to visit a restaurant. Based on image analysis similar to the analysis described in connection with the last example, behavior identification module 1730 may identify that the venue is a restaurant. Based on the identification, information determination module 1740 may determine a food preference of user 100. For example, the food preference may be determination based on analysis of at least one image 1824 previously captured by wearable apparatus 110, either at the particular restaurant user 100 is currently visiting or at other restaurant(s). In some embodiment, information determination module 1740 may conduct a search in memory 550*a* and/or 550*b* to identify image(s) previously captured relating to food. Based on the identified image(s), information determination module 1740 may determine the food preference of user 100. For example, if the number of images of burgers is more than other types of food, then it may indicate that user 100 prefers burger. In another example, if images of salads were captured more frequently and/or more recently, then it may indicate that user 100 prefers salad. In some embodiments, images of the food item(s) used for determining food preference of user 100 may be food item(s) ordered or consumed by user 100 in the past. For example, information determination module 1740 may distinguish food item(s) ordered or consumed by user 100 and food item(s) ordered or consumed by others by, e.g., comparing the focus, distance, position of the food item(s), and/or whether an image shows another person consuming the food item(s). The food preference of user 100 may be determined on the fly, e.g., after identifying the user 100 is at a restaurant, or may be determined routinely, e.g., on a daily basis or after new images of food item(s) are captured, and stored in memory 550*a*/550*b*. Based on the food preference, content selection module 1750 may select at least one content item 1822, such as a recommendation for a particular food item. The particular food item may be selected from the restaurant's menu 1820. Information of the menu 1820 may be obtained from images captured by apparatus 110. For example, image(s) of the menu 1820 may be captured by image sensor 210 while user 100 is reading the menu. The image(s) of the menu 1820 may be OCRed to obtain the food selections provided by the restaurant. In another example, information of the menu may be obtained from server 250 or through Internet search based on the identified restaurant information. Content selection module 1750 may match the food preference of user 100 and the menu selections provided by the restaurant to generate the recommendation. In some embodiments, the recommendation may include an image of the recommended food item, the name of the recommended food item, or other indication of the recommended food item that can be displayed on display 260 of computing device 120. The recommendation may also include an audio readout of the recommended food item and/or information related to the nutrition of the recommended foot item. In some embodiment, the recommendation may also include a review of one or more food items, a coupon acceptable by the restaurant, or other information relating to the recommended food item, the food preference, or the restaurant.

Figure 18C:
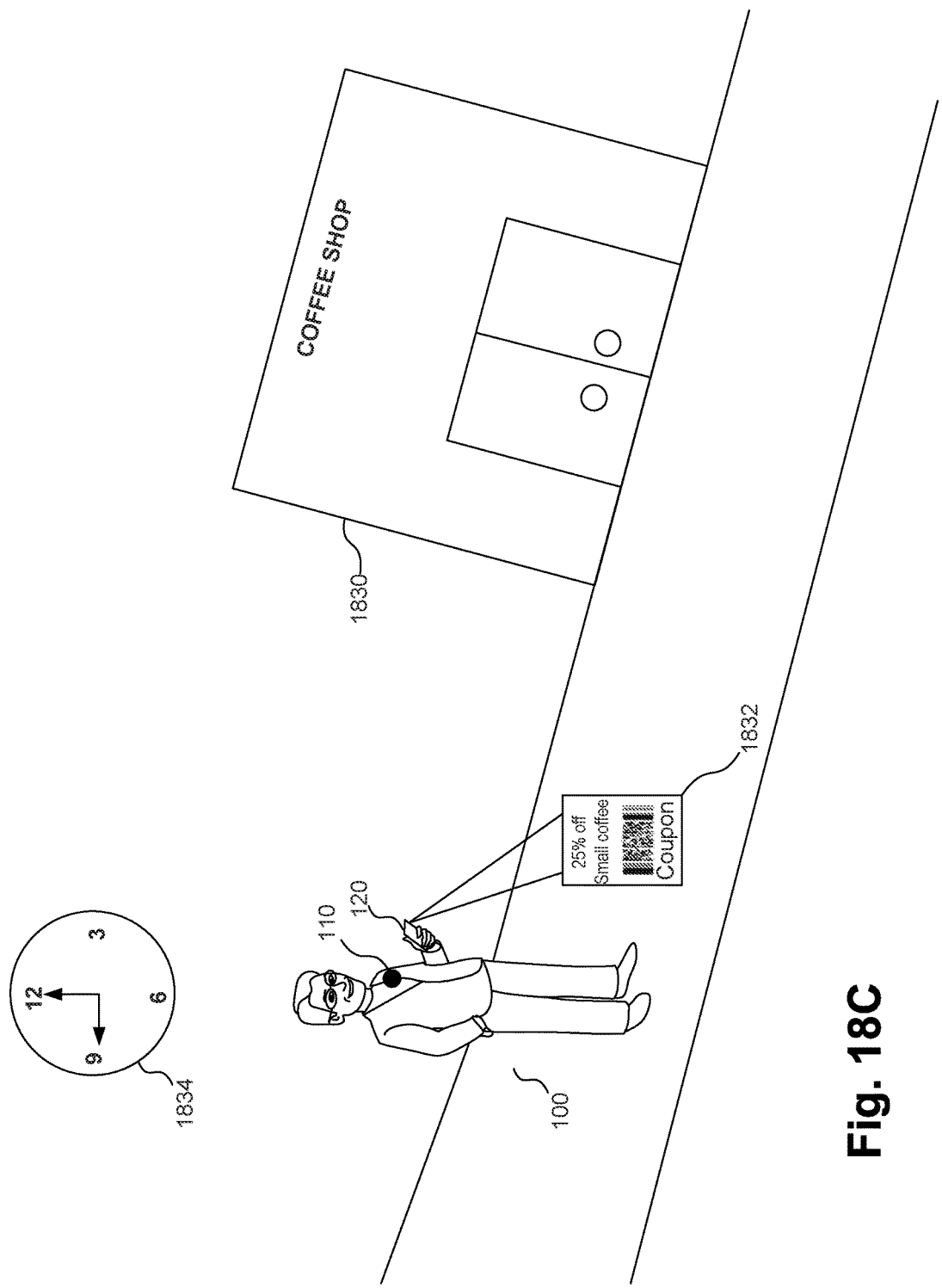
FIG. 18C is a schematic illustration of a third exemplary application of personalized content selection.

FIG. 18C is an illustration of a third exemplary application of personalized content selection. Referring to FIG.

18C, user 100 may wear wearable apparatus 110 while conducting certain routine practices, such as walking to work at a particular time of the day (e.g., around 9:00 AM in the morning, as shown in 1834) and stopping by at a particular coffee shop 1830 to buy a cup of coffee. Behavior identification module 1730 may determine, based on images captured (e.g., image of the road, image of the coffee shop 1830, etc.) and/or the time information 1834 (e.g., prior to or around the time of the routine practice), that user 100 may stop by the coffee shop 1830 to buy coffee. Based on the identified user behavior (e.g., consuming a beverage at a particular time of day), information determination module may determine, for example, that a coupon 1832 can be used to lower the cost of purchasing the coffee. Content selection module 1750 may select such a coupon 1832, which may be issued by the coffee shop or by a third party, from a coupon pool stored in memory 550b and/or server 250, or through Internet search. The coupon may be displayed on display 260 of computing device 120 for user 100 to apply to the coffee purchase.

Figure 19A:
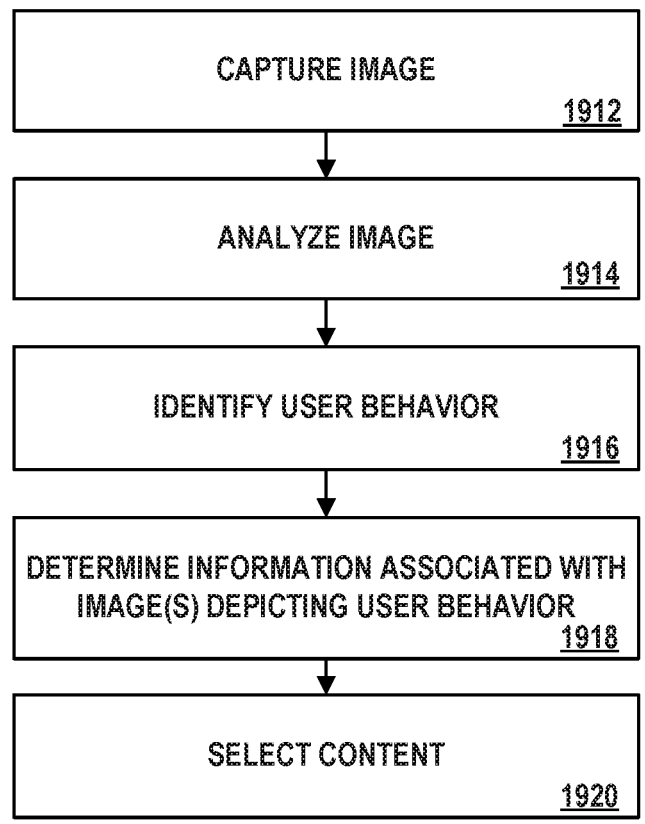
FIG. 19A is a flow chart of an exemplary method for selecting content for a user based on the user's behavior.

FIG. 19A is a flow chart of an exemplary method 1900 for selecting personalized content for user 100 based on the behavior of user 100. Method 1900 starts from step 1912, in which wearable apparatus 110 may continuously capture images in the surround environment of user 100. In step 1914, the captured images may be analyzed by image analysis module 1710. For example, image analysis module 1710 may perform OCR to the captured images to recognize text, signs, or other visual elements in the images. In another example, image analysis module 1710 may recognize scene, place, person, object, time, or extract other information from the captured images. The extent of the analysis may vary depending on task allocation, computational power, power consumption, etc. For example, image analysis module 1710 may perform minimum processing to the capture images, such as compression, cropping, zooming, etc., before sending the images to behavior identification module 1730. In another example, image analysis module 1710 may perform more extensive processing, such as OCR, pattern recognition, etc., and send the analysis result to behavior identification module 1730.

In step 1916, behavior identification module 1730 may identify one or more images that depict a behavior of user 100. The one or more images may be identified from the captured images or images processed by image analysis module 1710. For example, behavior identification module 1730 may identify that certain image(s) may depict that user 100 is visiting an event venue (e.g., a concert hall), a restaurant, a shopping mall, a coffee shop, etc. In another example, behavior identification module 1730 may identify that certain image(s) may depict that user 100 is meeting a friend or family member, watching TV, working before a computer, driving, walking to work, etc.

In step 1918, information determination module 1740 may determine information associate with the identified image(s) that depict the behavior of user 100. For example, if the identified image(s) depict that user 100 is visiting a concert hall, information determination module 1740 may determine one or more performers scheduled to perform at the concert hall. In another example, if the identified image(s) depict that user 100 is at a restaurant, information determination module 1740 may determine the food preference of user 100 based on, for example, images captured previously showing food item(s) ordered or consumed by user 100. In a further example, if the identified image(s) depict that user 100 is walking to work, information determination module 1740 may determine that user 100 routinely stops by a particular coffee shop on the way based on, for example, images captured previously showing user 100 purchased coffee at the particular coffee shop on the way to work at roughly the same time during the day almost every work day.

In step 1920, content selection module 1750 may select at least one content item based on the information determined in step 1918. For example, if user 100 visits a concert hall and information determination module 1740 determines one or more performers scheduled to perform at the concert hall, content selection module 1750 may select a music CD related to the concert (e.g., containing music performed by at least one of the performers determined by information determination module 1740) to be provided to user 100 (e.g., by displaying the music CD image and/or purchase information on display 260). In another example, if user 100 visits a restaurant and information determination module 1740 determines the food preference of user 100, content selection module 1750 may select a food item on the restaurant menu to be provided to user 100 as a recommendation based on the food preference. In a further example, if user 100 walks to work and information determination module 1740 determines that user 100 likely to stop by the coffee shop to buy coffee, content selection module 1750 may, based on the high likelihood that user 100 would buy coffee at the particular coffee shop, select a coupon to be provided to user 100 prior to or upon the user's arrival of the coffee shop.

Figure 19B:
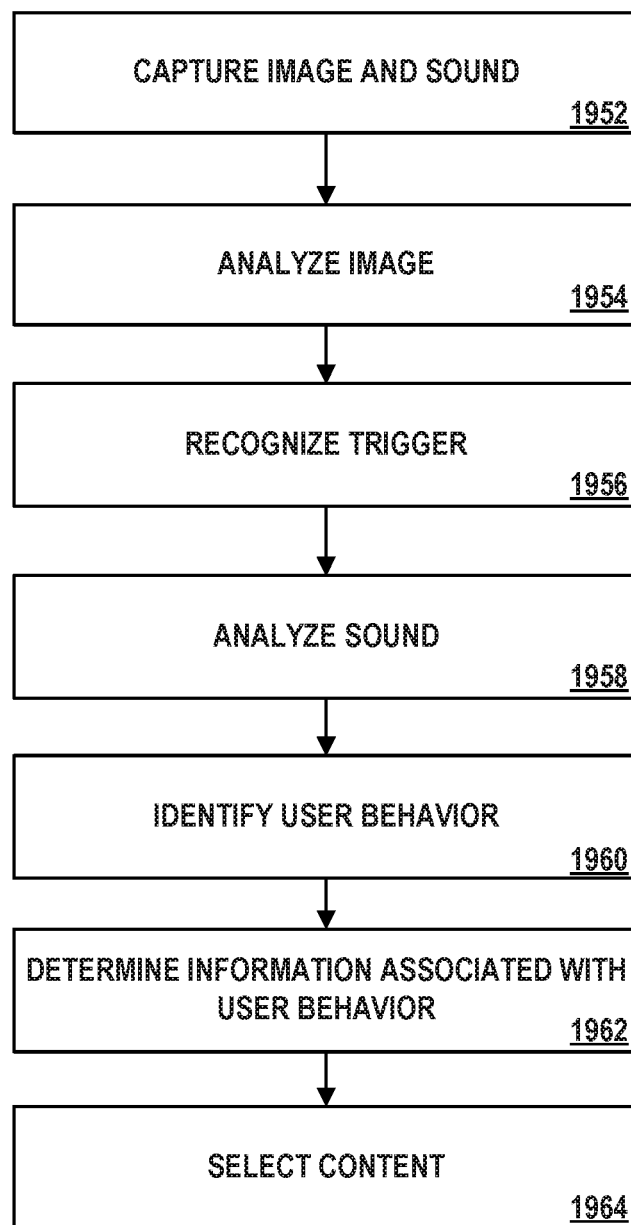
FIG. 19B is a flow chart of another exemplary method for selecting content for a user based on the user's behavior.

In some embodiments, wearable apparatus 110 may continuously capture both images and sound in the surround environment of user 100. The captured image data may be analyzed continuously, while the captured sound data may be analyzed based on detection of a trigger resulting from the analysis of the image data. FIG. 19B shows a flow chart of an exemplary method 1950 based on analysis of both image and sound data for selecting personalized content.

In step 1952, wearable apparatus 110 may capture both image and sound data using image sensor 220 and audio sensor 1702, respectively. The captured image and sound data may be stored in a buffer of memory 550a.

In step 1954, image analysis module 1710 may analyze the capture image data, similar to step 1914.

In step 1956, image analysis module 1710 may, based on the analysis of the capture image data, recognize a trigger. For example, the trigger may be a hand-related trigger, as described above. The trigger may also include OCR result and recognition of scene, place, person, object, time, etc.

In step 1958, audio analysis module 1720 may analyze sound data after the trigger is recognized. For example, after the trigger is recognized, sound data recorded a predetermined time period before and/or after the trigger may be analyzed to identify user behavior(s). Sound data recorded before the trigger may be obtained from the buffer if memory 550a and transmitted to computing device 120. Sound data recorded after the trigger may be transmitted to computing device 120 as the sound is being recorded. The predetermined time period may be 5 seconds, 10 seconds, 30 seconds, 60 seconds, etc. Audio analysis module 1720 may analyze the sound data to extract information relating to user behavior. For example, user 100 may listen to music at a concert hall. After hearing an excellent solo performed by a violinist, user 100 may use his/her hand to gently point to the violinist, which may be recognized as a trigger. After the trigger is detected, audio analysis module 1720 may retrieve the sound recording in the past 60 seconds from memory 550a (e.g., wearable apparatus 110 may transmit the sound data to computing device 120), and analyze the sound recording to determine, for example, the information of the music. The analysis result may then be used to select personalize content, such as a music CD containing the same or similar music performed by the violinist, to user 100.

Step 1960 is similar to step 1916, except that step 1960 may include user behavior determination based on both image and sound data. For example, in the above example in which user 100 is at the concert hall listening to music, both images of the concert hall and sound of the music may be used by behavior identification module to identify user behavior.

Steps 1962 and 1964 are similar to steps 1918 and 1920, respectively. Therefore, detailed description of these two steps are omitted.

The above methods (e.g., method 1900 and 1950) may further include other steps or processes disclosed herein but not presented in FIGS. 19A and 19B, such as those discussed above in connection with any of the other figures in this disclosure.

Content Selection Based on Analysis of Information from Multiple Wearable Systems Some embodiments of the present application may involve systems, methods, and software products for analyzing information collected by a plurality of wearable camera systems and selecting at least one content item based on statistical data determined from the analysis. As used herein, the term "content item" includes any data, media, substance, or material suitable for conveying information that is useful, pertinent, or relevant to one or more users. Exemplary content items may include an advertisement, a promotion for sales (e.g., a coupon), a recommendation or review of services or products, a product description, an article or any form of text, an image, an audio clip, a video, a sign, a signal of notification or alert, or any other suitable form of information that can be sensed or experienced by the user. The term "wearable camera system" refers to wearable apparatus 110 or a combination of wearable apparatus 110 and computing device 120. As shown in FIG. 2, in some embodiments, wearable apparatus 110 may be paired with computing device 120 and computing device 120 may transmit/receive data to/from server 250. In other embodiments, wearable apparatus 110 may transmit/receive data to/from server 250 directly via network 240.

Figure 20A:
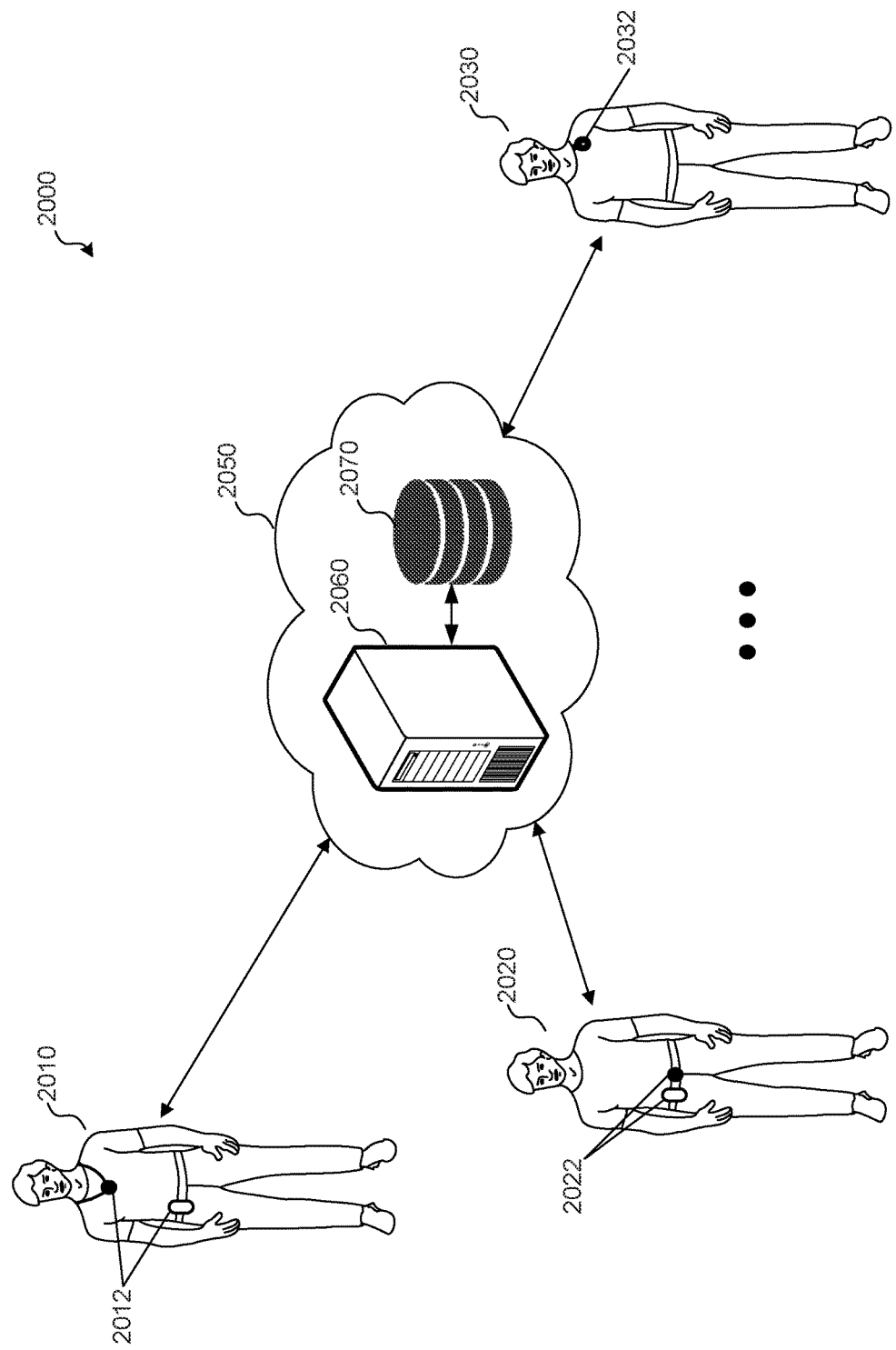
FIG. 20A is a block diagram of an exemplary embodiment of a system for analyzing information collected by a plurality of wearable systems.

FIG. 20A is a schematic illustration of an exemplary system 2000 for analyzing information collected by a plurality of wearable camera systems. Referring to FIG. 20A, a plurality of users, such as 2010, 2020, and 2030, may use various wearable camera systems, such as systems 2012, 2022, and 2032. Some wearable camera systems, for example systems 2012 and 2022, may include both wearable apparatus 110 and computing device 120. Other wearable camera systems, such as system 2032, may include wearable apparatus 110 but not computing device 120. The various wearable camera systems may also be worn in different fashions. For example, wearable camera system 2012 may be worn similar to the embodiment shown in FIG. 1B, wearable camera system 2022 may be worn similar to the embodiment shown in FIG. 1C, and wearable camera system 2032 may be worn similar to the embodiment shown in FIG. 9.

System 2000 may include a cloud 2050 configured to collect data from the plurality of wearable camera systems via respective communication links. The term "cloud" refers to a computer platform that provides services via a network, such as the Internet. Cloud 2050 may include one or more servers, such as server 2060. In some embodiments, server 2060 may be the same as server 250. In other embodiments, server 2060 may be a separate or a different server from server 250. Cloud 2050 may also include a database 2070. Database 2070 may be part of server 2060 or separate from server 2060. When database 2070 is not part of server 2060, database 2070 and server 2060 may exchange data via a communication link.

Figure 20B:
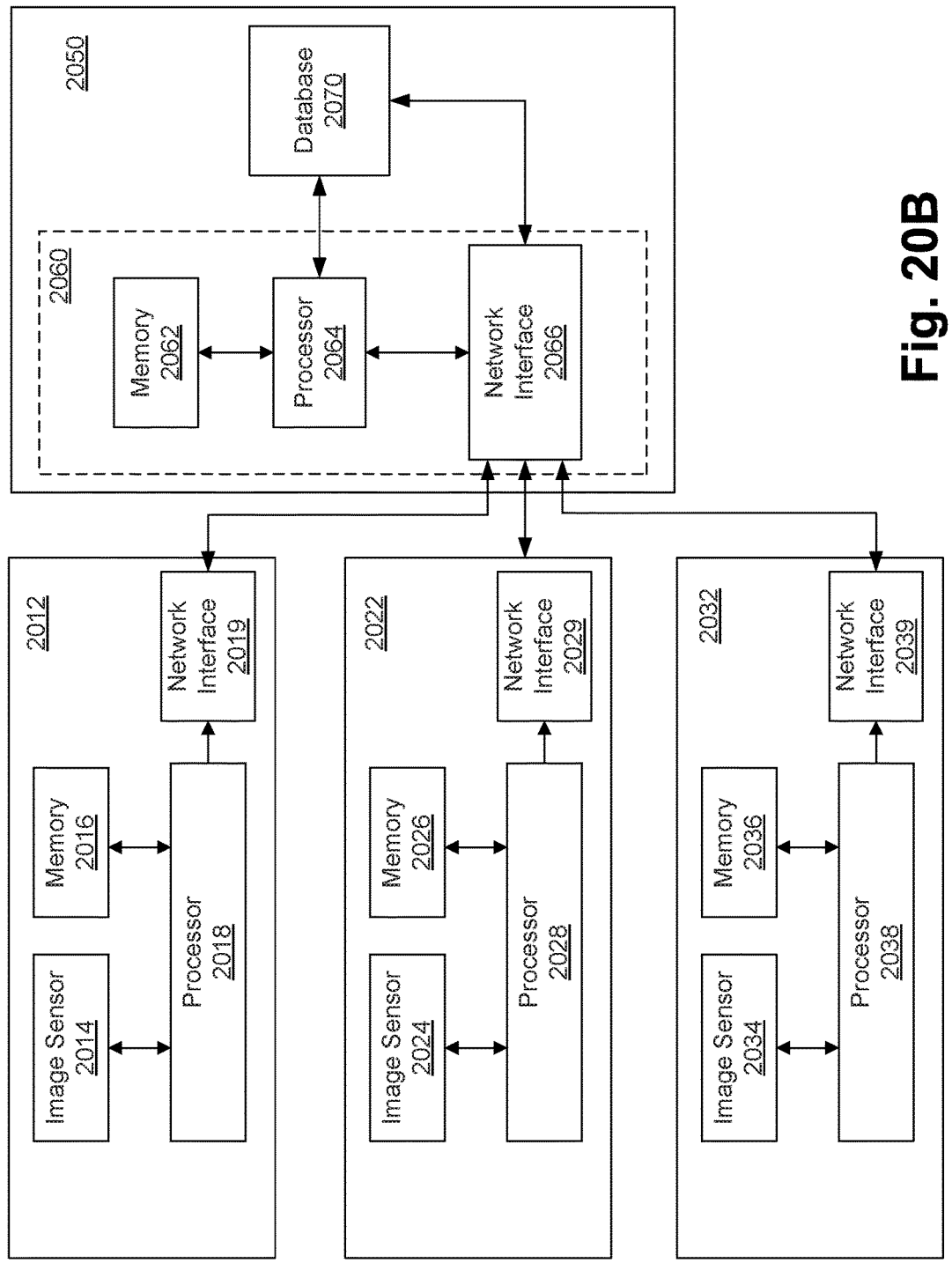
FIG. 20B is a block diagram illustrating an example of the components involved in the system shown in FIG. 20A.

FIG. 20B is a block diagram of an example of the components involved in system 2000. Referring to FIG. 20B, system 2000 may include cloud 2050. Cloud 2050 may include server 2060 and database 2070. Server 2060 may include a processor 2064, a memory 2062, and a network interface 2066. Processor 2064 may include any processing devices suitable for a computer server. Similarly, memory 2062 may include any memory devices and/or storage devices suitable for a computer server. Network interface 2066 may include any suitable network adaptors, such as wired or wireless network adaptors, optical network adaptors, telecommunication network adaptors, satellite network adaptors, etc. Database 2070 may include any suitable databases, ranging from small databases hosted on a work station to large databases distributed among data centers. As describe above, database 2070 may be part of server 2060 or may be separate from server 2060. In some embodiment, cloud 2050 may be implemented using virtual machines, in which server 2060 and/or database 2070 may not correspond to individual hardware. Instead, computational and/or storage capabilities may be implemented by allocating appropriate portions of the desirable computation/storage power from a scalable repository, such as a data center or a distributed computing environment. Therefore, server 2060 is depicted using dashed lines, indicating that the block diagram is a functional representation of server 2060, but not necessarily a structural representation.

Cloud 2050 may communicate with the plurality of wearable camera systems via respective networks, such as network 240 shown in FIG. 2. Each wearable camera system may be equipped with a network interface to transmit data to cloud 2050. For example, wearable camera system 2012 may include wearable apparatus 110 and computing device 120, and may include components similar to those shown in FIG. 5C. Wearable camera system 2012 may include a network interface 2019 to communicate with network interface 2066 of cloud 2050. Network interface 2019 may be provided by computing device 120, and may include a wireless network interface (e.g., WiFi), a telecommunication interface (e.g., 2G, 3G, 4G, 5G, LTE), or other suitable network interfaces. In some embodiments, network interface 2019 may include wireless transceiver 530b. Similarly, wearable camera system 2022 may also include wearable apparatus 110 and computing device 120, and may include components similar to those shown in FIG. 5C. Wearable camera system 2022 may include a network interface 2029, which may be similar to network interface 2019. Wearable camera system 2032, on the other hand, may include wearable apparatus 110 but not computing device 120. Wearable camera system 2032 may include a network interface 2039, which may be provided by wearable apparatus 110. For example, network interface 2039 may include a wireless network interface (e.g., WiFi), a telecommunication interface (e.g., 2G, 3G, 4G, 5G, LTE), or other suitable network interfaces. In some embodiments, network interface 2039 may include wireless transceiver 530 shown in FIGS. 5A and 5B or wireless transceiver 530a shown in FIG. 5C.

Each wearable camera system may include an image sensor to capture image data. For example, wearable camera system 2012 may include an image sensor 2014, which may be similar to image sensor 220 shown in FIG. 5C. In another example, wearable camera system 2022 may include an image sensor 2024, which may include two individual sensors, similar to image sensors 220a and 220b shown in FIG. 5B. In a third example, wearable camera system 2012 may include an image sensor 2014, which may be similar to image sensor 220 shown in FIG. 5A. The plurality of wearable camera systems may use the same or different image sensors. Any above-described image sensors, or any combination thereof, can be used by the plurality of wearable camera systems.

Each of the plurality of wearable camera systems may include a processor and a memory. For example, wearable camera system 2012 may include processor 2018 and memory 2016, wearable camera system 2022 may include processor 2028 and memory 2026, and wearable camera system 2032 may include processor 2038 and memory 2036. For paired systems including both wearable apparatus 110 and computing device 120, such as wearable camera systems 2012 and 2022, processor 2018/2028 may include both processor 210 and processor 540 shown in FIG. 5C, and memory 2016/2026 may include both memory 550a and memory 550b shown in FIG. 5C. For wearable camera systems including wearable apparatus 110 but not computing device 120, such as wearable camera system 2032, processor 2038 may include processor 220 shown in FIG. 5A, and memory 2036 may include memory 550 shown in FIG. 5A.

Figure 21:
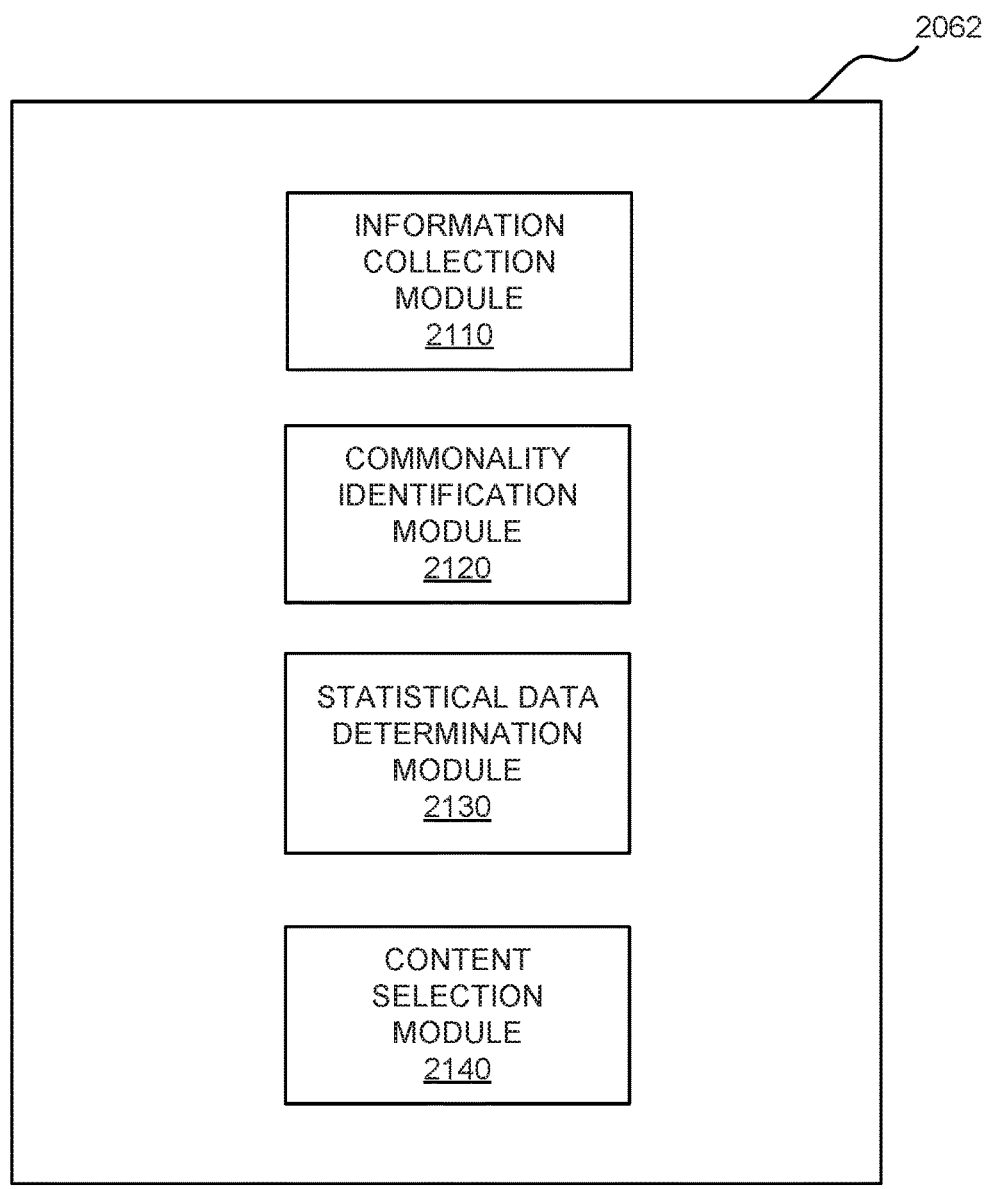
FIG. 21 is a block diagram of an exemplary memory of the system shown in FIG. 20A storing software modules.

FIG. 21 is a block diagram of exemplary software modules stored in memory 2062. As shown in FIG. 21, the exemplary software modules include an information collection module 2110, a commonality identification module 2120, a statistical data determination module 2130, and a content selection module 2140. Software modules shown in FIG. 21 may contain software instructions for execution by at least one processing device, e.g., processor 2064. Information collection module 2110, commonality identification module 2120, statistical data determination module 2130, and content selection module 2140 may cooperate to provide content selection based on statistical analysis of a population of users of the wearable camera systems.

Information collection module 2110 may contain software instructions executable by processor 2064 to receive, from the plurality of wearable camera systems (e.g., 2012, 2022, 2032) or from a middle/third system, information derived from image data captured by the wearable camera systems. In some embodiments, after the image sensor (e.g., 2014/2024/2034) of a wearable camera system captures one or more images, the processor (e.g., 2018/2028/2038) of the wearable camera system may derive information from the captured image(s). Information may be derived from the captured image(s) include a behavior or habit of the user, an event attended by the user, a produced used or purchased by the user, a place visited by the user, a food or beverage ordered or consumed by the user, etc. As used herein, the term "behavior" refers to the way in which user 100 acts or conducts him/herself, including a regular or normal practice of tendency (e.g., a habit), interaction with others, a pattern or way of work, life, eating, drinking, moving, driving, exercising, entertaining, etc. In some cases, a user's behavior may also include acts or conducts that are irregular or abnormal.

For example, after image sensor 2014 captures one or more images of user 2010 visiting a coffee shop to buy coffee, processor 2018 may derive, based on the image(s) of the coffee shop, the coffee, and/or other images captured during the visit, information about the coffee shop, such as the name/brand of the coffee shop, location of the coffee shop, whether the coffee shop is an independent shop or a chain shop, etc.; information about the coffee, such as the type of the coffee, size of the coffee, price of the coffee, whether the coffee includes milk/cream/sugar, etc.; and information of user 2010, such as the time of visiting the coffee shop, route to the coffee shop, whether user 2010 is walking or driving, method of payment (e.g., by credit card, check, cash, or mobile payment), etc. The derived information may be transmitted by wearable camera system 2012 to cloud 2050 and received by processor 2064 for analysis. In some embodiments, wearable camera system 2012 may transmit image data to a middle system, such as a work station (e.g., a home computer of user 2010), a server (e.g., a web storage for hosting images of user 2010), or a preprocessing device between wearable camera system 2012 and cloud 2050. Cloud 2050 may then receive derived information from the middle system.

In some embodiments, database 2070 may store profiles of users of the wearable camera systems. A user profile may be established around the time when a user obtains a wearable camera system, or at any time thereafter. For example, after user 2010 purchases wearable camera system 2012, user 2010 may register wearable camera system 2012 by creating a personal profile. The profile may include demographic characteristic data of user 2010, including age, income, geographical location, etc. After the profile is established, wearable camera system 2012 may be associated with the profile of user 2010. Thereafter, data communication to/from wearable camera system 2012 may be stored under the profile of user 2010. For example, the derived information received from wearable camera system 2012 may be stored in database 2070 under or in association with the profile of user 2010.

In some embodiments, cloud 2050 may receive information derived from image data captured by a plurality of wearable camera systems (e.g., systems 2012, 2022, and 2032). For example, the received information may include the brand name of coffee shop A visited by user 2010 and brand name of coffee shop B visited by both user 2020 and 2030, which are derived from image(s) captured by the respective wearable camera systems 2012, 2022, and 2032. In another example, the receive information may include an event venue visited by the three users. The information derived from image(s) captured by the wearable camera system of an individual user may provide valuable insights to the behavior, habit, taste, tendency, or other traits or characteristic of the individual user. System 2000 may collect such information from a population of users and perform statistical analysis to the collected information to provide customized content item(s) to a group of users sharing a certain commonality.

Commonality identification module 2120 may contain software instructions executable by processor 2064 to analyze the derived information to identify a commonality related to the image data captured by at least two of the wearable camera systems. In some embodiments, the commonality may include a behavior or a habit of two or more users of the wearable camera systems. For example, commonality identification module 2120 may identify that, based on derived information, that users 2020 and 2030 both regularly visit coffee shops of the same brand, users 2020 and 2030 may share the same or similar loyalty to that coffee shop brand; or both users like the taste of the coffee made by that coffee shop brand; or, if the coffee shop is on the way to work for both users, convenience may be the commonality of the two users.

In some embodiments, the commonality may include an event attended by two or more users of the wearable camera systems. For example, one or more of the three users 2010, 2020, and 2030 may attend the same concert. Their respective wearable camera systems may capture images of the concert and, based on the captured images, derive the name/venue of the concert. The derived information may be collected by cloud 2050. Processor 2064 may analyze the derived information and identify a commonality that the three users attend the same concert. The three users may or may not know each other. However, through the images their wearable camera systems captured, system 2000 may be able to identify the commonality among these users.

In some embodiments, the commonality may include a product associated with (e.g., used or purchased by) two or more users of the wearable camera systems. For example, user 2020 and user 2030 may not know each other and live in different places. But both may purchase a smart phone of the same brand and model. While they are making the purchase of the smart phone and/or using the phone, their respective wearable camera systems 2022 and 2032 may capture images of the smart phone and derive information of the smart phone, such as the brand and model of the smart phone. Cloud 2050 may receive the derived information and identify a commonality between user 2020 and 2030, that they both purchased the same smart phone.

In some embodiments, the commonality may include a demographic characteristic of two or more users of the wearable camera systems. For example, commonality identification module 2120 may obtain demographic characteristic data from the profiles of users of the wearable camera systems, such as age, income, and/or a geographical location. Based on the demographic characteristic data, commonality identification module 2120 may identify that, for example, a certain number of users in their forties regularly visit a particular brand of coffee shop, or a certain number of users having an annual income higher than $100,000 bought a particular brand of smart phone during a certain time period, or a certain number of users living in a particular geographical location regularly visit a particular concert hall.

Statistical determination module 2130 may contain software instructions executable by processor 2064 to determine, based on the commonality, statistical data related to users of the at least two of the wearable camera systems. For example, based on the commonality that X number of users in their forties and Y number of users in their thirties regularly visit coffee shop brand A, and X is much larger than Y, statistical determination module 2130 may determine that users in their forties may be more interested in coffee shop brand A than users in their thirties. In another example, based on the commonality that X number of users having an annual income higher than $100,000 and Y number of users having an annual income between $50,000-$100,000 bought smart phone brand B during the first two weeks of product release, and X is much smaller than Y, statistical determination module 2130 may determine that smart phone brand B may be more appealing to users having an annual income between $50,000-$100,000 than those with higher incomes. In a third example, based on the commonality that X number of users living in town C and Y number of users living in town D regularly visit a famous concert hall M, and X is larger than Y, statistical determination module 2130 may determine that users living in town C may be more interested in spending money to buy tickets to concert hall M.

Content selection module 2140 may contain software instructions executable by processor 2064 to select, based on the statistical data, at least one content item for at least one of the users of the wearable camera systems who share the commonality. For example, based on the statistical data that users in their forties may be more interested in coffee shop brand A than users in their thirties, content selection module 2140 may select discount coupons of coffee shop brand A to be distributed to users in their thirties to attract them to visit coffee shop brand A, or distribute coupons having heavier discounts to users in their thirties than users in their forties. In another example, based on the statistical data that smart phone brand B may be more appealing to users having an annual income between $50,000-$100,000 than those with higher incomes, content selection module 2140 may select product introduction materials or advertisements to distribute to users having incomes higher than $100,000. In a third example, based on the statistical data that users living in town C may be more interested in spending money to buy tickets to concert hall M, content selection module 2140 may select multimedia promotional products from concert hall M to be sent to users living in town C to appreciate their support and to maintain their loyalty. In some embodiments, the content item may be selected for any one user sharing a commonality with other users. In some embodiments, the content item may be selected for multiple users sharing a commonality.

Figure 22:
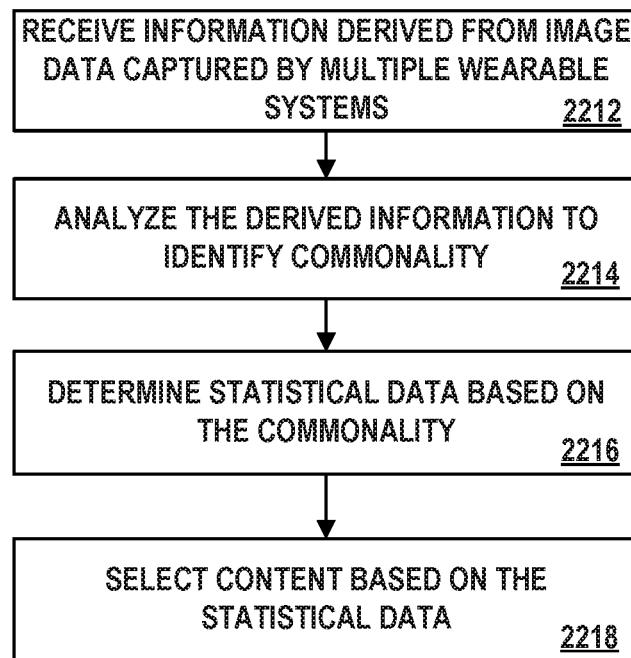
FIG. 22 is a flow chart of an exemplary method for analyzing information collected by a plurality of wearable systems.

FIG. 22 is a flow chart of an exemplary method 2200 for analyzing information collected by a plurality of wearable camera systems. Method 2200 starts from step 2212, in which processor 2064 of cloud 2050 may obtain, from the plurality of wearable camera systems (e.g., 2012, 2022, 2032) or from a middle system, information derived from image data captured by the wearable camera systems. For example, information derived from image data captured by the wearable camera systems may include a behavior or habit of the user, an event attended by the user, a produced associated with the user, a place visited by the user, a food or beverage ordered or consumed by the user, etc.

In step 2214, processor 2064 may analyze the derived information to identify a commonality related to the image data captured by at least two of the wearable camera systems. For example, the commonality may include a behavior or habit of two or more users, an event attended by two or more users, a product associated with two or more users, a demographic characteristic of two or more users.

In step 2216, processor 2064 may determine statistical data based on the commonality. The statistical data may include the likelihood of certain behavior of certain group of users, comparison among different groups of users, etc.

In step 2218, processor 2064 may select, based on the statistical data, at least one content item for one or more users sharing a certain commonality. For example, the content item may include a coupon, a product description, an advertisement, a video, or an audio clip. The content item may be transmitted to a wearable device of the users, to an email account of the users, be included in a mail item being sent to the users, and/or incorporated into a video or audio program watched or listened to by the users, for example, via a streaming video or audio service over the Internet, a program being watched or listened to by one or more of the users over a cable or satellite or television service, and/or displayed (e.g., on a display device) at an event or venue (e.g., an athletic event, theater, movie theater, etc.) attended by the users. For example, data collected by the wearable camera systems may be used to identify locations and/or events attended by the users sharing the commonality. In some embodiments, the system may access data (e.g., calendars, schedules, ticket purchasing histories, etc.) of the users in order to identify locations attended by the users and/or where products and/or services are purchased the users, and then provide the content item to the users at the locations.

Further, in some embodiments, in addition to transmitting the selected content item to wearable apparatus 110 or computing device 120, information based on the selected content item may be provided via wearable apparatus 110 or computing device 120. For example, wearable apparatus 110 may provide information based on a selected content item (e.g., a message indicating that the content item is available through an email account or a website, etc., via, for example, audio output). As another example, computing device 110 may provide information (e.g., text, graphics, video, and/or audio) based on the selected content item.

The above method (e.g., method 2200) may further include other steps or processes disclosed herein but not presented in FIG. 22, such as those discussed above in connection with any of the other figures in this disclosure.

Identifying Exposure to a Recognizable Item

In some embodiments, wearable apparatus 110 may collect information related to brand exposure, and that information may be analyzed to determine relative brand exposure for an individual or a target population. For example, based on image analysis, wearable apparatus 110 may determine that a particular individual is exposed to a particular brand of product more frequently than another brand. In some embodiments, the analysis may consider an individual and/or population's exposure to a particular product, logo, or advertisement. Further, data representing the user's exposure may be transmitted to another device (e.g., a smartphone, tablet, watch, smartwatch, computer, etc.) and/or a server for analysis and/or reporting to the user and/or other parties.

Figure 23:
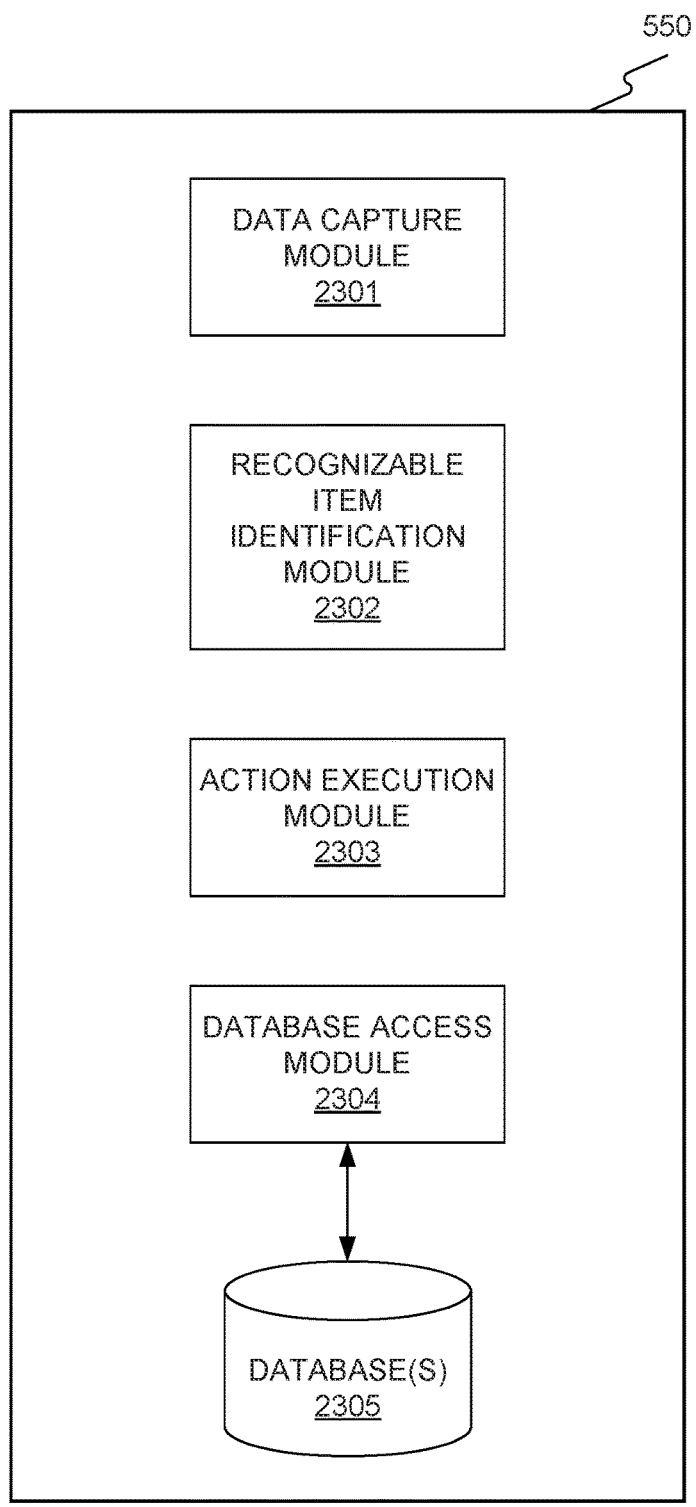
FIG. 23 illustrates an exemplary embodiment of a memory containing software modules consistent with the present disclosure.

FIG. 23 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 23.

As illustrated in FIG. 23, memory 550 may store software instructions to execute a data capture module 2301, a recognizable item identification module 2302, an action execution module 2303, a database access module 2304, and may also include database(s) 2305. Data capture module 2301 may include software instructions for receiving data from wearable apparatus 110. Recognizable item identification module 2302 may include software instructions for analyzing data obtained by wearable apparatus 110 to identify subsets of the captured data including the recognizable item and information associated with the recognizable item. Action execution module 2303 may include software instructions to cause the occurrence of an action based on the information associated with the recognizable item identified in the acquired data. Database access module 2304 may include software instructions executable to interact with database(s) 2305, to store and/or retrieve information.

Data capture module 2301 may include software instructions for receiving data from a wearable apparatus, such as a wearable camera system. Data received from a wearable camera system may include audio and image data, captured, by, for example, an image sensor or microphone associated with the wearable camera system. Image data may include raw images and may include image data that has been processed. Raw images may be provided, for example, in the form of still images and video data, either with or without embedded metadata. In some embodiments, image data and audio data may be preprocessed prior to capture by data capture module 2301. Preprocessing may include, for example, noise reduction, artifact removal, compression, and other image pre-processing techniques.

Recognizable item identification module 2302 may be configured to analyze data captured by data capture module 2301 to detect or identify a subset of the captured data that includes a recognizable item. In some embodiments, module 2302 may be configured to receive a plurality of images and to identify one or more of the plurality of images that include the recognizable item. For example, the module 2302 may receive a plurality of images of an environment surrounding a user wearing the wearable device 110 and identify which of the plurality of images include products associated with a given brand (e.g., cola beverages of a given brand of cola). The recognizable item may include, for example, a product, an advertisement, a logo, a brand symbol, and so forth. The recognizable item may take the form of objects, products, words, text, pictures, and any other recognizable feature in an image or series of images. Recognizable items may be detected in still images or in video images. Recognizable items may also be detected based on the relationship of identifiable features with respect to one another in an image or video. For example, a specific product may be deemed to be a recognizable item based on an analysis of the words embedded in particular locations on the product. Specific examples of recognizable items provided herein are exemplary only, and a person of ordinary skill in the art will recognize other recognizable items that remain consistent with the present disclosure.

Recognizable item identification module 2302 may further be configured to analyze the one or more images that include the recognizable item to determine information associated with the recognizable item. The information associated with the recognizable item may include a product name, logo, brand, or type. A type of product may include, for example, shampoo or cereal. A brand of product may include, for example, a specific brand or manufacturer of a product, i.e., the manufacturer of the shampoo or cereal, and a product name may include, for example, the specific name of the manufacturer's shampoo or cereal. For example, in one embodiment, the recognizable item may be sneakers, and the information associated with the recognizable item may be a Nike™ symbol. For further example, in another embodiment, the recognizable item may be a cereal box, and the information associated with the recognizable item may be a Cheerios™ symbol. In another embodiment, the recognizable item may be a beverage container, and the associated information may be a CocaCola™ symbol.

Action execution module 2303 may be configured to perform a specific action in response to the identification of one or more images including the recognizable item. For example, the action execution module 2303 may, for each image in the one or more images including the recognizable item, identify the user of the wearable apparatus. In some embodiments, action execution module 2303 may identify the user via database access module 2304. Database access module 2304 may be configured to access database(s) 2305, for example, to retrieve or store data associated with the image data captured via data capture module 2301. For example, action execution module 2303 may access databases 2305 to identify metadata associated with the images including the recognizable item, and use the metadata to identify the user of the wearable apparatus 110. However, in other embodiments, action execution module 2303 may receive information identifying the user of the wearable apparatus 110 from any suitable source, such as via an input device (e.g., a keyboard, graphical user interface, etc.) accessed by the user of the wearable apparatus.

Action execution module 2304 may further be configured to transmit the information identifying the user of the wearable apparatus and/or the information associated with the recognizable item to an external device for further processing of the information, as described in more detail below. However, in other embodiments, action execution module 2303 may be configured to further process the information identifying the user of the wearable apparatus 110 and/or the information associated with the recognizable item. For example, action execution module 2304 may be configured to determine a relative exposure level of the user of the wearable apparatus 110 to particular brands of a given product. In another example, action execution module 2304 may be configured to determine the number of unique items of particular brands of a given product the user of the wearable apparatus 110 is exposed to. In one embodiment, action execution module 2304 may determine what percentage of the one or more images including the recognizable item are associated with a first brand (e.g., CocaCola™) and what percentage are associated with a second brand (Pepsi™). However, in other embodiments, such analysis may be performed by an external device to which action execution module 2303 transmits information.

Database 2305 may be configured to store any type of information of use to modules 2301-2304, depending on implementation-specific considerations. For example, in embodiments in which action execution module 2303 is configured to determine the information identifying the user of the wearable apparatus 110, database 2305 may store the metadata associated with the captured images. In some embodiments, database 2305 may store the one or more images of the plurality of captured images that include the recognizable information. Indeed, database 2305 may be configured to store any information associated with the functions of modules 2301-2304.

Modules 2301-2304 may be implemented in software, hardware, firmware, a mix of any of those, or the like. For example, if the modules are implemented in software, they may be stored in memory 550, as shown in FIG. 6. However, in some embodiments, any one or more of modules 2301-2304 and data associated with database 2305, may, for example, be stored in processor 540 and/or located on server 250, which may include one or more processing devices. Processing devices of server 250 may be configured to execute the instructions of modules 2301-2304. In some embodiments, aspects of modules 2301-2304 may include software, hardware, or firmware instructions (or a combination thereof) executable by one or more processors, alone or in various combinations with each other. For example, modules 2301-2304 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 24:
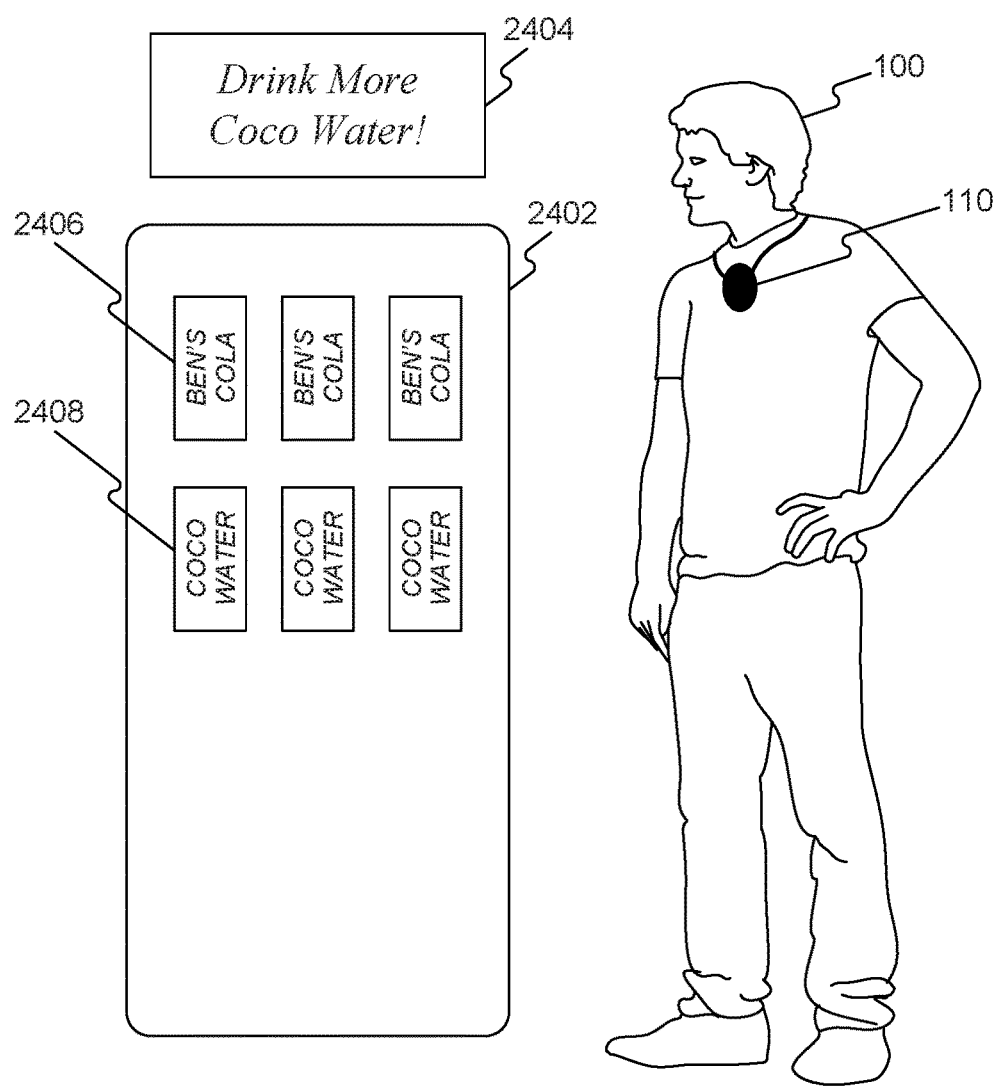
FIG. 24 shows an example environment including a wearable apparatus for capturing and processing images.

FIG. 24 shows an example environment including wearable apparatus 110 for capturing and processing images. In the depicted embodiment, user 100 may wear wearable apparatus 110 on his or her neck. However, in other embodiments, wearable apparatus 110 may be differently positioned in any suitable location to enable capture of images of the user's environment, such as the locations explained in detail above. User 100 may be at a convenience store, grocery store, or other type of store. Wearable apparatus 110 may capture a plurality of images depicting the environment to which the user is exposed while user 100 is shopping in the store. For example, wearable apparatus 110 may capture images that include display case 2402 and/or advertisement 2404 mounted above display case 2402. The images may show that the user 100 is exposed to recognizable items, such as beverages 2406 and 2408. The beverages 2406 may be a first brand, such as Ben's Cola, and the beverages 2408 may be a second brand, such as Coco Water. The advertisement 2404 may be promoting a particular brand of product, such as Coco Water. The images depicting the exposure of user 100 to particular recognizable items may be included in a log saved in database 2305.

FIG. 24 shows user 100 being exposed to display case 2402. However, as would be understood by one of ordinary skill in the art, wearable apparatus 110 may capture images throughout the user's day at a variety of locations as the environment surrounding the user changes. For example, images may be captured when the user visits a restaurant for dinner, commutes to and from work, attends social events, etc. In this way, wearable apparatus 110 may be configured to monitor the environment surrounding user 100 throughout the user's activities to identify exposure to recognizable items throughout the time user wears wearable apparatus 110.

Figure 25A:
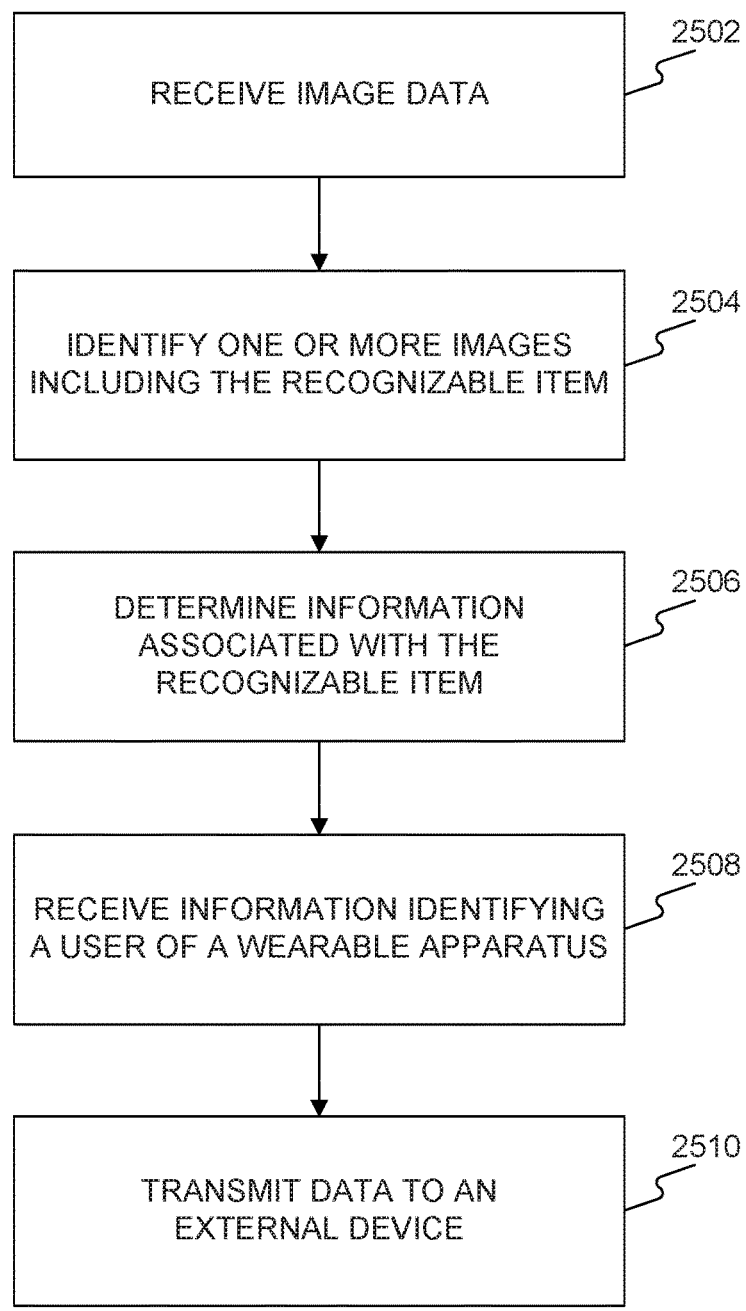
FIG. 25A is a flowchart illustrating an exemplary method for transmitting information associated with a recognizable item.

FIG. 25A illustrates a flowchart of an exemplary method 2500 for identifying exposure to a recognizable item, consistent with embodiments of the present disclosure. The method 2500 may be carried out, for example, by a processing device integrated with and/or associated with wearable apparatus 110. In such an embodiment, wearable apparatus 110 may include a wearable image sensor, e.g. image sensor 220, configured to capture a plurality of images from the environment of the user. For exemplary purposes only, the method 2500 for identifying exposure to a recognizable item is described herein with respect to processing device 210 cooperating with memory 550 to execute modules 2301-2304.

In accordance with the method 2500, the processor 210 may receive image data captured by a wearable image sensor at block 2502. Block 2502 may be facilitated by software instructions of data capture module 2301. Data capture module 2301 may be configured to execute instructions to receive image data from a wearable image sensor, and may also be configured to execute instructions to control the wearable image sensor. Controlling the wearable image sensor may include issuing commands to record images and/or videos, and may also include issuing commands to control an orientation or direction of viewing of the image sensor.

Received image data may be processed via software steps executed by recognizable item identification module 2302. For example, at block 2504, recognizable item identification module 2302 may identify one or more images including the recognizable item from a plurality of captured images. For example, the recognizable item may be a beverage product, and the module 2302 may analyze the plurality of images to identify a subset of the captured images that include items sized, shaped, or otherwise resembling a beverage product. In another embodiment, the recognizable item may be footwear products, and the module 2302 may identify a subset of the captured images that include footwear products, for example, on display cases in stores. In another example, at block 2504, recognizable item identification module 2302 may identify unique instances of the recognizable item appearing in the plurality of captured images.

At block 2506, the recognizable item identification module 2302 may further analyze the subset of the captured images including the recognizable item to determine information associated with the recognizable item. The information associated with the recognizable item may include a product name, a product logo, a product type, or any other identifier of the given product. For example, the module 2302 may identify a subset of ten images that include the recognizable item in the form of a beverage product. The module 2302 may then further analyze that subset of images to identify that two of the ten images include CocaCola™ brand products, and the remaining eight images include Pepsi™ products. In this example, the information associated with the recognizable item (i.e., beverage product) may be the logo associated with a given brand of cola product. In this way, the method 2500 may include identifying a subset of images including the recognizable item and analyzing those images to identify information indicative of the exposure a user of wearable apparatus 110 has to a given brand. In some embodiments, the information associated with the recognizable item may include an image or a portion of an image. The image may include at least a portion of the recognizable item. In other embodiments, the image may include an environment, and the image may have been captured within a threshold amount of time (e.g., 1 second, 5 seconds, 10 seconds, etc.) after wearable apparatus 100 capturing an image including at least a portion of the recognizable item.

At block 2508, the method 2500 may further include receiving information identifying a wearer of wearable apparatus 110 from which the captured images were acquired. The information identifying the user of the wearable apparatus may include the user's name, a code identifying the user, information identifying a profile of the user, at least one demographic characteristic of the user (e.g., age, income, and/or geographical location), or any other identifying information. For example, in one embodiment, action execution module 2303 may access databases 2305 via database access module 2304 to receive the metadata associated with the subset of the plurality of images including the recognizable item. In other embodiments, the information identifying the wearer of wearable apparatus 110 may be input by the wearer, for example, via a keyboard, graphical user interface, or other suitable input device. Still further, in other embodiments, action execution module 2303 may be configured to perform image analysis on one or more captured images of the wearer to identify the wearer. In other embodiments, action execution module 2303 may determine the identity of the wearer based on device registration information provided by the wearer when setting up an account on the wearable device or a device capable of communicating with the wearable device (e.g., a cellphone, tablet, laptop, or other mobile or fixed electronic device). Indeed, presently contemplated embodiments include any suitable method for receiving or determining the information identifying the user of wearable apparatus 110.

In the embodiment illustrated in FIG. 25A, at block 2510, the data including the information associated with the recognizable item and the information identifying the user of the wearable apparatus is transmitted to an external device. The external device may be a smartphone, tablet, smartwatch, laptop, server, or any other suitable device configured to process the transmitted data. To that end, the external device and the wearable apparatus may include suitable components to enable data transfer between the wearable apparatus and the external device. For example, in one embodiment, the wearable apparatus may include a transmitter configured to enable wireless pairing with a receiver located in the external device. In such embodiments, the wearable apparatus and the external device may be reversibly or irreversibly paired to enable exclusive data transfer between the two devices. The pairing may be established by the user of the wearable apparatus and external device, or may be automatically performed when the wearable apparatus and the external device are within a given distance from one another (e.g., within a range such that the transmitter and receiver are capable of exchanging data).

However, in other embodiments, the transfer of data to the external device at block 2510 may be omitted from method 2500, and further processing of the data may be performed by the wearable apparatus 110, for example, in action execution module 2303. That is, either the action execution module 2303 or the external device may perform one or more of the steps in method 2520 shown in FIG. 25B for determining the exposure level of one or more users to the recognizable item. In embodiments in which the data is transferred from wearable apparatus 110 to the external device, method 2520 includes receiving information associated with the recognizable item and derived from images captured by one or more wearable image sensors. For example, in some embodiments, the external device may be configured to identify exposure to a recognizable item by a population of users of a plurality of wearable camera systems. To that end, the external device may receive data from the plurality of wearable camera systems, each associated with one user of the population of users. As before, the data may include information derived from the captured image data, such as a product name, product logo, or product type.

In order to identify an exposure level of one or more users to the recognizable item, the method 2520 also includes accessing stored data reflecting past occurrences when one or more users were exposed to the recognizable item, at block 2524. For example, the stored data may be stored on databases 2305. The stored data may include raw image data corresponding to images in which the recognizable item was identified or processed image data including statistics specific to each user regarding how many times and/or when each user was exposed to the recognizable item. The stored data may be accessed by utilizing the information identifying the user of the wearable apparatus and locating past image data associated with a given user.

At block 2526, the method 2520 includes determining an exposure level of the one or more users to the recognizable item. In some embodiments, the exposure level of a single user to the recognizable item may be determined. The exposure level may represent a relative or absolute level of exposure to the recognizable item, such as a total number of times a user encountered the recognizable item or a frequency at which the user encounters the recognizable item, the number of unique instances of the recognizable item a user is exposed to, and so forth. The frequency may be measured on the basis of any desired time increment, such as an hourly, daily, monthly, or annual basis. Further, in some embodiments, the method 2520 includes determining an exposure level of the user to the recognizable item as compared to an exposure level of an additional item. The recognizable item and the additional item may each be a different brand. For example, the method 2520 may analyze the captured images to determine the relative brand exposure of the user to CocaCola™ brand items as compared to Pepsi™ brand items.

In other embodiments, the exposure level of a given population of users to the recognizable item may be determined at block 2526. For example, in one embodiment, the population of users may be a particular age group, such as a millennial age group comprised of 18-22 year olds. Each user in the millennial age group may be a user of a camera of the plurality of wearable cameras. The information of all the users in the millennial age group may be aggregated to determine the exposure level of the millennial age group to the recognizable item. In such embodiments, the exposure level may represent an aggregated value of an exposure per unit time for the population of users, or a group of the population of users, of the plurality of wearable cameras. The group of the population of users may include two or more users, three or more users, one hundred or more users, the entire population of users, or any other desired number of users. For example, in one embodiment, the method 2520 may include determining, for each user in the millennial age group, an exposure level to Pepsi™ brand products on a monthly basis. The exposure level of the population of millennial users may then be determined by aggregating the exposure levels of each of the users to determine an aggregated exposure level on a monthly basis for all millennials. The individual exposure levels may be aggregated by averaging, locating a median, or any other suitable data analysis method.

Still further, in other embodiments, method 2520 may include receiving or determining from the captured image data information associated with additional recognizable items, such as a second recognizable item. The information associated with the additional recognizable items, such as the second recognizable item, may be derived from image data captured by one or more of a plurality of wearable camera systems. Method 2520 may then include analyzing the information associated with the second recognizable item to determine a second exposure level of the users to the second recognizable item. As with the initial exposure level, the second exposure level may represent an aggregated value of an exposure per unit time for a group of one or more users. In embodiments in which the exposure level of one or more users to more than one recognizable item are determined, method 2520 may include assessing the first exposure level with respect to the additional exposure level. The assessment may include comparing, contrasting, or otherwise analyzing the exposure levels relative to one another. Still further, in some embodiments, the first exposure level may be associated with a first time period (e.g., the summer months), and the second exposure level may be associated with a second time period (e.g., the fall months).

In some embodiments, actions may include acquiring and storing data from an environment of a user. For example, a user may trigger a wearable apparatus to record data related to their environment by saying "record image and audio for 30 seconds." Actions may also include creating and updating task lists, such as shopping lists, reminder lists, and to-do lists. For example, data capture module 601 may capture an image of a car's gas tank gauge, trigger identification module 602 may analyze the image to determine that the car is low on fuel, and action execution module 603, in response, may create a task for the user to fill the car with fuel. In further embodiments, actions may adjust the settings of a device, such as a smartphone or tablet, controlled by a wearable camera system. For example, ambient noise may trigger a controlled device to increase volume.

Database access module 604 may be configured to access database(s) 605, for example, to retrieve or store images and/or audio data captured via data capture module 601. In some embodiments, database 605 may be configured to store trigger detection related information, such as images, audio, and/or video with which trigger identification module 602 may compare data for trigger detection. Database 605 may be configured to store any type of information of use to modules 601-604.

Figure 25B:
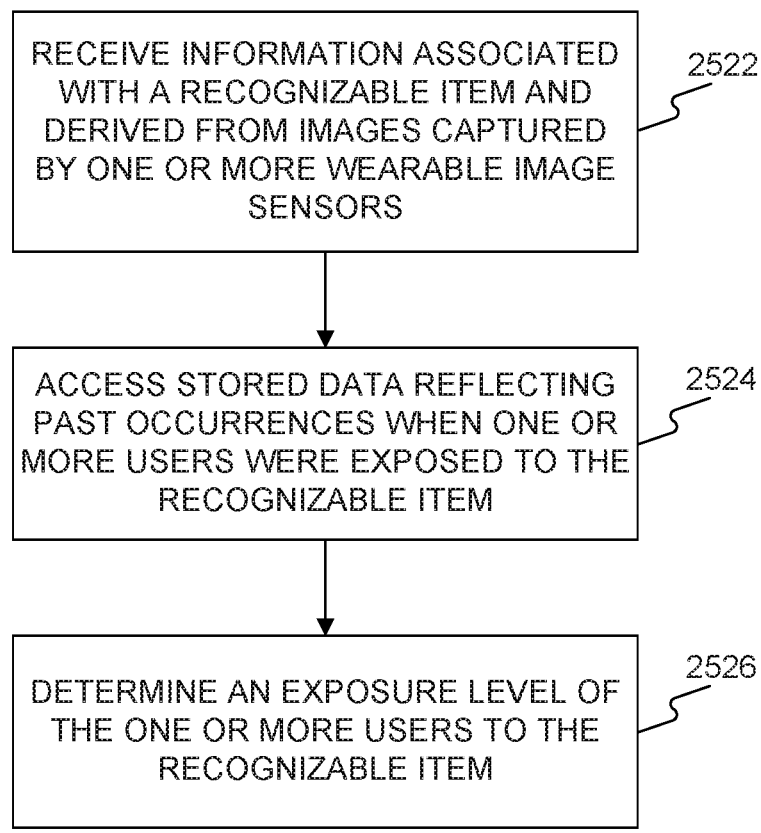
FIG. 25B is a flowchart illustrating an exemplary method for determining an exposure level of one or more users to a recognizable item.

The above methods (e.g., method 2500 and 2520) may further include other steps or processes disclosed herein but not presented in FIGS. 25A and 25B, such as those discussed above in connection with any of the other figures in this disclosure.

Providing Recommendations Based on Tracked Activities

In some embodiments, wearable apparatus 110 may track activities of a user and/or other person who appears in images captured by wearable apparatus 119. Wearable apparatus 119 may analyze and/or classify the images, and send data based on the images to another device (e.g., a smartphone, tablet, smartwatch, computer, etc.). For example, wearable apparatus 110 may track a variety of activities related to a person's diet, wellness, and fitness, and provide recommendations and/or reports based on the tracking. The data gained from this analysis may be used to provide recommendations for health and wellness improvements. for example, the analysis may include determining that a room includes a window with bright light and providing feedback to the user to move a desk to a new position and/or angle to capitalize on the light.

As other examples, in some embodiments, the analysis may include counting the number of exercise repetitions and providing feedback regarding a user's exercise routine, or analyzing food consumed by the user and providing dietary recommendations. Further, wearable apparatus 110 may analyze captured images and classify a particular activity occurring in the image and send data to another device (e.g., a smartphone). The device may then execute an application that provides a graphical representation of activities that the user has engaged in, including, for example, graphs, pie charts, and other visual representations providing feedback regarding the activities. Based on the data received from wearable apparatus 110, the device may provide reminders (e.g., alerts) indicating how the user is doing and whether the goals are being met, and/or how much time is spent engaged in the activity.

Figure 26:
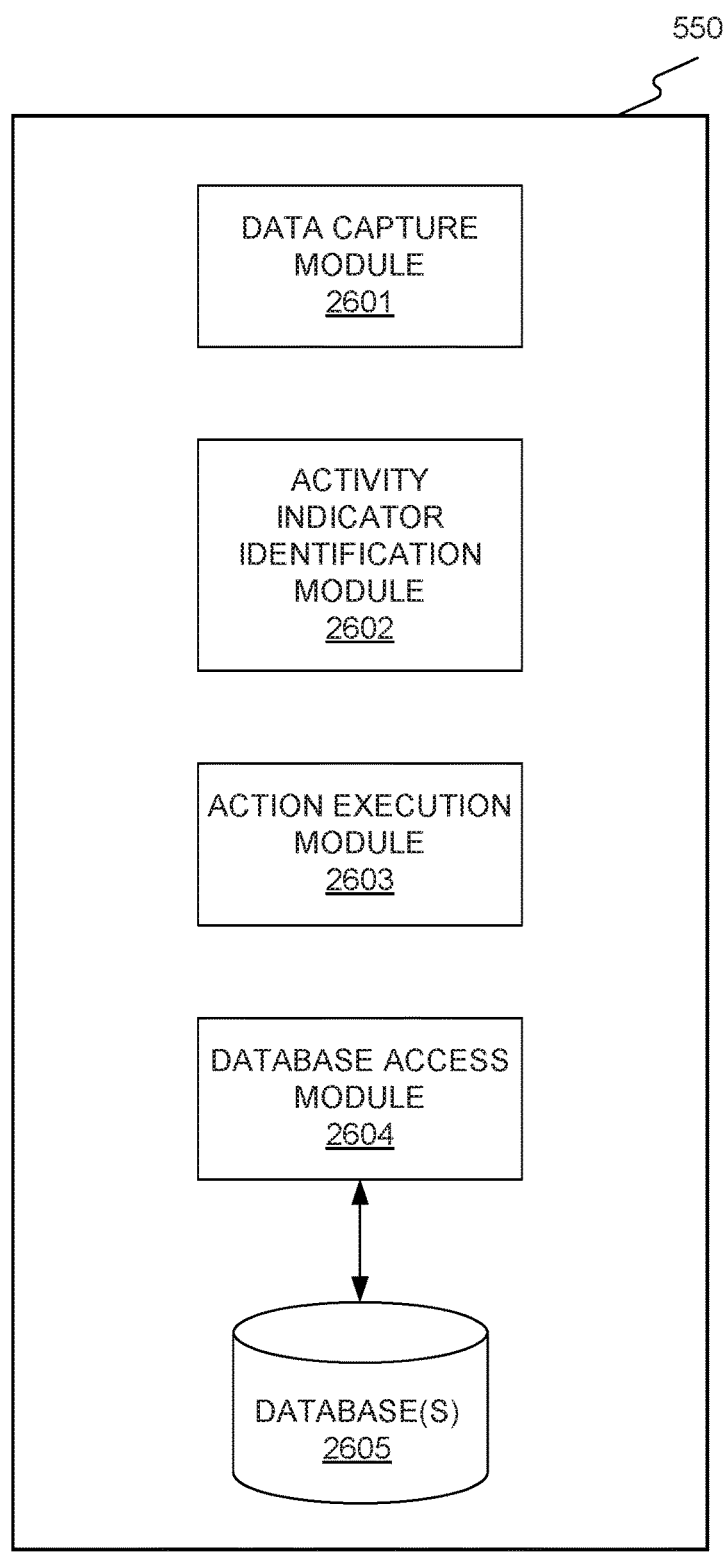
FIG. 26 illustrates an exemplary embodiment of a memory containing software modules consistent with the present disclosure.

FIG. 26 is a diagram illustrating an example of memory 550 storing a plurality of modules, consistent with the disclosed embodiments. The modules may be executable by at least one processing device to perform various methods and processes disclosed herein. Memory 550 may store more or fewer modules than those shown in FIG. 26.

As illustrated in FIG. 26, memory 550 may store software instructions to execute a data capture module 2601, a activity indicator identification module 2602, an action execution module 2603, a database access module 2604, and may include database(s) 2605. Data capture module 2601 may include software instructions for receiving data from wearable apparatus 110. Activity indicator identification module 2602 may include software instructions for analyzing data obtained by wearable apparatus 110 to track the activities of a user of the wearable apparatus 110 or a person appearing in images captured by the wearable apparatus 110. Action execution module 2603 may include software instructions to cause the occurrence of an action based on the tracked activities identified in acquired data. Database module 2604 may include software instructions executable to interact with database or databases 2605, to store and/or retrieve information.

Data capture module 2601 may include software instructions for receiving data from a wearable apparatus, such as a wearable camera system. Data received from a wearable camera system may include audio and image data, captured, by, for example, an image sensor or microphone associated with the wearable camera system. Image data may include raw images and may include image data that has been processed. Raw images may be provided, for example, in the form of still images and video data. In some embodiments, image data and audio data may be preprocessed prior to capture by data capture module 2601. Preprocessing may include, for example, noise reduction, artifact removal, compression, and other image pre-processing techniques.

Activity indicator identification module 2602 may be configured to analyze data captured by data capture module 601 to detect or identify at least one indicator of a monitored activity. Identifying or detecting the at least one indicator of activity may include, for example, the detection of objects, contexts, situations, people, products, words, text, pictures, actions, and any other identifiable feature in an image or series of images. The at least one indicator of activity may include a description, a classification, or a category of activity. For example, the activity may relate to the wellness or health of the user, such as a fitness activity (e.g., running, walking, playing sports, eating healthy foods, etc.). In such an embodiment, the at least one indicator of activity may be a level of intensity of a cardiovascular workout, such as running. In another embodiment, the indicator of activity may be a number of exercise repetitions performed by the user. In another embodiment, the indicator of activity may be an amount of a type of food consumed, such as amounts of vegetables and/or sweets consumed. Further, the at least one indicator of activity may include information related to the surroundings of the user. For example, the information may indicate that the user is at a health club, in a restaurant, sitting on a bus, etc.

The at least one indicator of activity may be detected or identified in still images or in video images, and/or based on the relationship of identifiable features with respect to one another in an image or video. For example, a person's relative position with respect to a point in the distance may indicate that the person is approaching toward the point in the distance and, therefore, engaging in an activity such as walking or running. In some embodiments, the at least one indicator of activity may be audio related, including the detection of certain sounds, speech, and/or speech patterns in audio data. For example, a specific sequence of words may be a trigger, such as an instructor announcing the beginning of a spinning class. Some indicators of activity may include combinations of audio and image indications. For example, a specific image identified in conjunction with a specific sequence of words may be an indicator of a type of activity. For example, an image may indicate that the user is wearing athletic clothing, and an audio recording may indicate that the user is reciting a mantra, indicating that the user is practicing yoga.

Action execution module 2603 may be configured to perform a specific action in response to the identification of at least one indicator of activity. In some embodiments, actions may include transmitting the at least one indicator of activity to an external device (e.g., a smartphone, tablet, laptop, smartwatch, etc.) for further processing. However, in other embodiments, action execution module 2603 may respond to the presence of at least one indicator of activity to provide a recommendation, reminder, and/or representation related to the indicator of activity to the user, as described in more detail below.

Database access module 2604 may be configured to access database(s) 2605, for example, to retrieve or store images and/or audio data captured via data capture module 2601. In some embodiments, database 2605 may be configured to store information related to the at least one indicator of activity, such as images, audio, and/or video with which activity indicator identification module 2602 may compare data for activity indicator detection. Database 2605 may be configured to store any type of information of use to modules 2601-2604.

Modules 2601-2604 may be implemented in software, hardware, firmware, a mix of any of those, or the like. For example, if the modules are implemented in software, they may be stored in memory 550, as shown in FIG. 6. However, in some embodiments, any one or more of modules 2601-2604 and data associated with database 2605, may, for example, be stored in processor 540 and/or located on server 250, which may include one or more processing devices. Processing devices of server 250 may be configured to execute the instructions of modules 2601-2604. In some embodiments, aspects of modules 2601-2604 may include software, hardware, or firmware instructions (or a combination thereof) executable by one or more processors, alone or in various combinations with each other. For example, modules 2601-2604 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.) and/or dedicated application processing devices to perform the functionality associated with each module.

Figure 27A:
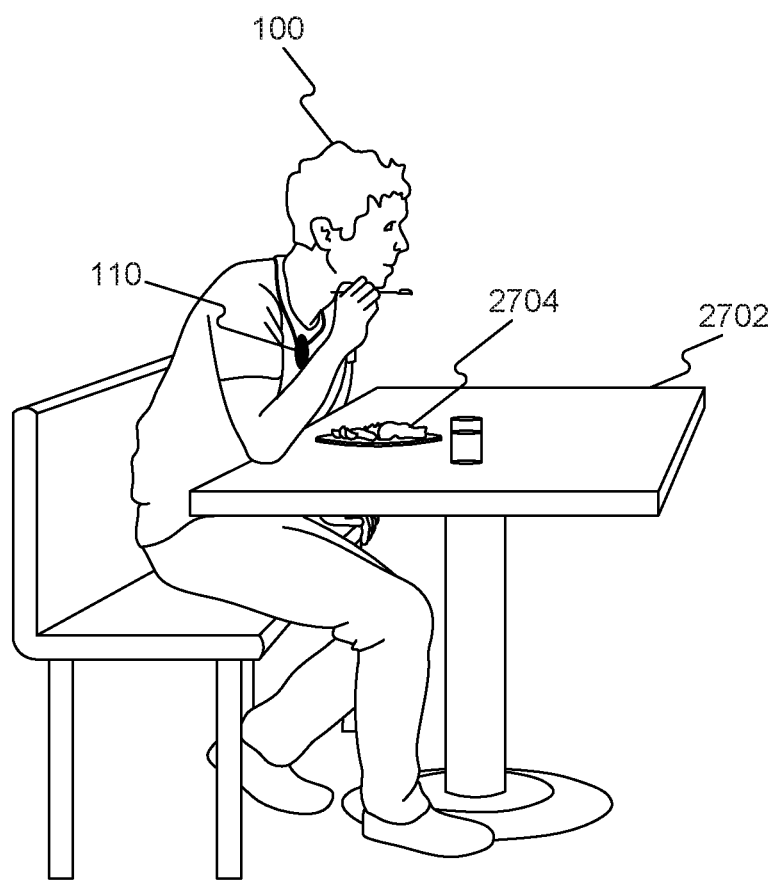
FIG. 27A shows an example environment including a wearable apparatus for capturing and processing images.
Figure 27B:
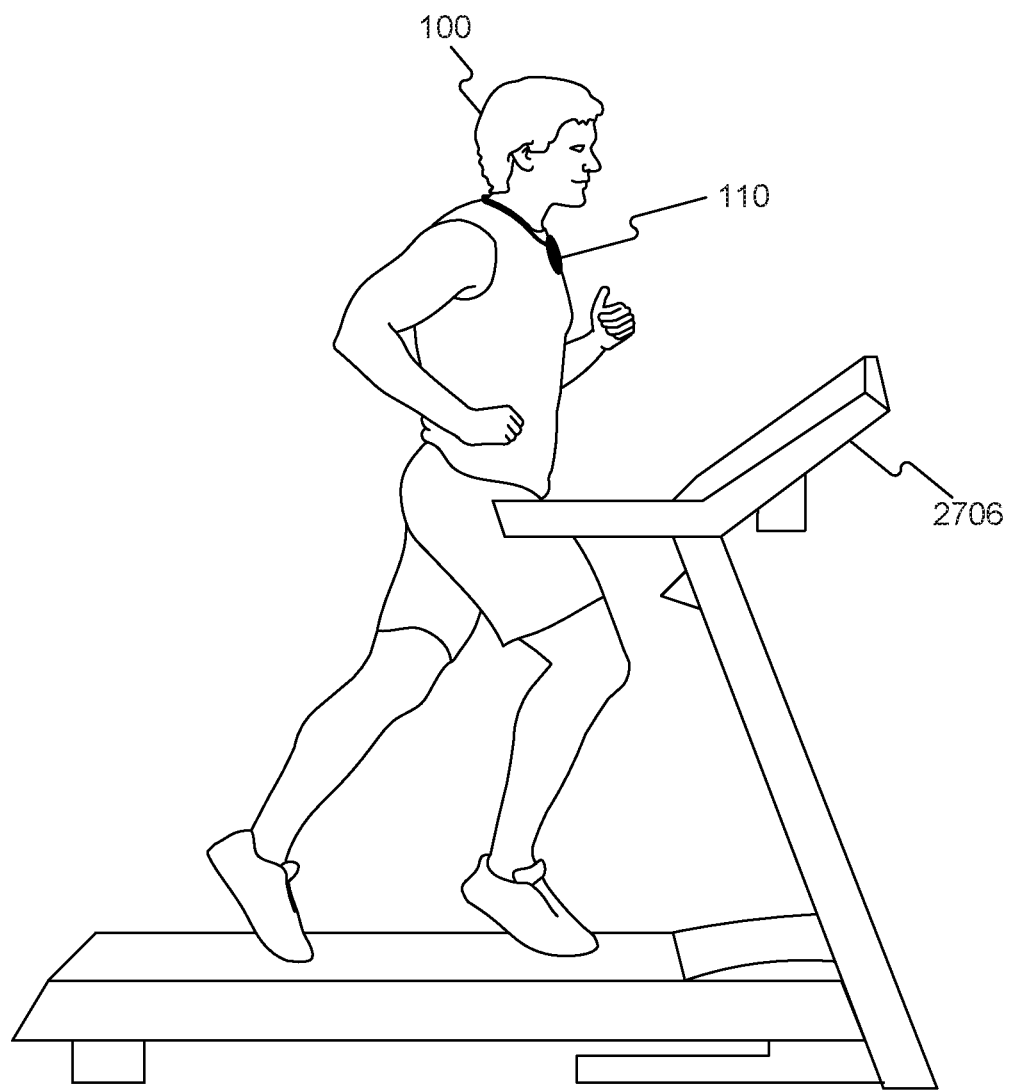
FIG. 27B shows another example environment including a wearable apparatus for capturing and processing images.

FIGS. 27A and 27B show example environments including wearable apparatus 110 for capturing and processing images. In the depicted embodiment, user 100 may wear wearable apparatus 110 on his or her neck. However, in other embodiments, wearable apparatus 110 may be differently positioned in any suitable location to enable capture of images of the user's environment, such as the locations explained in detail above. User 100 may be at a restaurant, as depicted in FIG. 27A, a gym, as depicted in FIG. 27B, or at any other location throughout the user's day, such as a convenience store, grocery store, fitness class, sports field, etc. Wearable apparatus 110 may capture a plurality of images depicting the environment to which the user is exposed while user 100 is eating at the restaurant or exercising in the gym. For example, in the embodiment shown in FIG. 27A, wearable apparatus 110 may capture images that include a restaurant table 2702 and the user's plate 2704 having a variety of food the user is eating. In such an embodiment, the at least one indicator of activity may be a quantity of a type of food that is consumed, such as 1 pound of chicken or two servings of peas. The at least one indicator of activity may also be a length of time spent sitting and eating.

In the embodiment shown in FIG. 27B, the user 100 of the wearable apparatus 110 is running on treadmill 2706. The at least one indicator of activity may be a length of time the user 100 ran or the intensity of the user's activity. The at least one indicator of activity may be identified from the captured images via any suitable image analysis method. For example, the wearable apparatus 110 may capture images of the dashboard on the treadmill 2706 showing how far or long the user 100 ran while using the treadmill 2706. In another embodiment, wearable apparatus 110 may capture a similar image of the treadmill 2706 over a given period of time (e.g., 30 minutes), and the module 2602 may infer that the user exercised for 30 minutes based on the length of time between the capture of the first image of the treadmill 2706 and the capture of the first image of a new environment. Further, in some embodiments, wearable apparatus 110 may capture images reflecting a number of repetitions of a particular exercise (e.g., pushups, sit-ups, weight lifting, etc.).

Still further, it should be noted that presently contemplated embodiments are not limited to tracking indicators of activity of the user 100 of the wearable apparatus 110. In some embodiments, the at least one indicator of activity may indicate activity of a person other than user 100. For example, user 100 may attend a sporting event. While user 100 is watching a soccer game, wearable apparatus 110 may capture images of the movement of the players, and the at least one indicator of activity may indicate the activity of a soccer player. In another embodiment, user 100 may interact frequently with her children throughout a day, and the at least one indicator of activity may indicate an activity level of her children. Indeed, the at least one indicator of activity may indicate the activity of user 100 or a person other than user 100, depending on implementation-specific considerations.

Figure 28A:
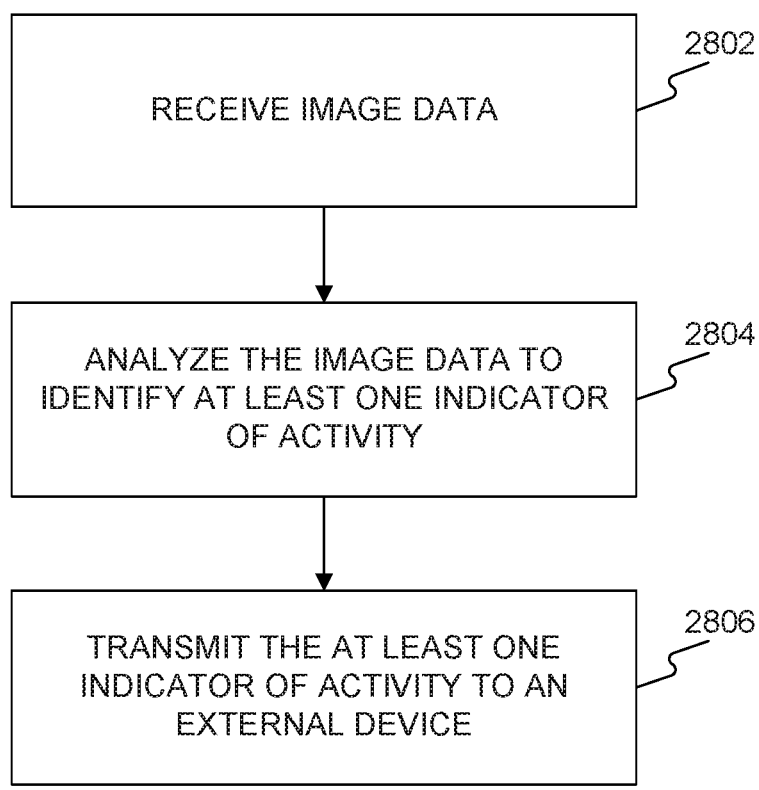
FIG. 28A is a flow chart illustrating an example method for identifying at least one indicator of activity consistent with the present disclosure.

FIG. 28A illustrates a flowchart of an exemplary method 2800 for monitoring an activity, consistent with embodiments of the present disclosure. The method 2800 may be carried out, for example, by a processing device integrated with and/or associated with wearable apparatus 110. In such an embodiment, wearable apparatus 110 may include a wearable image sensor, e.g. image sensor 220, configured to capture a plurality of images from the environment of the user. For exemplary purposes only, the method 2800 for monitoring an activity is described herein with respect to processing device 210 cooperating with memory 550 to execute modules 2601-2604.

In accordance with the method 2800, the processor 210 may receive image data captured by a wearable image sensor at block 2802. Block 2802 may be facilitated by software instructions of data capture module 2601. Data capture module 2601 may be configured to execute instructions to receive image data from a wearable image sensor, and may also be configured to execute instructions to control the wearable image sensor. Controlling the wearable image sensor may include issuing commands to record images and/or videos, and may also include issuing commands to control an orientation or direction of viewing of the image sensor.

At block 2804, the method 2800 also includes analyzing the image data to identify at least one indicator of activity, as described in detail above with respect to activity indicator identification module 2602. The activity may involve the user of the wearable apparatus and/or a person other than the user of the wearable apparatus. To that end, the method 2800 may include processing the image data to identify an activity occurring in the environment of user 100. For example, the processing device may process the images to identify a soccer game occurring in the environment of user 100 and to determine if the user is watching or playing in the soccer game. In some embodiments, the processing device may identify, from the images, an indicator that user 100 has performed or is performing the activity (e.g., playing the soccer game).

Figure 28B:
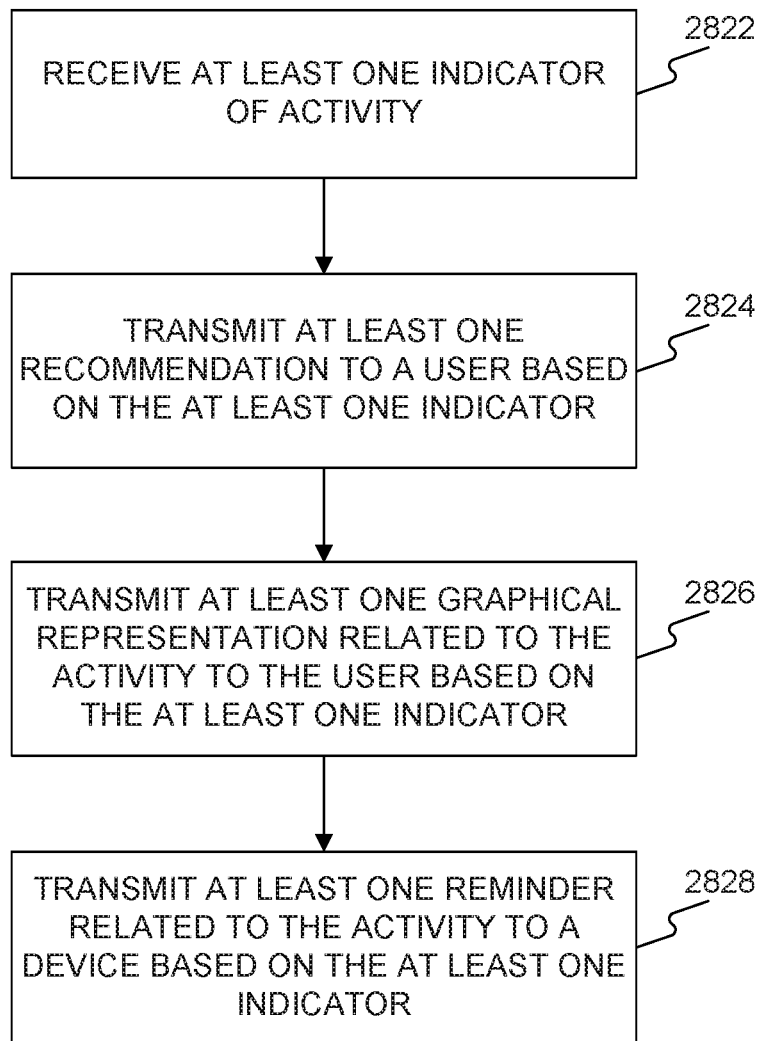
FIG. 28B is a flow chart illustrating an example method for using at least one indicator of activity consistent with the present disclosure.

At block 2806, the method 2800 may also include transmitting the at least one indicator of activity category to an external device. The external device may be a remotely located computing device, such as a smartphone, tablet, laptop, smartwatch, etc. The transmission may be performed via a communications interface, such as wireless transceiver 530 and/or 530b. In such embodiments, the wearable apparatus and the external device may be reversibly or irreversibly paired to enable exclusive data transfer between the two devices. The pairing may be established by the user of the wearable apparatus and external device, or may be automatically performed when the wearable apparatus and the external device are within a given distance from one another (e.g., within a range such that the transmitter and receiver are capable of exchanging data). For example, the processing device may cause the indicator that the user is watching the soccer game for a tracked period of time to be transmitted to computing device 120 and/or server 250 when both are located within the same room or building. However, it should be noted that in other embodiments, the action execution module 2603 may not transmit the at least one indicator of activity. Instead, the action execution module 2603 may proceed to execute blocks 2824, 2826, and 2828 of method 2820 shown in FIG. 28B.

Further, in some embodiments, the at least one indicator of the activity may include an image or a portion of an image depicting the activity. In other embodiments, the image may include an environment, and the image may have been captured within a threshold amount of time (e.g., 1 second, 5 seconds, 10 seconds, etc.) after wearable apparatus 100 captured an image of the activity.

In embodiments in which the wearable apparatus 110 does transmit the at least one indicator of activity to an external device, the external device receives such an indicator at block 2822 of the method 2820. The external device may be programmed to analyze the at least one indicator of activity and select at least one content item (e.g., a recommendation, keyword, etc.) and provide the content item (e.g., one or more recommendations or reports) to the user or other person whose activity was tracked. For example, at block 2824, computing device 120 and/or server 250 may select a recommendation for an activity improvement (e.g., suggesting that a user increase the number of repetitions of an exercise) and transmit the recommendation to the user via a processing device (e.g., smartphone, tablet, laptop, smartwatch, etc.) paired with the wearable apparatus 110. In some embodiments, the processing device of wearable apparatus 110 may cause the recommendation to be output to user 100 through feedback outputting unit 230. Further, the processing device may select, from a plurality of recommendations stored in recommendation database 2605, a recommendation for user 100 based on the at least one indicator of activity.

The recommendations provided to the tracked person may be related to a variety of activities, such as a person's diet, wellness, and fitness. For example, in one embodiment, the transmitted recommendation may relate to a location of a user and may recommend adjusting or modifying at least one aspect of the surroundings of the user. For example, identifying the at least one indicator of activity may include analyzing that a room includes a window with a certain level of light (e.g., bright light), and the provided recommendation may be to move a desk or chair to a new position or angle within the room to capitalize on or avoid the light. In another embodiment, the at least one indicator of activity may be a number of exercise repetitions, and the provided recommendation may be to perform a higher or lower number of repetitions in order to achieve a goal (e.g., perform fewer repetitions of a higher weight to build more muscle mass). In another embodiment, the at least one indicator of activity may be a relative amount of meat eaten versus vegetables eaten, and the recommendation may be to fill a certain percentage of the user's plate with vegetables at each meal.

Still further, in another embodiment, the at least one content item selected based on the analysis of the at least one indicator of activity may include at least one keyword. In such embodiments, the external device may be programmed to prepare at least one search query based on the at least one keyword, and transmit the at least one search query to a search engine. For example, in one embodiment, the keywords may include a healthy type of food, such as quinoa, and the search will output information related to desirable quantities of consumption, facts about the nutritional profile of quinoa, and so forth.

The method 2820 may further include transmitting at least one graphical representation related to the activity to the user based on the at least one indicator of activity. For example, the at least one indicator of activity may be a classification of a particular activity occurring in the image (e.g., aerobic exercise, anaerobic exercise, sedentary activity, etc.). The external device may then execute an application that provides or displays a graphical representation (e.g., on a user interface or screen) of activities that the user has engaged in, including, for example, graphs, pie charts, and other visual representations providing feedback regarding the classifications of activities. For example, the graphical representation may show a relative or absolute amount of time a user engaged in an activity. For example, the representation may show that the user spends 10% of his time exercising on cardiovascular activities, and 90% of his time weight lifting.

Based on the at least one indicator of activity and/or the graphical representations, the external device may provide reminders (e.g., alerts) related to the activity at block 2828. For example, the external device may provide a reminder to go to the gym in the morning if the at least one indicator of activity indicates that the user slept in the prior morning. Other example reminders may indicate whether the user's goals are being met and/or how much time is spent engaged in a range of activities throughout the day. For example, the reminders may include a progress level related to an activity, such as a number of steps walked relative to a goal number of steps to walk in a given time period (e.g., a day).

Still further, presently contemplated embodiments include methods may include one indicator of activity, or multiple indicators of activity. In one embodiment, a method may include analyzing the plurality of images to estimate a distance associated with an activity (e.g., a distance associated with the path covered by the runner in FIG. 27B). In such embodiments, based on the distance associated with the activity, the method may determine whether to transmit the at least one indicator of the activity. However, any suitable metric may be used as a basis for determining whether the at least one indicator of activity is transmitted, including but not limited to, for example, a number of exercise repetitions, amount of food consumed, etc.

Additionally, in some embodiments, the method may include analyzing the plurality of images to identify in one or more of the plurality of images at least one indicator of more than one activity, such as a second activity. For instance, the plurality of images may be analyzed to estimate a distance associated with the second activity and, based on the distance associated with the activity and on the distance associated with the second activity, select at least one activity of a group of activities. The group of activities may include the activity and the second activity. For example, if the analysis of the plurality of images indicates that a user covers a longer distance on an elliptical machine than on a treadmill, the method may include suggesting that future workouts are performed on the elliptical.

There are various ways of distributing and dividing tasks or subtasks among wearable apparatus 110, computing device 120, and server 250. Regardless of which task or subtask is performed by which device, any suitable allocation of computation power among the devices for performing the above-described tasks are within the purview of the present application. Further, the above methods (e.g., method 2800 and 2820) may further include other steps or processes disclosed herein but not presented in FIGS. 28A and 28B, such as those discussed above in connection with any of the other figures in this disclosure.

Determining Emotional Environment from Facial Expressions

In some embodiments, wearable apparatus 110 may capture and analyze images to determine: the emotional state (e.g., friendliness) of a person in the wearer's environment, the emotional environment of the wearer, and so forth. For example, wearable apparatus 110 may analyze images to count smiles and recognize facial expressions in order to arrive at data representing the emotional state of a person. The data representing the emotional state or emotional environment may be transmitted to another device (e.g., a smartphone, tablet, watch, computer, etc.) and/or a server for analysis and/or reporting to the user.

An emotional environment is more than the physical surroundings of the wearer of apparatus 110. The emotional environment may include the emotions of individuals that the wearer interacts with. The emotional environment of the wearer may include: relationships with others, behavior of individuals in the wearer's environment, routines of the wearer or individuals in the wearer's environment, and so forth. Thus, the emotional environment is a measure of feelings, whether good, bad, or neutral. In some embodiments, wearable apparatus 110 may determine the emotional environment of the wearer by determining identities, facial expressions, and/or emotional states of people in the wearer's environment.

FIG. 29 is a schematic illustration of an example system 2900 including wearable apparatus 110, worn by user 100, and optional external devices computing device 120 and/or server 250 capable of communicating with wearable apparatus 110 via network 240, consistent with disclosed embodiments. System 2900 may be used for determining the emotional environment of the wearer, the emotional state of a person in the environment of the user 100, the identity of the person the environment of the user 100, etc. In some embodiments, wearable apparatus 110 may be configured as shown in FIG. 7. For example, wearable apparatus 110 may include an orientation adjustment unit 705 configured to permit adjustment of image sensor 220.

In some embodiments, wearable apparatus 110 may include one or more sensors to determine a state of user 100. For example, as shown in FIG. 29, wearable apparatus 110 may include a portion that is in contact with the skin of user 100. Wearable apparatus 110 may thus include sensors to determine physiological parameters of user 100. In some embodiments, wearable apparatus 110 may include sensors for monitoring galvanic skin response, heart activity (e.g., ECG or heart sounds), temperature, etc. Wearable apparatus 110 may receive information from the sensors to determine a state of user 100. For example, wearable apparatus 110 may receive information that user 100 is sweating and has a high heart rate. This may indicate that user 100 is scared, in love, exercising, etc.

Wearable apparatus 110 may be configured to capture one or more images of user 100's environment using image sensor 220. For example, user 100 may face one or more person such that image sensor 220 may capture images of the one or more person. The images may include the face(s) of the one or more person, including the facial expression(s). In system 2900, wearable apparatus 110 is shown with a field-of-view that includes person (or persons) 2901. Any of the person or persons in view of user 100 may have any number of facial expressions, such as a smile, a frown, or pursed lips. The facial expressions may correlate to emotional states, such as happy 2910, sad 2911, indifferent 2912, etc.

Wearable apparatus 110 may be configured to analyze the captured images to identify the facial expression of the person in the image (for simplicity the description will focus on a single person, but it is contemplated that more than one person and, thus, more than one facial expression may be in the image or images). For example, wearable apparatus 110 may use facial recognition algorithms to determine the degree of a smile or the number of times a person smiles within a predetermined time period (e.g., 1, 5, 10, 30 seconds, etc.). Wearable apparatus 110 may be further configured to classify the analyzed facial expression, such as happy 2910, sad 2911, or indifferent 2912. In some examples, wearable apparatus 110 may determine a friendliness level based on the identified facial expression. For example, if the wearable apparatus 110 determines that the person smiles more than a predetermined number of times (e.g., 1, 2, 5, 10, etc.) within a predetermined amount of time (e.g., 1, 5, 10, 30 seconds, etc.), the facial expression may be classified as friendly. The threshold number of smiles and threshold amount of time can vary based on the degree of friendliness, on past information associated with the person, and so forth.

Wearable apparatus 110 may store information associated with the identified facial expression in, for example, memory 550. The information may include data structures including facial features such as landmarks from the image of the person's face. For example, wearable apparatus 110 may analyze the relative position, size, and/or shape of the eyes, nose, cheekbones, lips, and jaw, and store the information in a suitable data structure.

In some embodiments, wearable apparatus 110 may be configured to transmit the information associated with the facial expression (e.g., stored data structures) to computing device 120 and/or server 250. Wearable apparatus may transmit the information wirelessly (e.g., Wi-Fi, Bluetooth®, etc.) or use network 240, as described above. In some examples, computing device 120 may be a smartphone, a tablet, a smartwatch, or the like. In some embodiments, wearable apparatus 110 may include a wireless transceiver 530 or other transmitter to allow wireless apparatus to "pair" with a receiver in computing device 120 and/or server 250. For example, wearable apparatus may utilize Bluetooth® to pair with computing device 120 and/or server 250.

In some embodiments, wearable apparatus 110 may transmit information associated with the identified facial expression to computing device 120 and/or server 250, and computing device 120 and/or server 250 may determine a classification of the emotional state of the person in the image. The classification may be based on the received information. In some embodiments, an external device may be used to classify the person's mood (e.g., emotional state). For example, wearable apparatus 110 may transmit the relative position, size, and/or shape of the eyes, nose, cheekbones, lips, and jaw to computing device 120 and/or server 250, where facial recognition is used to determine a mood of the person (e.g., using emotional analysis algorithms).

In some embodiments, the external devices may transmit information to a device paired with wearable apparatus 110. For example, server 250 may determine a classification of emotional state based on information received from wearable apparatus 110. Server 250 may also receive a list of devices paired with wearable apparatus 110, such as computing device 120. Server 250 may transmit the classification to one or more of the paired devices, such as to computing device 120, instead of transmitting the classification back to wearable apparatus 110.

In some embodiments, the wearable apparatus 110 may determine the identity of the person in the image, for example, using a face recognition algorithm. Information associated with the identity of the person may be transmitted to the external device. In other embodiments, the external device may determine the identity of the person in the image based on information received from wearable apparatus 110. In some examples, the external device may include a database of people associated with user 100. The database may include records that include profiles of individuals. The profiles may be linked in a social graph, or otherwise linked to determine relationships between the individuals and/or user 100. The external device may match the received information with characteristics if the individuals in the database to determine the identity of the person in the image. The external device may also be configured to update the record of the identified with the determined facial expression or classification of emotional state. Thus, user 100 may be able to maintain a current record of interactions with individuals in the database.

In some embodiments, the external device (e.g., computing device 120 and/or server 250) may be configured to display the information received from wearable device 110. In some examples, the external device may include a display screen, such as an LCD display, and OLED display, and LED display, a touch display, or other display suitable for displaying the information received from wearable device 110. The information may be displayed as part of a graphical user interface (GUI), with or without detailed information about the person.

In some embodiments, wearable apparatus 110 and/or the external computing device may determine the facial expression and/or identity of a second person in the one or more images. In some examples, information associated with the second person's facial expression and identity may be stored in memory 550 in the same or a different data structure as the first person. In some embodiments, the information associated with the second person may be transmitted to the external device. In some examples, the external device may include a record, such a social graph, with profiles of the first and second persons. In other examples, the external device may include separate records for each person with linking identifiers to link records together (e.g., friendship status, family status, associations with landmarks or places, etc.). The external device may be configured to update the record or records associated with the identified persons with the determined facial expressions of each person.

In some embodiments, wearable apparatus 110 may provide information associated with the identified facial expression to user 100. For example, feedback outputting unit 230 may use a Bluetooth®, or other wired or wirelessly connected speaker, or a bone conduction headphone to inform the user about the facial expression. In other embodiments, wearable apparatus 110 may provide information to user 100 of the identity of the person and/or the mood of the person. In some embodiments, wearable apparatus 110 may provide user 100 with a description of the emotional environment around the user. For example, the information may include changes in an emotional state of the people around user 100, information about the interaction of user 100 with the individuals in user 100's environment, etc.

Figure 30:
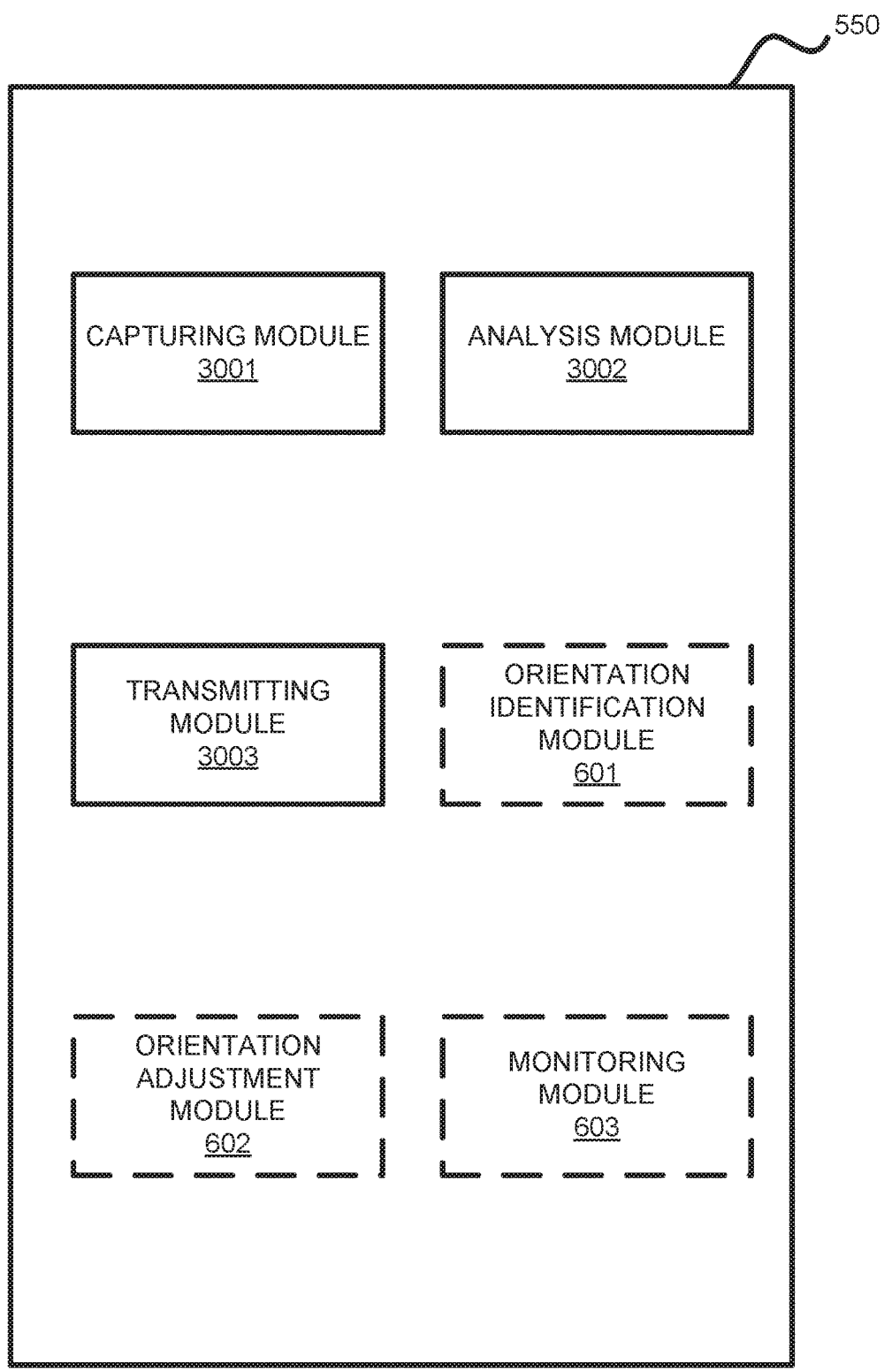
FIG. 30 illustrates an exemplary embodiment of a memory containing software modules consistent with the present disclosure.

FIG. 30 illustrates an exemplary embodiment of memory containing software modules to determine the emotional state of a person in the wearer's environment. For example, one or more of processors 210, processor 540, or server 250 may execute instructions from the modules to perform one or more of the functions as described with respect to FIG. 29, above. Included in memory 550 are capturing module 3001, analysis module 3002, transmitting module 3003, and optional orientation identification module 601, optional orientation adjustment module 602, and optional monitoring module 603. Modules 3001, 3002, 3003, 601, 602, and 603 may contain software instructions for execution by at least one processing device, e.g., processor 210, included with a wearable apparatus 110, processor 540, or a processor included in server 250. Capturing module 3001, analysis module 3002, and transmitting module 3003 may cooperate to provide information associated with the facial expression of the person in the wearer's environment.

Capturing module 3001 may be configured to control image sensor 220 to take an image or images of the environment of the user 100. An image may be taken when commanded by user 100 or automatically when a predetermined event occurs. For example, user 100 may gesture to wearable apparatus 110 with a specific gesture to cause an image to be captured. User 100 may alternatively select a virtual button on a display of an external device paired with wearable apparatus 110, which selection may cause capturing module to take an image. User 100 may depress a physical button on wearable device 110 to cause the same action. In other examples, the image may be taken when sound occurs, or other predetermined event occurs (e.g., a trigger event). Capturing module 3001 may cause an image or images to be taken and then store the image or images, for example, in memory 550.

Analysis module 3002 may be configured to retrieve the captured image or images and analyze the image or images to determine an emotional environment of user 100, facial expressions of a person or persons in the image or images, an emotional state of a person in the image or images, an identity of a person or persons in the one or more images, etc. Analysis module 3002 may use facial detection and recognition to determine the mood (e.g., emotional state) of one or more persons in the captured one or more images. Analysis module 3002 may include algorithms to detect faces within the captured image, and sense micro expressions by analyzing the relationship between points on each face, based on curated and annotated databases. The module may use facial detection, eye tracking, and specific facial position cues to determine the person's expression and mood. The mood may be classified into emotional states, such as happy, sad, indifferent, angry, etc. In some examples, features of a facial expression may be used to determine the mood. Analysis module 3002 may use features identified on the one or more persons' face(s) to determine the mood. The features may be weighted and aggregated to produce an overall mood score. In some examples, the weighted features may be plotted and fit to a reference in order to determine the mood score.

In some embodiments, analysis module 3002 may detect a number of times a person smiles, frowns, yawns, etc. within a predetermined time. A threshold may be set, such that if the number of smiles, for example, exceeds a predetermined value, a friendliness level of the person increases. Likewise, if the number of frowns exceeds a predetermined value, an unlikability level may increase and/or a friendliness level may decrease. The analysis module 3002 may use the friendliness level (or unlikability level, or other determined mood levels) to classify the emotional state of the person.

In some embodiments, analysis module 3002 may determine a relationship between user 100 and the person (or persons) 2901 in the one or more images. The state of the user may be determined from physiological parameters determined by sensors in wearable apparatus 110. Information indicative of the state of user 100 may be used with information associated with the one or more images, such as the emotional state, expression, and/or identity of the person or persons, to determine a relationship between user 100 and person (or persons) 2901. For example, user 100 may have a racing heart rate, sweat, etc., when the expression of person (or persons) 2901 changes from a frown to a smile. In this case, the relationship may be determined to be close. In some examples, the timing associated with the state of user 100 and the identified facial expressions may be used to determine interaction factors and correlations between user 100 and person (or persons) 2901.

In some embodiments, analysis module 3002 may store the information associated with the identified facial expression, identity, and/or mood of the person or persons in the one or more images in memory 550. The information may be stored in data structures suitable for transmission over low-bandwidth networks, such as Bluetooth®, or high-bandwidth networks, such as Wi-Fi. Transmitting module 3003 may retrieve the data structures from memory 550 and transmit the information to one or more external computing devices (e.g., a smartphone, tablet, watch, or an external server). Transmitting module may use radiofrequency hardware communicatively coupled to an antenna to transmit the information.

In some embodiments, orientation identification module 601 and orientation adjustment module 602, described above in reference to FIG. 6, may be configured to adjust and maintain the orientation of image sensor 220 using adjusting unit 705 such that the at least one face in the user 100's environment is fully in view of the image sensor. Monitoring module 603 may be configured to monitor the location of certain facial features in the image and to track the movement of the features. Monitoring module 603 may interact with orientation identification module 601 and orientation adjustment module 602 to track the movement of the facial features of at least one person and to maintain those features in the field-of-view of image sensor 220.

Modules 3001, 3002, and 3003 may be implemented in software, hardware, firmware, a mix of any of those, or the like. For example, if the modules are implemented in software, they may be stored in memory 550, as shown in FIG. 6. However, in some embodiments, any one or more of modules 3001, 3002, and 3003, may, for example, be stored in processor 540 and/or located on server 250, which may include one or more processing devices. Processing devices of server 250 may be configured to execute the instructions of modules 3001-3003. In some embodiments, aspects of modules 3001-3003 may include software, hardware, or firmware instructions (or a combination thereof) executable by one or more processors, alone or in various combinations with each other. For example, modules 3001-3003 may be configured to interact with each other and/or other modules of server 250 and/or a wearable camera system to perform functions consistent with disclosed embodiments. In some embodiments, any of the disclosed modules may each include dedicated sensors (e.g., IR, image sensors, etc.)

and/or dedicated application processing devices to perform the functionality associated with each module.

Figure 31:
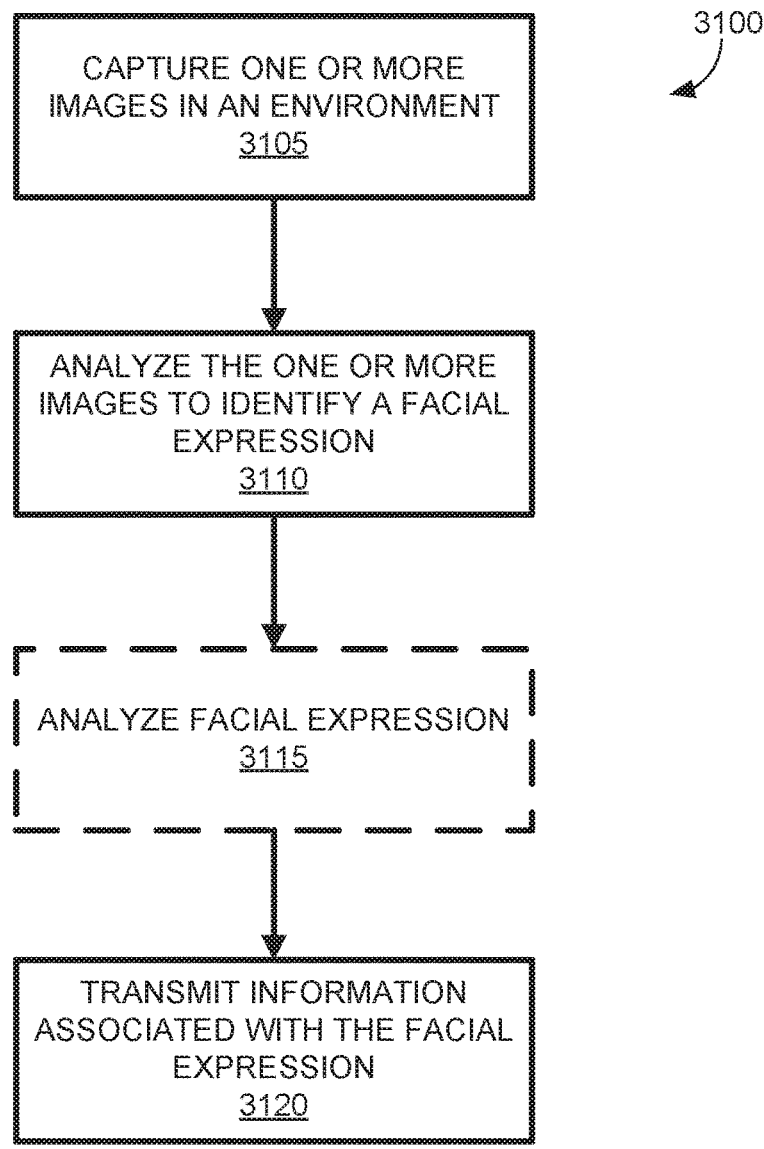
FIG. 31 is a flowchart illustrating an exemplary method of determining the emotional environment of a person consistent with the disclosed embodiments.

FIG. 31 is a flowchart illustrating an exemplary method 3100 of determining the emotional environment of a user, the emotional state of a person, and/or the identity of a person consistent with the disclosed embodiments. The method may be implemented in a system such as shown in FIG. 5 and/or FIG. 29.

At step 3105, one or more images of an environment are captured. The images may be captured by wearable apparatus 110 or other suitable device, for example, a camera. The images may be of an environment in the vicinity of wearable apparatus 110 (e.g., the physical surroundings of wearable apparatus 110). For example, the images may be of the environment in front of user 100. In some embodiments, the images may be of a person or persons near user 100. In some embodiments, wearable apparatus 110 may execute capturing module 3001 to capture the one or more images.

At step 3110, the one or more images are analyzed to identify a facial expression of at least one person in the images (e.g., there may be more than one person in the image). In some embodiments, wearable apparatus 110 may analyze the images. In other embodiments, the images may be transmitted to an external computing device, such as computing device 120 and/or server 250, for analysis. For example, the images may be analyzed by executing instructions stored in analysis module 3002. In some embodiments, the images may be analyzed to determine whether a person is in the images, and the position and orientation of the person in the images may be determined. In some examples, the images may be analyzed to determine that more than one person is in the images, and the position and orientation of the persons in the images may be determined. For example, in the case of a single person, the person may be determined to be facing the image capturing device such that the person's face is visible. If the person's face is visible, the person's facial expression may be analyzed. In some embodiments, a single image may be analyzed to identify the facial expression. In this case, two-dimensional features may be analyzed. In other embodiments, a plurality of images may be combined to create a three-dimensional image. For example, the plurality of images may be captured at slightly different angles, thus allowing reconstruction of a three-dimensional image for the two-dimensional images. The three-dimensional image may then be analyzed and three-dimensional features may be determined.

In some embodiments, facial recognition algorithms may be used to determine facial features on the person's face. For example, features and landmarks may be determined and categorized. Landmarks may be the distance between the eyes, width of the nose, depth of the eye sockets, shape of the cheekbones, length of the jaw line, position of the lips, etc. In some embodiments, the landmarks are aggregated to create a "faceprint." In some examples, the faceprint maybe compared to a database of facial expressions to determine the facial expression of the person. In other examples, the aggregated landmarks may be converted to numerical equivalents. The numerical equivalents may be used to determine the facial expression of the person. For example, certain facial expressions may fall into certain ranges of the numerical equivalents. In some examples the ranges may overlap such that some numerical equivalents may fall into more than one facial expression range. In such a case, statistical methods may be used to determine which expression is most likely the correct expression for the person. In some embodiments, the facial expression may be identified as a smile, a frown, smirk, wink, etc.

At optional step 3115, the identified facial expression may be analyzed. For example, the images may be analyzed by executing instructions stored in analysis module 3002. In some embodiments, wearable apparatus 110 may analyze the facial expression. In other embodiments, an external computing device, such as computing device 120 and/or server 250, may analyze the facial expression. In some embodiments, the identified facial expression may be categorized into emotional states. For example, a smile may be categorized into a "happy" emotional state; a frown may be categorized into a "sad" emotional state; etc. In some examples, the emotional state may be a "friendliness" level.

In some embodiments, a change in facial expression over time may be determined by analyzing multiple images taken at different times. For example, the facial expression of the person may change from a smile to a frown within a certain amount of time (e.g., 1, 10, 30 seconds). The change in expression may be used to determine the emotional state of the person. In some cases, a frown may normally be categorized as "sad." However, if the person smiled, then frowned, the expression may be categorized as "angry" or "annoyed" instead of "sad." Incorporating the changing expression over time may, thus, refine the emotional state determination.

In some embodiments, the one or more images and/or the facial expression may be analyzed to determine the identity of the person in the image. For example, landmarks from one or more images of the person's face may be compared to landmarks in images stored in a database of known persons. The database may contain images of people that user 100 has interacted with in the past. For example, the images may be from the user 100's social network. In other examples, the database may contain information about individuals unknown to user 100, such as all individuals in certain zip code, city, apartment complex, etc. The database may be a relational database, a social graph, or other suitable database, and the image may be associated with a record containing other information (e.g., a profile) about the person. In some examples, the record in the database may be updated with information about the identified facial expression of the determined person. In some examples, the record may contain relationships between individuals. Thus a record may contain information about multiple individuals. In the case where more than one person is identified in the images a single record containing the multiple persons may be updated.

In some embodiments, information about user 100 indicative of a state of user 100 may be received from sensors included in wearable apparatus 110. The sensors may indicate a physiological state of user 100, such as heart rate, galvanic skin response, etc. In some embodiments, the information indicative of a state of user 100 may be used to determine a relationship between user 100 and the person in the images. For example, the timing between identified facial expressions or mood of the person and the physiological response of the user can be analyzed. The analysis may indicate that the facial expression is affecting user 100 or vice versa.

In some embodiments, a facial expression may be identified by performing eyebrow analysis. For example, the orientation and movement of one or more eyebrows across captured images may be analyzed to determine a mood.

In some embodiments, a facial expression may be analyzed over multiple images to develop a baseline. The baseline may be specific to a particular individual, and may provide a baseline for a known mood (e.g., happy, sad, etc.). During a subsequent encounter with that individual, movements of the person's lips, eyes, and/or eyebrows, etc., away from the baseline may be used to determine the person's mood.

In yet other embodiments, analysis module 3002 may execute instructions to develop a model and refine the model through neural network training. For example, the model may be exposed to test cases, and may develop categorizations of one or more facial expressions, and then correct the categorizations to train the neural network and adapt the neural network to better recognize similar facial expressions during subsequent encounters.

In still yet other embodiments, analysis module 3002 may execute instructions to perform image analysis techniques. For example, points may be used to mark facial features (e.g., landmarks, as discussed above), and line representations of facial features (e.g., brows, lips, etc.) may be used to analyze the orientation and movements of facial features across multiple images. Further, image analysis may be used to recognize parted lips and/or exposed teeth to help to identify smiles. For example, image analysis techniques may be used to identify and distinguish between teeth and lips, and determine a degree of a smile.

At step 3120, information associated with the identified emotional state, the identified facial expression, and/or information associated with the identity of the person associated with the facial expression may be transmitted to an external device. For example, the images may be transmitted by executing instructions stored in transmitting module 3003. The external device may be computing device 120 and/or server 250. In some embodiments, the information may be the identified landmarks in the image or images. The information may also be the identified expression, and/or the emotional state of the person, the identity of the person, and/or the state of user 100.

In some embodiments, the information is transmitted from the wearable apparatus 110 to the external device. The wearable apparatus 110 may include a transmitting module that includes hardware and software to transmit the information. In some examples, the information may be transmitted over Bluetooth® to a paired external device, such as a smartphone, tablet, and/or a smartwatch. In other examples, the information may be transmitted over a network, such as cellular network, Wi-Fi, etc. In some embodiments, the information associated with the facial expression may be transmitted to wearable apparatus 110 from the external device.

The above method (e.g., method 3100) may further include other steps or processes disclosed herein but not presented in FIG. 3, such as those discussed above in connection with any of the other figures in this disclosure.

Facial Recognition via Non-Facial Information

Systems and methods of the present disclosure may use non-facial information to aid in identifying a face in an environment of a user of the disclosed wearable apparatus. Non-facial information includes information that does not represent the face of the person. Non-facial information may include information captured in at least one of a plurality of images, or may include information obtained from sources other than the captured images. The disclosed systems may leverage a variety of non-facial information, such as information extracted from an object identified from the images, information identifying other devices (e.g., signals received from mobile devices), Global Positioning System (GPS) information, audio information, and other data, such as Wi-Fi signals. For example, a "fingerprint" may be extracted from a Wi-Fi signal and be used to identity a particular device (e.g., a smartphone). In some embodiments, the disclosed systems may use the context of a location, including information obtained from the surroundings of a particular location (e.g., such as door with name of person might help identify who might be in a room behind that door).

The disclosed systems may assign weights to the non-facial information in order to arrive at a confidence level that the face is that of a particular person. In some embodiments, the disclosed systems may compare captured images to images available via the Internet or stored in a database or data storage device. Further, the disclosed systems may narrow down the universe of candidates based on a location and/or a particular event, and may also leverage calendar information. For example, the disclosed systems may access a calendar and determine that the user is scheduled to attend a concert, and then may create a sub-universe of people the user is likely to meet based on information indicating persons who will attend that event (e.g., based on calendar information of the people, or based on information of persons who have purchased a ticket to the event, or social media information indicating a person is attending the event).

Figure 32:
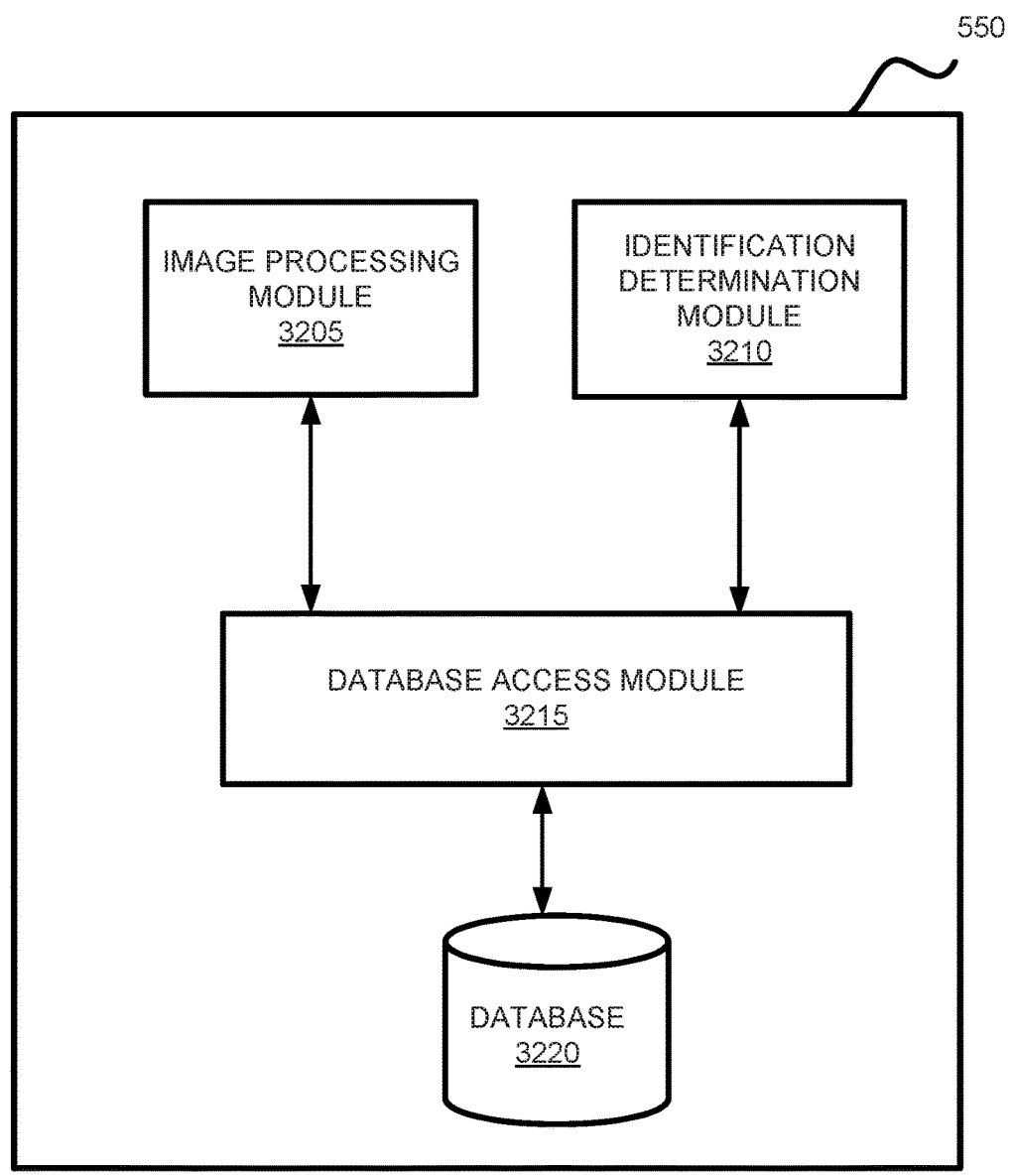
FIG. 32 is a block diagram illustrating an exemplary memory.

FIG. 32 is a block diagram illustrating a memory consistent with embodiments disclosed herein. The memory may be a memory included in wearable apparatus 110 (e.g., memory 550 or 550*a*), a memory included in computing device 120 (e.g., memory 550*b*), or a memory included in a server 250 (shown in FIGS. 2 and 34). The memory may include one or more modules, or sets of instructions, for performing methods consistent with the disclosed embodiments. For example, the memory may include instructions for at least one processing device to analyze images captured by the image sensor, audio data detected by a microphone, and/or GPS location information acquired by a GPS unit. Further, in some embodiments, any of the modules shown in FIG. 32 may be included in memory of one or more of wearable apparatus 110 (e.g., memory 550 or 550*a*), computing device 120 (e.g., memory 550*b*), and server 250 (shown in FIGS. 2 and 34).

The processing device may process the images captured by the image sensor included in wearable apparatus 110 and/or other data in near real time to identify a person included in the images, as the image data are being captured by the image sensor in near real time. In some embodiments, the processing device may be included in wearable apparatus 110 (e.g., processor 210, 210*a*, or 210*b* shown in FIGS. 5A-5C). In some embodiments, the processing device may be a processor that is separately located from wearable apparatus 110. For example, the processing device may be a processor that is remotely connected with wearable apparatus 110 through a wired or wireless network with a suitable communication means, such as cable communication, infrared, Bluetooth, WiFi, cellular, near field communication (NFC), etc. In some embodiments, the processing device may be processor 540 included in computing device 120, which may be paired with (e.g., connected with) wearable apparatus 110 through a wired or wireless connection. In some embodiments, the processing device may be a processor included in server 250, which may be wirelessly connected with wearable apparatus 110 through network 240 (shown in FIGS. 2 and 34). In some embodiments, the processing device may be a cloud computing processor remotely and wirelessly connected with wearable apparatus 110 through network 240. Wearable apparatus 110 may transmit captured image data and/or other data acquired by wearable apparatus 110 to the processing device in near real time, and the processing device may process the captured image data and/or other data to provide feedback (e.g., identification information of a person included in the images, such as the name) to wearable apparatus 110 in near real time.

In the embodiment shown in FIG. 32, memory 550 includes an image processing module 3205, an identification determination module 3210, a database access module 3215, and a database 3220, for performing the functionality of the disclosed methods. Additional or fewer databases and/or modules may be included in memory 550. Each module disclosed herein may include hardware components (e.g., physical circuits, switches, gates, etc.), software (code or instructions), or both. Each module may be configured to perform various functions programmed for the module, or each module may be executed by a processor to perform various functions programmed for the module. In the following discussions, the modules are described as being configured to perform certain functionality. It is understood that in some embodiments, the modules are executed by the processor to perform certain functionality. The modules and databases shown in FIG. 32 are by example only.

Database 3220 may be configured to store various data or information, such as image data captured by an image sensor (e.g., image sensor 220, 220a, 220b shown in FIGS. 2, 3, 4A, 4B, 5A-5C, and 7). Database 3220 may also be configured to store data other than image data, such as textual data, audio data, video data, etc. Alternatively or additionally, memory 550 may include a separate text database configured to store textual data extracted or identified from captured images, a separate sound database configured to store audio data, such as sound detected by a microphone, and a separate video database configured to store video data captured by the image sensor. Database 3220 may further store information associated with user 100, contacts of user 100, or other persons. Such information may include age, gender, employment, hobbies, contacting information such as email addresses, phone numbers, addresses, social media accounts, calendar information, image data (which may include images of faces), positioning information, relationship information (e.g., relationship with other persons), voice data, etc. Such information may also include emails of user 100, messages posted by user 100, contacts of user 100, or other persons on social media websites or other publically accessible websites. Such information may further include information regarding purchasers of event tickets or attendants of events, which may be stored in a database at a ticket selling agent or an event organizer. Some of such information may be stored in another database external to memory 550, such as a database in a data storage device included in computing device 120 and/or server 250.

Database access module 3215 may be configured to access database 3220 to retrieve data or information. For example, data access module 3215 may access database 3220 to retrieve previously stored image data for analysis. Previously stored image data may be captured by wearable apparatus 110, or may be retrieved from a remote device, such as a server on the Internet. In some embodiments, database access module 3215 may be configured to retrieve previously stored sound data, which may be received or acquired by a microphone.

Database access module 3215 may also be configured to access other databases included in an external device, such as a server on the Internet. For example, database access module 3215 may be configured to access information stored in another database on a device external to memory 550. Information accessible by database access module 3215 may include information regarding user 100 of wearable apparatus 110, information regarding the contacts of user 100, or information regarding other persons, similar to those that may be stored in database 3220.

In the embodiment shown in FIG. 32, memory 550 is configured to store an image processing module 3205. Image processing module 3205 may be configured to perform various analyses and processes of image data captured by the image sensor to identify an object, including, for example, a face of a person appearing in the image, as well as other non-facial information, such as texts, other objects, etc. For example, image processing module 3205 may be configured to analyze the images to determine that a face of a person appears in a first image. In some embodiments, image processing module 3205 may be configured to analyze the images to identify at least one item of non-facial information appearing in a second image that was captured within a time period including a time when the first image including the face is captured. The time period may be 1 second, 2 seconds, 3 seconds, etc., before and/or after the time first image is captured. The first image and the second image may be the same image (i.e., the face and the item of non-facial information are captured in the same image), or may be different images (i.e., the face and the item of non-facial information are captured in different images). Image processing module 3205 may use any suitable face recognition algorithm to recognize that there is a face of a person in the first image. Image processing module 3205 may analyze the image data of the face and/or the person to extract one or more body characteristics associated with the person, such as a mole or a scar on the face, a hairstyle, a clothing item, such as a picture, texts, color, or a pattern printed on the cloth, a name tag, a jewelry worn by the person, a unique smile, color of the hair, eye, or skin, and other facial or body characteristics. An item of non-facial information may be one of these items or characteristics not related to a face.

Memory 550 may include an identification module 3210. Identification determination module 3210 may be configured to perform various analyses and processes to determine identification (e.g., a name or an index of a database referring to an identity stored in the database) of a person, whose face appears in the images. For example, identification determination module 3210 may be configured to determine the identification (e.g., a name) associated with the face captured in the images based on the item of non-facial information.

Database access module 3215 may also be configured to access calendar information stored in a device (e.g., a mobile device, a server, etc.). For example, database access module 3215 may access calendar information stored in a device paired and/or connected with wearable apparatus 110. The calendar information may be associated with the user of the device paired with wearable apparatus 110. The device paired with wearable apparatus 110 may be associated with the user of wearable apparatus 110, or may be associated with a person other than the user of wearable apparatus 110. Accordingly, the calendar information may be associated with the user of wearable apparatus 110, or another person (e.g., a contact of user 100, or any other person). In some embodiments, database access module 3215 may access a database storing calendar information of a plurality of persons to retrieve information regarding who are scheduled to attend an event that user 100 of wearable apparatus 110 is also scheduled to attend. In some embodiments, database access module 3215 may also be configured to access information stored in other databases or information available on the Internet, such as information about a person's schedule available on the person's social media webpage.

Figure 33A:
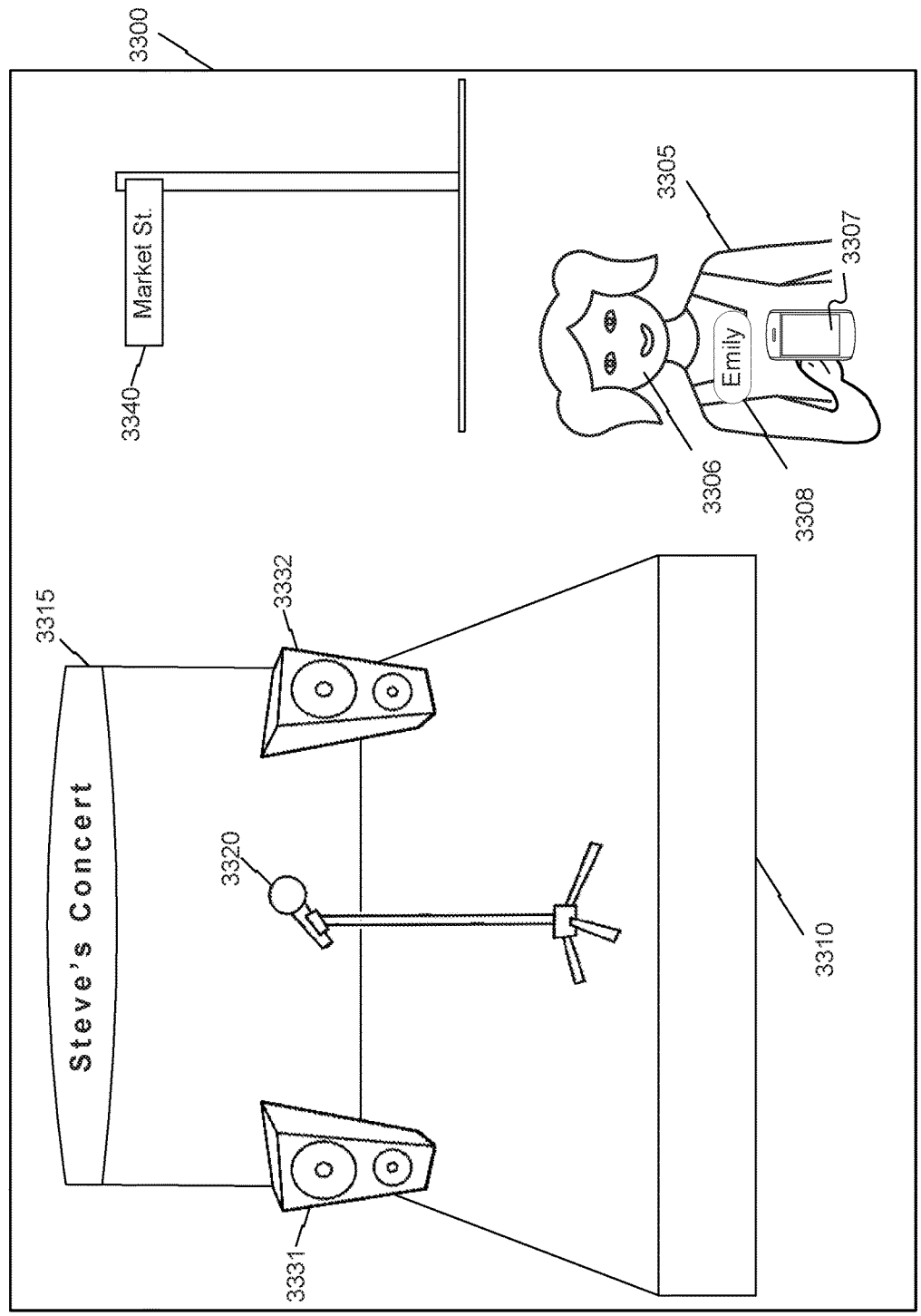
FIG. 33A shows an exemplary image captured by an image sensor of a wearable apparatus.

FIG. 33A shows an exemplary image captured by an image sensor of wearable apparatus 110, consistent with the disclosed embodiments. It is understood that the image sensor included in wearable apparatus may capture a plurality of images from the environment of the user, and FIG. 33A shows one example of the images captured by wearable apparatus 110. Image 3300 shows a person 3305, who has a face 3306, and is holding a device 3307 and wearing a name tag 3308. Device 3307 may be a mobile device, such as a cell phone (e.g., smartphone), a tablet, a laptop, a watch, etc. Device 3307 may transmit and/or receive a signal to and/or from wearable apparatus 110, such as a WiFi signal, an infrared signal, a Bluetooth signal, etc. Device 3307 may communicate with server 250, and may transmit various data (e.g., GPS information) to server 250. Device 3307 may receive various data from server 250.

As shown in FIG. 33A, image 3300 also shows a concert stage setting 3310 having a banner 3315. Banner 3315 includes text "Steve's Concert" on it. Image 3300 also shows a microphone 3320, and two loud speakers 3331 and 3332 on stage 3310. Image 3300 also shows a street signage 3340 having text "Market St." The text "Market St." identifies a location or a venue.

At least one processing device (e.g., processor 210, 210a, and/or 210b) included in wearable apparatus 110 may be configured to analyze at least one image (e.g., one or a plurality of images) captured by the image sensor of wearable apparatus 110. For example, in some embodiments, the processing device may be configured to analyze a first image to determine that a face appears in the first image. For example, using any suitable face recognition algorithm, wearable apparatus 110 (or computing device 120 or server 250) may recognize that face 3306 appears in image 3300.

The processing device may also be configured to analyze a second image to identify at least one item of non-facial information appearing in the second image that was captured within a time period (e.g., 1 second, 2 seconds, 3 seconds, etc.) including the time when the first image is captured. For example, the time period may span before and/or after the time the first image is captured. In some embodiments, an item of non-facial information may appear in the same image as the face. As shown in FIG. 33A, elements 3307, 3308, 3310, 3315, 3320, 3331, 3332, and 3340 may be items of non-facial information. Such items are captured within the same image as face 3306.

Figure 33B:
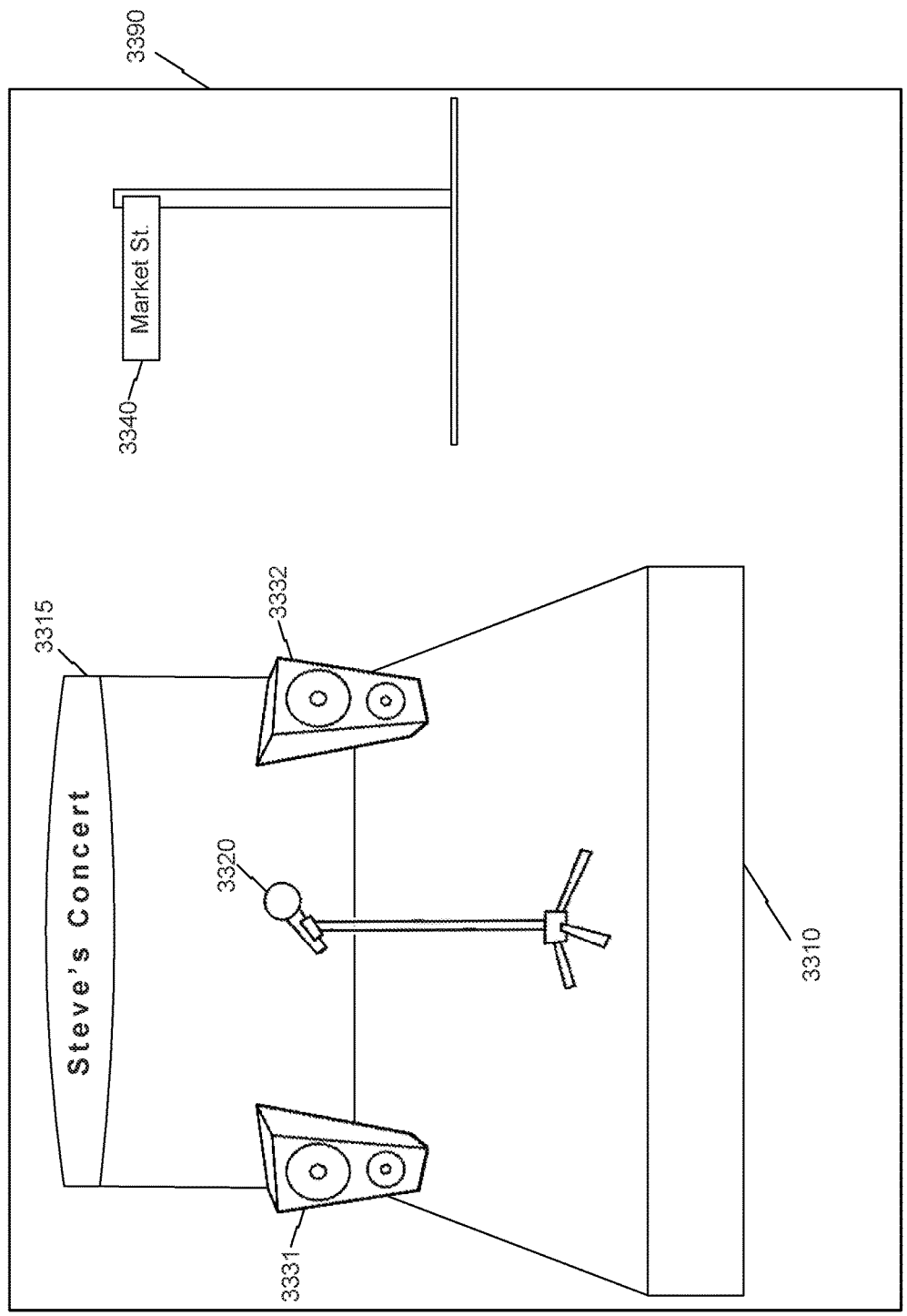
FIG. 33B shows another exemplary image captured by an image sensor of wearable apparatus.
Figure 33C:
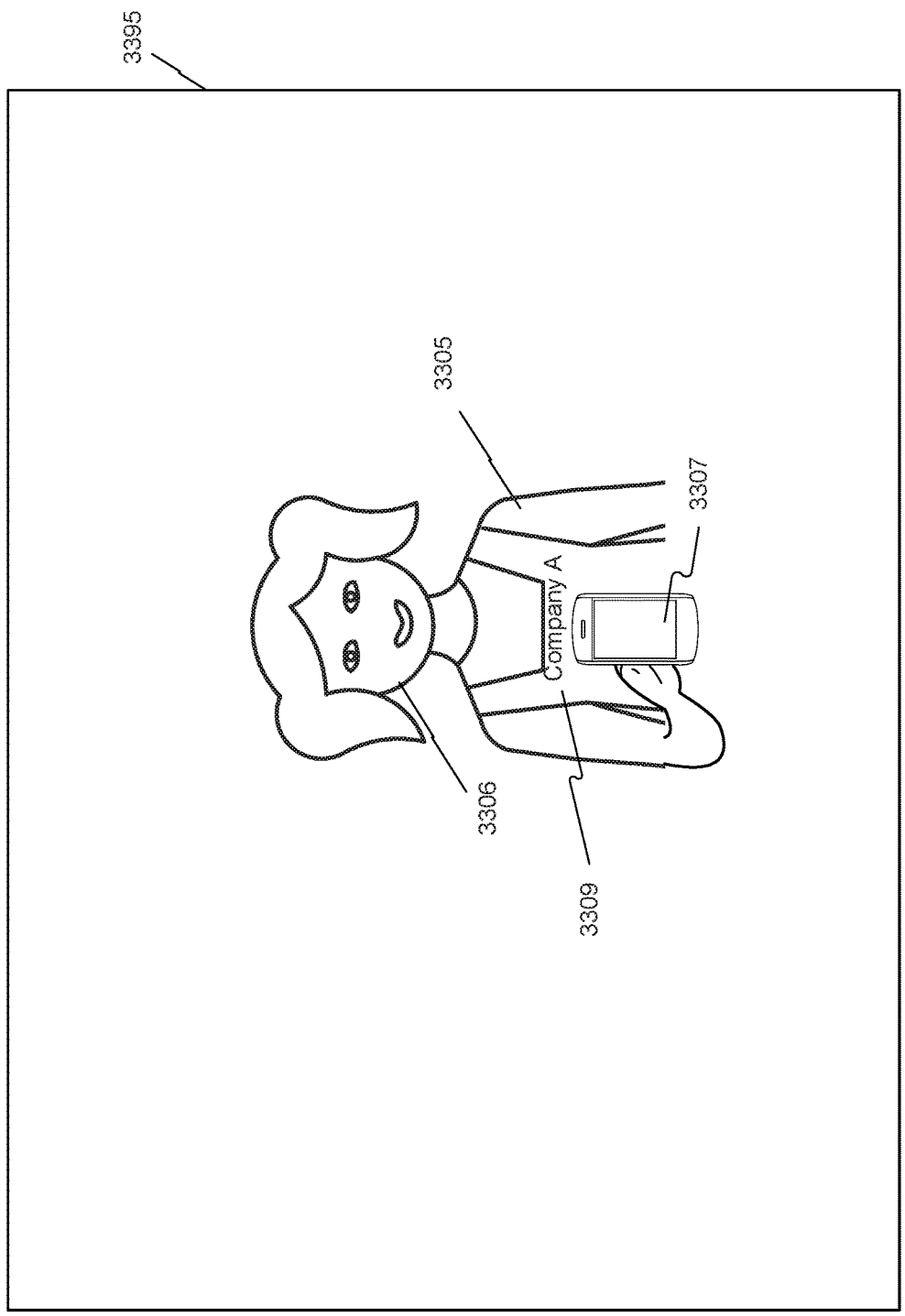
FIG. 33C shows another exemplary image captured by an image sensor of wearable apparatus.

In some embodiments, an item of non-facial information may appear in a different image from the face, as shown in FIGS. 33B and 33C. FIG. 33B shows an image 3390 of the environment, which includes the concert setting and the street sign, but without face 3306. FIG. 33C shows an image 3395 that includes an image of person 3305, including face 3306. The image including the item of non-facial information appearing in a different image from the face may be captured within the time period (e.g., 1 second, 2 seconds, 3 seconds, etc.) before and/or after the image including the face was captured. The time period may be any other suitable time period, such as 1 minute, 2 minutes, etc. Items of non-facial information included in image 3390, although not appearing in the same image as face 3306, may be used to aid in determining identification information (e.g., a name or an index pointing to a location in a database storing an identity of a person) associated with face 3306.

For convenience, below discussions may refer to FIG. 33A in which items of non-facial information appear in the same image as face 3306. It is understood that the same processes discussed herein may be applied to FIGS. 33B and 33C, in which items of non-facial information appear in a different image from face 3306. As discussed above, items of non-facial information may also include those not included in any images captured by wearable apparatus 110, including, e.g., audio data captured by microphone 3405 (shown in FIG. 34), WiFi signals received by wearable apparatus 110, and other data or signal acquired by wearable apparatus 110.

FIG. 34 illustrates wearable apparatus 110 and other devices consistent with embodiments disclosed herein. As shown in FIG. 34, user 100 may wear wearable apparatus 110. Wearable apparatus 110 may have any configurations or combination of configurations disclosed in other figures. For example, in some embodiments, wearable apparatus 110 may include capturing unit 710 disclosed in FIGS. 7-16. In some embodiments, wearable apparatus 110 may have other configurations disclosed in FIGS. 1-6. In other embodiments, wearable apparatus 110 may have a configuration that is a combination of any features disclosed in FIGS. 1-16.

Wearable apparatus 110 carried by user 100 may capture a plurality of images from the environment of user 100. An example image is shown in FIG. 33A. User 100 may be facing the scene shown in FIG. 33A. For example, user 100 may be talking to or facing person 3305 when image 3300 is captured by wearable apparatus 110.

Wearable apparatus 110 may include a microphone 3405 configured to acquire audio data, such as voice of user 100 and/or another person (e.g., person 3305), as well as any other acoustic data from the environment of user 100. For example, microphone 3405 may acquire music sound being played at the scene shown in FIG. 33A, where a concert is being performed. Microphone 3405 may acquire voice of person 3305, whose face 3306 is included in image 3300, and who may be speaking to user 100 or to someone else. Wearable apparatus 110 may analyze the acquired audio data to determine identification information of person 3305, or may transmit the acquired audio data to an external device (e.g., computing device 120 and/or server 250) for determining identification information of person 3305. In some embodiments, wearable apparatus 110 may analyze the audio data acquired by microphone 3405 to determine the identification information of person 3305 and may transmit the identification information to external devices, such as computing device 120 and/or server 250.

In some embodiments, wearable apparatus 110 may include a display. For example, output feedback unit 230 shown in FIGS. 5A-5C may include the display. A processor included in wearable apparatus 110 may be programmed to display information associated with the identification information of person 3305 associated with face 3306 on the display. For example, the display included in wearable apparatus 110 may display the name of person 3305.

Wearable apparatus 110 may have a configuration shown in any of FIGS. 5A-5C (with the addition of microphone 3405 to the schematics shown in FIGS. 5A-5C), or a combination of configurations shown in FIGS. 5A-5C (with the addition of microphone 3405 to the combination of schematics shown in FIGS. 5A-5C). Although not shown in FIGS. 5A-5C, it is understood that wearable apparatus 110 may include other features, such as a positioning unit (e.g., a GPS unit) configured to acquire location information of wearable apparatus 110. As shown in FIGS. 5A-5C, wireless transceiver 530 (or 530a) of wearable apparatus 110 may be configured to transmit a signal or data from wearable apparatus 110 to another device, such as an external device (e.g., computing device 120, device 3307 held by person 3305, or server 250). Wireless transceiver 530 (or 530a) of wearable apparatus 110 may also be configured to receive a signal or data from another device, such as the external device (e.g., computing device 120 and/or server 250). For example, wearable apparatus 110 may receive a WiFi signal through wireless transceiver 530 (or 530a) from device 3307 (shown in FIG. 33A).

As shown in FIG. 34, wearable apparatus 110 may communicate with an external device. The external device may be computing device 120, server 250, or any other devices (e.g., device 3307 carried by another person). Wearable apparatus 110 may communicate with computing device 120 through a suitable communication means, such as cable, Bluetooth, WiFi, infrared, cellular, Near Field Communication, etc. In some embodiments, wearable apparatus 110 may communicate with server 250 through network 240, which may include a suitable communication means disclosed herein.

In some embodiments, computing device 120 may be a smartphone, a tablet, or a watch (e.g., a smartwatch). In some embodiments, computing device 120 may be paired with (and hence connected with) wearable apparatus 110. Pairing may be enabled by a transmitter (e.g., one included in wireless transceiver 530 or 530a shown in FIGS. 5A-5C) included in wearable apparatus 110 and a receiver (e.g., one included in wireless transceiver 530b shown in FIG. 5C) included in computing device 120. In some embodiments, wearable apparatus 110 may not communicate with server 250 directly. Instead, wearable apparatus 110 may directly communicate with computing device 120, which may then communicate with server 250.

Server 250 may include any suitable hardware and/or software components. For example, server 250 may include a computer having at least one of a memory, a storage device, a processor, and executable instructions stored in the memory that may be executed by the processor to perform various processes and methods disclosed herein. Server 250 may include transceivers, network ports, and input/output devices configured to communicate with other devices (e.g., wearable apparatus 110 and/or computing device 120) to exchange data and/or signals.

In some embodiments, server 250 may be configured to receive information transmitted from wearable apparatus 110. For example, server 250 may receive images captured by wearable apparatus 110, such as the image shown in FIGS. 33A-33C. In some embodiments, processing device 210, 210a, or 210b of wearable apparatus 110 may transmit (e.g., via wireless transceiver 530 or 530a) to server 250 one the captured images (e.g., the image shown in FIG. 33A), in which face 3306 of person 3305 appears. In some embodiments, server 250 may receive information associated with at least one item of non-facial information from wearable apparatus 110. The item of non-facial information may include an object, text, audio data, etc. For example, referring to FIG. 33A, when wearable apparatus 110 captures a plurality of images of the concert scene (including the one shown in FIG. 33A), wearable apparatus 110 may analyze the images to identify an item of non-facial information. For example, wearable apparatus 110 may identify an object, such as text "Market St." shown on signage 3340. Wearable apparatus 110 may identify the text "Steve's Concert" on banner 3315. Wearable apparatus 110 may identify microphone 3320, loud speakers 3331 and 3332. Wearable apparatus 110 may identify device 3307 held by person 3305.

Wearable apparatus 110 may transmit other acquired information to server 250. For example, wearable apparatus 110 may transmit audio data acquired by microphone 3405 to server 250. Audio data may include sound from the concert scene, such as music being played. Audio data may also include voice of person 3305. In some embodiments, wearable apparatus 110 (e.g., at least one processing device included in wearable apparatus 110) may transmit GPS information indicating the location of wearable apparatus 110 to server 250. The GPS location information may be associated with face 3306 captured within image 3300 as face 3306 may be in close proximity to wearable apparatus 110. In some embodiments, wearable apparatus 110 may receive WiFi signals from device 3307 carried by person 3305, and may transmit the WiFi signals or a signal having information extracted from the WiFi signals to server 250. The information extracted from the WiFi signals may include the MAC address of device 3307.

In some embodiments, server 250 and/or computing device 120 may determine identification information of person 3305 associated with face 3306 by analyzing image data and/or other data or information captured by and transmitted from wearable apparatus 110. Server 250 and/or computing device 120 may an identity (e.g., a name) of person 3305 based on the determined identification information, and may provide the identity of person 3305 to wearable apparatus 110. In some embodiments, wearable apparatus 110 may analyze captured image data and/or other data, as well as information obtained from computing device 120 and/or server 250, to determine the identification information of person 3305 associated with face 3306 captured by wearable apparatus 110. Wearable apparatus 110 may transmit the determined identification information to computing device 120 and/or server 250. For illustrative purposes, in below discussions, the disclosed methods for identifying a person associated with a face captured in an image are described as being performed by wearable apparatus 110. It is understood that the methods may be performed by computing device 120 and/or server 250.

Wearable apparatus 110 may determine identification information of a person (e.g., person 3305) associated with face 3306 based on at least one item of non-facial information. The identification information may include a name of person 3305 or an index of a database storing identities of persons. The index may point to a location in the database that stores an identity (e.g., a name) of a person. In some embodiments, wearable apparatus 110 may determine the identification information of person 3305 based on the item of non-facial information and the image (e.g., image 3300 shown in FIG. 33A) in which face 3306 appears.

In some embodiments, wearable apparatus 110 may determine the identification information of person 3305 based on a signal received from a mobile device in a vicinity of face 3306. For example, wearable apparatus 110 may receive a WiFi signal from mobile device 3307. In some embodiments, WiFi-enabled device 3307 may transmit a WiFi probe request in search for nearby networks. The WiFi probe request may be received by wearable apparatus 110 (e.g., through wireless transceiver 530 or 530a). The WiFi probe request may contain a unique MAC address of device 3307. Wearable apparatus 110 may analyze the MAC address to determine the user's identification information associated with the MAC address. For example, wearable apparatus 110 may analyze historical tracking data stored in a database that are associated with the same MAC address. Wearable apparatus 110 may analyze other data publicly or privately available in databases or on the Internet (e.g., on server 250), to determine the identification information of the user of device 3307 (e.g., person 3305) associated with the MAC address.

In some embodiments, wearable apparatus 110 may access calendar information of the identified possible identities (e.g., names) of the user of device 3307. The calendar information of the possible identities may indicate whether the persons with the identities are scheduled to attend a concert held at a location (e.g., where image 3300 is captured). Wearable apparatus 110 may also identify at least one item of non-facial information from image 3300, such as the text included in signage 3315 indicating that a concert is being or will be held. Wearable apparatus 110 may also identify the text included signage 3340 indicating the location, i.e., Market Street. Based on the at least one item of non-facial information identified from image 3300, and the calendar information associated with the possible identities of the user of device 3307, server 250 may determine the identity of the user of device 3307 and use the determined identity as the identity of person 3305 having face 3306.

In some embodiments, wearable apparatus 110 may detect a WiFi signal broadcasted from device 3307, which shows a network name "Emily's hotspot." Wearable apparatus 110 may determine a possible name "Emily" for person 3305 based on the network name "Emily's hotspot." Alternatively or additionally, wearable apparatus 110 may transmit the network name "Emily's hotspot" to server 250 such that server 250 may determine the identity of person 3305. For example, from the network name, server 250 may determine that the name of person 3305 is possibly "Emily." Wearable apparatus 110 or server 250 may determine the likelihood or a confidence level for the possible name "Emily" for person 3305.

In some embodiments, wearable apparatus 110 may be programmed to assign a confidence level to the determined possible identity or identification information (e.g., a possible name or an index to an identity database). The confidence level may be in the form of a numerical value, or in any other suitable form. For example, the name "Emily" determined from the network name "Emily's hotspot" may be assigned with a confidence level of 6 (the confidence level may be in a range of 0-10). When wearable apparatus 110 analyzes the MAC address of device 3307 and determines, from certain databases, that the MAC address is associated with another name "John," wearable apparatus 110 may assign another confidence level 4 to the possible name "John" determined from the MAC address. The confidence level for the name "John" may be lower than the confidence level for the name "Emily" because face 3306 indicates person 3305 to be a female, and the name "John" is typically a name of a male, whereas the name "Emily" is typically a name of a female.

In some embodiments, to determine the identity of person 3305, wearable apparatus 110 may compare image data regarding face 3306 of person 3305 (e.g., image 3300 shown in FIG. 33A or a portion of the image 3300 shown in FIG. 33A) to image data (e.g., one or more facial images) stored in database 3220. For example, wearable apparatus 110 may use facial recognition algorithms to compare an image of face 3306 with images of known faces (associated with known names) in order to determine the identity of the person 3305. When a possible match between face 3306 and a known face (with a known name) is found, wearable apparatus 110 may determine that face 3306 is associated with that known name. In some embodiments, faces identified from images may be stored as coefficients, rather than images. Wearable apparatus 110 may compare coefficients representing face 3306 identified from the images with coefficients representing other faces stored in a database to identify a match.

In some embodiments, wearable apparatus 110 may transmit the determined identity (e.g., name) of person 3305 to a device paired with wearable apparatus 110. For example, wearable apparatus 110 may transmit the determined identity of person 3305 to computing device 120 that may be paired with wearable apparatus 110. In some embodiments, in addition to transmitting the determined identity to computing device 120, wearable apparatus 110 may also transmit the confidence level associated with the determined identity to computing device 120. Computing device 120 may include a display that displays the determined identity of person 3305, and/or the confidence level associated with the determined identity. In some embodiments, computing device 120 may display a plurality of possible identities with a plurality of associated confidence levels.

In some embodiments, wearable apparatus 110 may identify an event being attended by user 100 of wearable apparatus 110 based on calendar information associated with user 100. For example, based on the text "Steve's Concert" captured in image 3300, as well as calendar information of user 100 indicating that at or around the time when image 3300 is captured, user 100 is scheduled to attend a concert, wearable apparatus 110 may determine that user 100 is attending a concert at the time when image 3300 is captured. Wearable apparatus 110 may access calendar information of user 100, which may be stored in server 250, or another device, such as computing device 120 that may be paired with wearable apparatus 110.

In some embodiments, wearable apparatus 110 may be configured to access calendar information associated with other persons, for example, friends and/or contacts of user 100, persons who have purchased tickets for the concert, etc. For example, purchasing tickets may require the identity (e.g., name) of the purchaser and/or the identities (e.g., names) of the persons who will attend the concert. The identities may be stored in a database of the ticket selling agent. Wearable apparatus 110 may access the database to acquire the identities of persons who have purchased the tickets for the concert and/or who may be attending the concert.

Wearable apparatus 110 may further access other databases that store face images of the persons who have purchased the tickets and/or who may attend the concert. For example, server 250 may acquire face images of the persons who have purchased the tickets and/or who may attend the concert, and store the face images in a storage device. In some embodiments, server 250 may search on the Internet (e.g., accessing social media webpages of persons who may attend the concert) to acquire face images of persons who may attend the concert. For example, a person who may attend the concert may post a message on a social media webpage announcing that he/she is going to attend "Steve's Concert" held at a particular time and location. Server 250 may determine from the posted message that the person will attend the concert and may acquire an image of the person (e.g., a face image of the person) from the person's social media webpage or from other Internet resources. Wearable apparatus 110 may access images stored on server 250.

In some embodiments, server 250, computing device 120, or wearable apparatus 110 may store acquired images of persons who may attend the concert in a database (e.g., database 3220 or one similar to database 3220). Wearable apparatus 110 may compare image data of face 3306 included in image 3300 with the images data of faces of persons who are scheduled to attend (or who may attend) the concert that are stored in the database. Wearable apparatus may determine the identity of person 3305 based on the comparison. For example, after finding a match between the image of face 3306 and the face image(s) stored in the database, wearable apparatus 110 may identify the name associated with the matching face image, and use that name as the name of person 3305.

In some embodiments, wearable apparatus 110 may be programmed to identify an event being attended by user 100 of wearable apparatus 110 based on at least one item of non-facial information and calendar information associated with user 100. The non-facial information may include voice data, GPS location data, non-facial objects captured in images, etc. For example, microphone 3405 may acquire voice data from the environment of user 100 where image 3300 is captured. The voice data may include music being played, people's voice talking about the concert, etc. Wearable apparatus 110 may analyze the voice data or transmit the voice data to server 250 for analysis. For example, wearable apparatus 110 may analyze the voice data to determine that it is likely that user 100 is located at a place where a concert is being held. Wearable apparatus 110 may access the calendar information of user 100 to determine that user 100 is scheduled to attend a concert at or around the time when image 3300 is captured. Based on the calendar information and the voice data, wearable apparatus 110 may determine that user 100 is attending a concert at the time when image 3300 is captured.

A GPS unit included in wearable apparatus 110 and/or computing device 120 paired with wearable apparatus 110 may acquire the location data of wearable apparatus 110 when image 3300 is captured. Wearable apparatus 110 may analyze the GPS location data to determine a location of user 100, or may transmit the GPS location data to server 250 for analysis. For example, server 250 may analyze the GPS location data to determine the location of user 100. Alternatively or additionally, wearable apparatus 110 may analyze image 3300 to identify text "Market St." from signage 3340, which indicates a location or a venue. Wearable apparatus 110 may determine the location of user 100 (i.e., on or adjacent Market Street) from the text identified from signage 3340. Wearable apparatus 110 may also access the calendar information of user 100 to determine that user 100 is scheduled to attend a concert to be held at a location that matches or is in close proximity to the location of user 100 identified from the GPS information and/or the text "Market St." recognized from image 3300. Based on the location data and the calendar information, wearable apparatus 110 may determine that user 100 is attending a concert at a particular location.

Wearable apparatus 110 may use other non-facial information, such as non-facial objects identified from image 3300 to determine an event user 100 is attending. For example, wearable apparatus 110 may analyze image 3300 to identify banner 3315 and recognize the text "Steve's Concert." Wearable apparatus 110 may access the calendar information of user 100 to determine that user 100 is scheduled to attend a concert on this day at or around this time when image 3300 is captured. Based on the text identified from image 3300 and the calendar information of user 100, wearable apparatus 110 may determine that user 100 is attending the concert.

As another example, wearable apparatus 110 may analyze image 3300 to identify an object, such as microphone 3320, and/or loud speakers 3331 and 3332. Wearable apparatus 110 may determine that the setting including microphone 3320 and/or loud speaker 3331 and 3332, is relevant to a concert. Wearable apparatus 110 may access the calendar information of user 100 and determine that user 100 is scheduled to attend a concert on this day. Based on the non-facial objects captured in image 3300 and the calendar information of user 100, wearable apparatus 110 may determine that user 100 is attending a concert at the time when image 3300 is captured.

In some embodiments, wearable apparatus 110 may access calendar information (e.g., schedule information) of a plurality of persons other than user 100 who are scheduled to attend the event. For example, wearable apparatus 110 may acquire data (e.g., name lists, schedules, ticket purchase history, etc.) pertaining to persons who are scheduled to attend the concert from a suitable source, including, e.g., the ticket selling agents, the Internet, etc. In addition, wearable apparatus 110 may access calendar information (e.g., scheduling information) included in the calendars of these persons. For example, calendar information may indicate that some persons may not be able to attend the concert, although they may have purchased the tickets and were originally scheduled to attend the concert.

Wearable apparatus 110 may narrow the universe of search for candidates of person 3305 based on the calendar information that eliminates some of the potential candidates. Wearable apparatus 110 may select a person from the plurality of persons who are scheduled to attend the concert based on, e.g., age, gender, skin color, eye color, hair color or style, and other characteristics that are stored in a database for the persons scheduled to attend the concert. Wearable apparatus 110 may compare the stored physical characteristics of the potential candidates with that of person 3305 captured in image 3300. When a match between the physical characteristics of a candidate and those of the person 3305 is found, wearable apparatus 110 may determine the identity of person 3305 based on the identity of the matching candidate.

In some embodiments, wearable apparatus 110 may determine the identity of person 3305 based on a known relationship with user 100. For example, wearable apparatus 110 may determine from various data sources that user 100 is attending the concert with his daughter, and user 100 has only one daughter, whose name is already stored in a database. Wearable apparatus 110 may analyze image 3300, including face 3306 of person 3305 to determine that face 3306 belongs to a young female. Wearable apparatus 110 may access the database to acquire the name of the daughter, and use that name as the name of person 3305.

As another example, wearable apparatus 110 may determine from various data sources that user 100 is attending the concert with his female co-worker. For example, wearable apparatus 110 may access calendars of user 100 and his female co-workers to identify one of the co-worker who is scheduled to attend the concert at a time around the time when image 3300 is captured. Wearable apparatus 110 may access email communications of user 100 and identify one or more messages indicating that user 100 is scheduled to attend the concert with a female co-worker. Wearable apparatus 110 may acquire the name of the female co-worker from a database, e.g., a workplace database storing the names of co-workers of user 100, or from the email messages, etc. Wearable apparatus 110 may assign the female co-worker's name to person 3305.

In some embodiments, wearable apparatus 110 may determine the identity of person 3305 associated with face 3306 based on at least one item of non-facial information and the audio data captured by microphone 3405. For example, the non-facial information may include a WiFi signal received from device 3307 held by person 3305. WiFi signal may include a network name "Emily's hotspot." Alternatively or additionally, wearable apparatus 110 may analyze a MAC address included in the WiFi signal to identify the name of a person (e.g., "Emily") associated with the MAC address of device 3307. In addition, wearable apparatus 110 may analyze the audio data acquired by microphone 3405 to determine that the voice of person 3305 is likely from a female. Based on the WiFi signal and audio data, wearable apparatus 110 may determine that a possible name for person 3305 is "Emily."

In some embodiment, wearable apparatus 110 may determine the identity of person 3305 based on texts identified from the captured images. For example, wearable apparatus 110 may identify name tag 3308 worn by person 3305 from an image 3500 shown in FIG. 35. Wearable apparatus 110 may identify the text "Emily" on name tag 3308, and may determine that the name of person 3305 is "Emily." Wearable apparatus 110 may assign a great weight or a high confidence level to the determined name "Emily."

In some embodiments, the non-facial information may be associated with a clothing item. Wearable apparatus 110 may identify a clothing item from the captured images, and determine the identification information of person 3305 based on the clothing item. For example, as shown in FIG. 33C, the clothing item may be text printed on a cloth of person 3305, "Company A." The text "Company A" may be a company that is the employer of user 100 and person 3305. Thus, user 100 and person 3305 may be co-workers of Company A. Wearable apparatus 110 may access employment information of user 100 and determines that user 100 works for Company A. Wearable apparatus 110 may determine that person 3305 is a co-worker of user 100. Wearable apparatus 110 may access contacts information of user 100 to identify all co-workers of user 100. If there is one co-worker in the contacts of user 100 and the name of the co-worker appears to be a name for a female, wearable apparatus 110 may determine that the name of the female co-worker is likely the name of person 3305. If there are multiple female co-workers in the contacts of user 100, wearable apparatus 110 may narrow the universe of potential candidates using other criteria, such as the positioning information of the female co-workers, the physical characteristics of the female co-workers (e.g., hairstyle), voice characteristics of the female co-workers (e.g., comparing the voice data of person 3305 acquired by wearable apparatus 110 with stored voice characteristics of female co-workers of user 100), age of co-workers, etc.

In some embodiments, the non-facial information may be color information associated a clothing item. For example, the image (e.g., 3300, 3395, or 3500) may show person 3305 wearing a cloth that has a specific color, or a combination of colors. Wearable apparatus 110 may access contacts information of user 100 and/or other databases to identify persons in the contacts who like the specific color or the combination of colors. If there is one person in the contacts who likes the specific color or the combination of colors, wearable apparatus 110 may determine that the name of the identified person is the name of person 3305. If there are multiple persons who like the specific color or the combination of colors, wearable apparatus 110 may further narrow the universe of potential candidates using other criteria regarding person 3305 and candidates, such as voice characteristics, other body characteristics, age, positioning information, etc.

Figure 35:
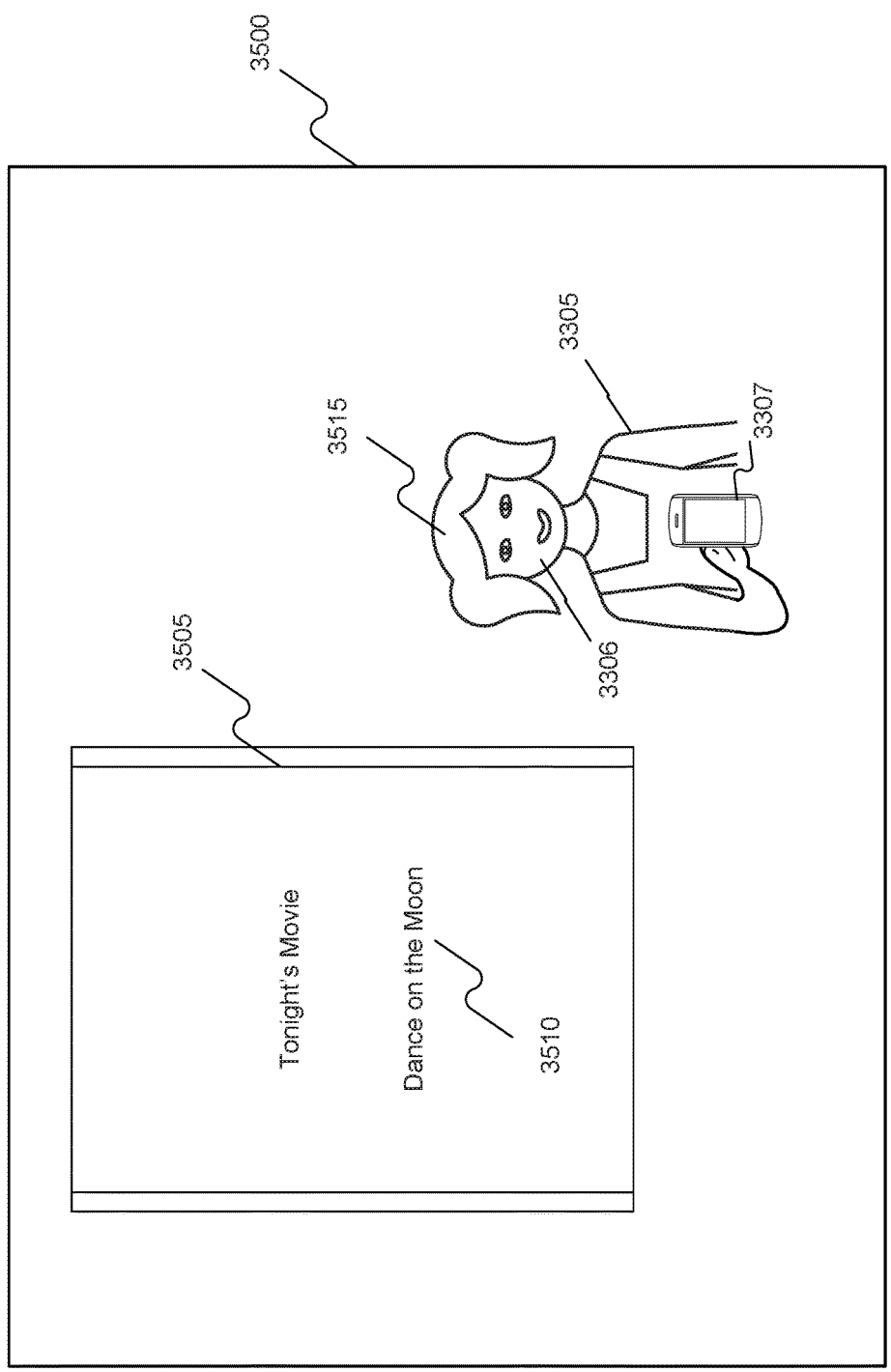
FIG. 35 shows an exemplary image captured by an image sensor of wearable apparatus.

In some embodiments, wearable apparatus 110 may determine the identity of a person based on at least one item of non-facial information and the GPS information. For example, FIG. 35 shows an image 3500 of an environment of user 100 captured by wearable apparatus 110. Image 3500 may include person 3305 and her face 3306, as well as device 3307 held by person 3305. Image 3500 may also include an advertising board 3505 including text 3510 "Tonight's Movie: Dance on the Moon." Wearable apparatus 110 may analyze image 3500 to identify face 3306 and items of non-facial information, such as advertising board 3505 and text "Tonight's Movie: Dance on the Moon." Wearable apparatus 110 may also acquire GPS information indicating the location of user 100. Wearable apparatus 110 may determine, based on text 3510 and the GPS information that user 100 is located at or near a movie theatre. Additionally or alternatively, wearable apparatus 110 may receive GPS information from device 3307 indicating the location of device 3307 (and hence person 3305). Based on the GPS information received from device 3307 and the text identified from advertising board 3505, wearable apparatus 110 may determine that person 3305 is near or at a movie theatre.

The GPS positioning information received from device 3307 may be used to determine the identification information of person 3305. For example, wearable apparatus 110 may determine, from contacts list of user 100, which person is located closest to user 100. The contacts list of user 100 may list all or some of the contacts of user 100 on a map showing the locations of those contacts or in a list with distances between the contacts and user 100. Person 3505 may be a contact of user 100, and the positioning information of person 3505 may be shown on the map of contacts of user 100. The map may show that person 3505 is closest to user 100. Wearable apparatus 110 may determine the name of the person who is closest to user 100, and use that name as the name of person 3505.

In some embodiments, wearable apparatus 110 may access the contacts information of user 100 of wearable apparatus 110, and/or the calendar information of user 100 and/or other person to determine that user 100 is scheduled to watch a movie with someone. Wearable apparatus 110 may narrow the universe of potential candidates based on contacts of user 100. For example, wearable apparatus 110 may access computing device 120 or another device or database that may store contacts of user 100. Wearable apparatus 110 may select female contacts from all of the contacts of user 100 because person 3305 appears to be a female. Wearable apparatus 110 may access calendar information of the selected female contacts and may identify that one of the selected female contacts named "Emily" is scheduled to watch a movie at the same time. When there is only one female contact who is scheduled to watch the movie at this time, wearable apparatus 110 may determine that the name of person 3305 is "Emily." When there are two or more female contacts of user 100 who are scheduled to watch the movie at this time, wearable apparatus 110 may further narrow the universe of potential candidates based on other information. For example, wearable apparatus 110 may narrow the universe of potential candidates based on a known relationship between user 100 and person 3305. In some embodiments, calendar information of user 100 may indicate that user 100 is scheduled to watch the movie with his wife. Wearable apparatus 110 may select one of the female contacts, who is mostly likely the wife of user 100, and identify the name of person 3305 based on the name of his wife listed in the contact.

In some embodiments, wearable apparatus 110 may identify items of non-facial information from image 3300 and assign a weight to each of the items of non-facial information. For example, wearable apparatus 110 may identify the text "Steve's Concert" from signage 3315 and assign a weight to that text. Wearable apparatus 110 may identify microphone 3320 from image 3300 and assign a weight to microphone 3320. Wearable apparatus 110 may identify loud speakers 3331 and 3332 and assign a weight to these objects. Wearable apparatus 110 may identify signage 3340 that includes text "Market St." and assign a weight to signage 3340 or the text "Market St." Wearable apparatus 110 may identify mobile device 3307 and assign a weight to the mobile device. Wearable apparatus 110 may identify name tag 3308 and assign a weight to the name tag. Wearable apparatus 110 may identify a clothing item (e.g., text "Company A") and assign a weight to the clothing item. Wearable apparatus 110 may identify a hairstyle 3515 in image 3500 and may assign a weight to hairstyle 3515. Wearable apparatus 110 may identify other non-facial items, such as jewelry, cloth, watch, bracelet, etc., worn by person 3305 and assign weights to such identified items.

Different items of non-facial information may be assigned with different weights. In some embodiments, at least two items of non-facial information may be assigned with a same weight. Wearable apparatus 110 may determine a confidence level associated with the determined identity based on the weights. For example, wearable apparatus 110 may have determined two names as candidates for person 3305. Wearable apparatus 110 may determine that a first name is associated with a person whose schedule indicates that she is not likely to be at the location indicated by text "Market St." at the time when image 3300 is captured, wearable apparatus 110 may assign a first, low weight to the first name. A second name may be associated with a person whose schedule indicates that she is scheduled to attend a concert at a location near or at Market Street at the time when image 3300 is captured. Wearable apparatus 110 may assign a second, great weight to the second name. Wearable apparatus 110 may determine a confidence level of a possible name candidate based on the weights assigned to a plurality of items of non-facial information.

In some embodiments, wearable apparatus 110 may be programmed to determine a uniqueness level of at least one item of non-facial information, and determine a level of the weight based on the uniqueness level. For example, referring to FIG. 35, wearable apparatus 110 may identify items of non-facial information, including hairstyle 3515 of person 3305, device 3307 held by person 3305, advertising board 3505, and text 3510. Wearable apparatus 110 may determine that device 3307 is quite commonly used by other people, so wearable apparatus 110 may assign a low uniqueness level to device 3307. Wearable apparatus 110 may determine that hairstyle 3515 may be unique, and may assign a high uniqueness level to hairstyle 3515. Wearable apparatus 110 may determine that there are only a few theatres in the town or city that are showing the movie "Dance on the Moon," and may assign a high uniqueness level to text 3510. Wearable apparatus 110 may assign a weight to each of the items of non-facial information identified from image 3500 based on the uniqueness levels. For example, a higher weight may be assigned to an item of non-facial information (e.g., hairstyle 3515) having a higher uniqueness level. Likewise, a lower weight may be assigned to an item of non-facial information (e.g., device 3307) having a lower uniqueness level.

Figure 36:
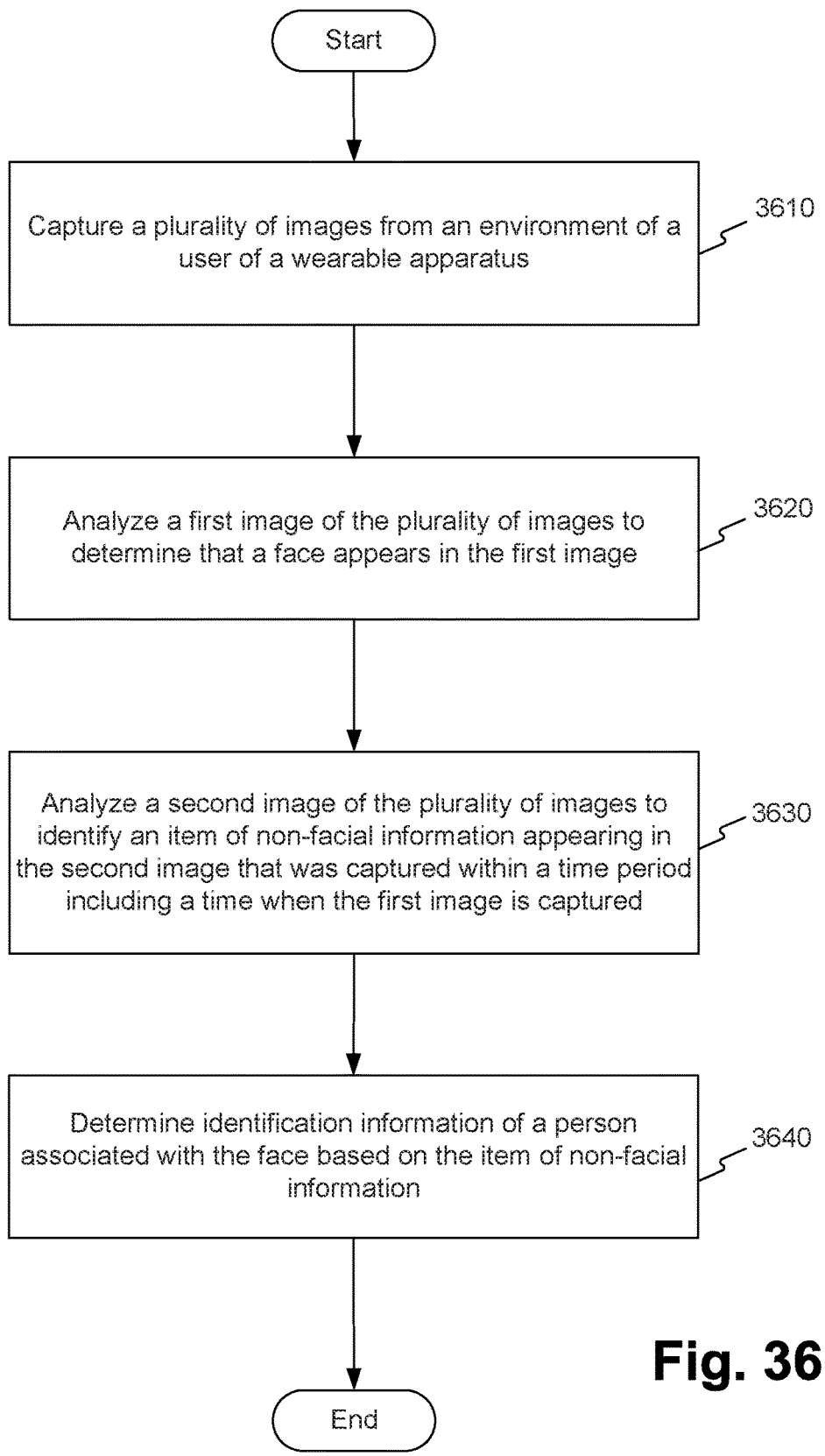
FIG. 36 is a flowchart illustrating a method for identifying a person in an environment of a user of a wearable apparatus based on non-facial information.

FIG. 36 is a flowchart illustrating a method for identifying a person in an environment of a user of a wearable apparatus based on non-facial information, consistent with the disclosed embodiments. Method 3600 may be performed by wearable apparatus 110. In some embodiments, some or all of the steps of method 3600 may be performed by an external device, such as computing device 120 that may be paired with wearable apparatus 110 or server 250. In some embodiments, method 3600 may be performed by a processing device, such as processors 210, 210a, or 210b included in wearable apparatus 110, or processor 540 included in computing device 120 or server 250. For example, instructions corresponding to method 3600 may be stored in a memory, such as memory 550 or any other memory of computing device 120 or server 250. The processing device of wearable apparatus 110 or computing device 120 (or server 250) may execute the instructions stored in the memory to perform various methods and processes disclosed herein, including method 3600.

Method 3600 may include capturing a plurality of images from an environment of a user of a wearable apparatus (step 3610). For example, a camera (or image sensor) of wearable apparatus 110, such as image sensor 220 (shown in FIGS. 5A, 5C, and 7), or 220a, 220b (shown in FIG. 5B), may capture a plurality of images of an environment of user 100. The image data captured by the image sensor may be provided to at least one processing device (e.g., processors 210, 210a, or 210b) of wearable apparatus 110 for processing.

Method 3600 may include analyzing a first image of the plurality of images to determine that a face appears in the first image (step 3620). At least one processing device (e.g., processors 210, 210a, or 210b) included in wearable apparatus 110 may execute any suitable face recognition algorithm to recognize a face in the first image. In some embodiments, a processor included in computing device 120 or server 250 may analyze the images to recognize a face appearing in the first image.

Method 3600 may include analyzing a second image of the plurality of images to identify an item of non-facial information appearing in the second image that was captured within a time period including a time when the first image is captured (step 3630). For example, in a first image (e.g., image 3395 shown in FIG. 33C), a face may be detected or recognized. A second image (e.g., image 3390 shown in FIG. 33B) may be captured within a time period, e.g., 1 second, 2 seconds, 3 seconds, etc., before and/or after the time the first image is captured (the time period may include the time when the first image is captured). Wearable apparatus 110 may identify, from the second image, at least one item of non-facial information. The item of non-facial information may or may not appear in the same image as the face. The item of non-facial information may be used to determine an identity of a person associated with the identified face in the first image.

Method 3600 may include determining identification information of a person associated with the face based on the item of non-facial information (step 3640). The identification information may include an identity (e.g., a name) of the person, or an index of a database storing a plurality of identities of a plurality of persons. The index may be a pointer that points to a location in the database where a name of a person is stored.

Method 3600 may include other processes or steps disclosed herein but not presented in FIG. 36. For example, wearable apparatus 110 may transmit the identification information to an external device, such as computing device 120 and/or server 250, for processing and/or display. In some embodiments, method 3600 may include one or more steps disclosed in the method discussed below in connection with FIG. 37.

Figure 37:
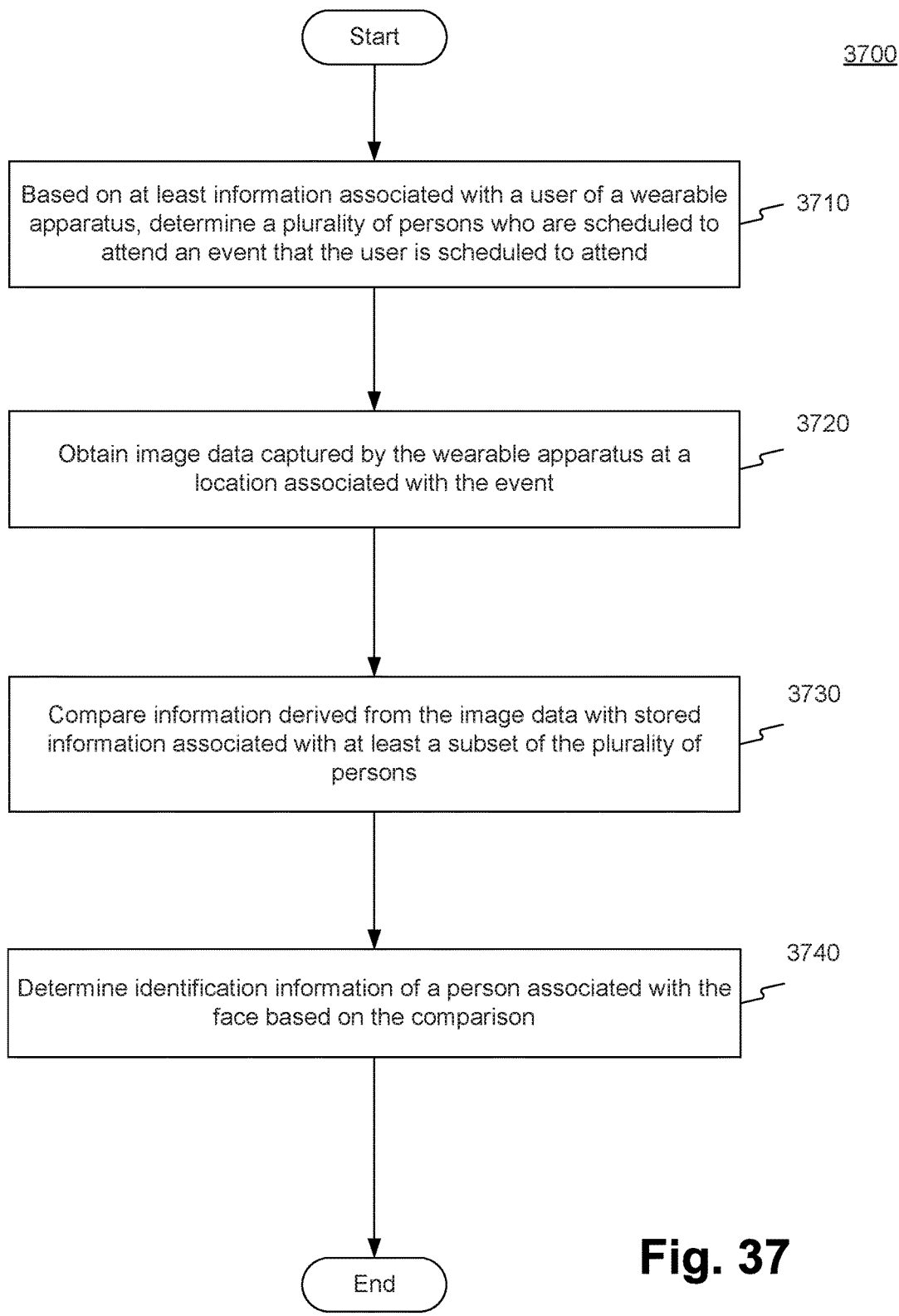
FIG. 37 is a flowchart illustrating another method for identifying a person in an environment of a user of a wearable apparatus based on non-facial information.

FIG. 37 is a flowchart illustrating a method for identifying a person in an environment of a user of a wearable apparatus based on non-facial information, consistent with the disclosed embodiments. Method 3700 may be performed by wearable apparatus 110. In some embodiments, some or all of the steps of method 3700 may be performed by computing device 120 that may be paired with wearable apparatus 110, or server 250. Method 3700 may be performed by a processing device, such as processor 210, 210a, or 210b of wearable apparatus 110, processor 540 of computing device 120, or a processor of server 250. In some embodiments, instructions corresponding to method 3700 may be stored in a memory, such as memory 550 or 550a of wearable apparatus 110, memory 550b of computing device 120, or a memory of server 250. The processing device of wearable apparatus 110, computing device 120, or server 250 may execute the instructions stored in the memory to perform various methods and processes disclosed herein, including method 3700. For convenience, method 3700 is described as being performed by wearable apparatus 110. It is understood that some or all of the steps of method 3700 may be performed by computing device 120 and/or server 250.

Method 3700 may include determining, based on at least information associated with the user, a plurality of persons who are scheduled to attend an event that the user is scheduled to attend (step 3710). The information associated with the user may include calendar information of the user, contacts information of the user, or any other suitable information related to the user. For example, wearable apparatus 110 may access calendar information of user 100, which may be stored on wearable apparatus 110, computing device 120 paired with wearable apparatus 110, server 250, or another network device not shown in FIG. 34. Based on the calendar information of user 100, wearable apparatus 110 may determine that user 100 is scheduled to attend an event (e.g., a concert) at or around the time when image 3300 is captured. Wearable apparatus 110 may acquire positioning information of user 100 to determine a location of user 100. Wearable apparatus 110 may access other information relating to the location, such as information available on the Internet indicating that a concert is held at or around the location. Alternatively or additionally, wearable apparatus 110 may acquire sound data at the scene shown in image 3300, and determine from the sound data that a concert is likely being held at the scene. Based on these analyses, wearable apparatus 110 may determine that user 100 is attending a concert.

Wearable apparatus 110 may determine a plurality of persons who are scheduled to attend the event (e.g., concert) the user is scheduled to attend. For example, wearable apparatus 110 may access contacts information of user 100, which may be stored in wearable apparatus 110, computing device 120, server 250, or another network device. Wearable apparatus 110 may further access calendar information of the contacts of user 100. The calendar information of the contacts of user 100 may be stored in wearable apparatus 110, computing device 120, or server 250, or in a database stored in another network device accessible to wearable apparatus 110, server 250, and/or computing device 120. Based on the calendar information of the contacts of user 100, wearable apparatus 110 may determine a plurality of persons from the contacts who are scheduled to attend the event user 100 is scheduled to attend. In some embodiments, wearable apparatus 110 may access a database to obtain a list of persons who have purchased the tickets for the concert, and then access the calendar information of these persons to determine a plurality of persons who are scheduled to attend the concert user 100 is scheduled to attend.

In some embodiments, wearable apparatus 110 may access social media posts or messages associated with user 100, which may indicate who will be attending the event together with user 100. Wearable apparatus 110 may determine a plurality of persons who are scheduled to attend the event based on the social media information associated with user 100. In some embodiments, wearable apparatus 110 may access emails of user 100, which may indicate who will be attending the event together with user 100.

Method 3700 may include obtaining image data captured by wearable apparatus 110 at a location associated with the event (step 3720). The image data may include a representation of a face. An image sensor included in wearable apparatus 110 may capture the image data. For example, image sensor 220 or 220a of wearable apparatus 110 may capture a plurality of images of a scene of an event at a location where the event is being held. A processor of wearable apparatus 110 may obtain the image data from the image sensor. The image data may represent images of a scene of the environment at the location associated with the event. Examples of the images are shown in FIGS. 33A-33C and 35.

Method 3700 may include comparing information derived from the image data with stored information associated with at least a subset of the plurality of persons (step 3730). The information derived from the image data may include facial information, non-facial information, and any other suitable information that may be derived from image data. The information associated with at least a subset of the plurality of persons may be stored in database 3320, or in another database external to wearable apparatus 110 and accessible by wearable apparatus 110. In some embodiments, wearable apparatus 110 may compare facial and/or non-facial information derived from the image data with stored facial and/or non-facial information associated with the plurality of persons or a subset of the plurality of persons.

Wearable apparatus 110 may determine a subset from the plurality of persons based on certain criteria before performing the comparison. For example, the subset may include all females from the plurality of persons, all males from the plurality of persons, or persons who have a relationship with the user (e.g., co-workers, relatives, persons who share the same or similar interest, hobbies, etc.). In some embodiments, the persons may be contacts of user 100, and the subset may be a subset of contacts of user 100. In some embodiments, wearable apparatus 110 may compare image data of the representation of the face captured by the image sensor with stored face images of the subset of the plurality of persons. In some embodiments, wearable apparatus 110 may compare non-facial information (e.g., hairstyle, clothing, etc.) with stored non-facial information of the subset of the plurality of persons.

Wearable apparatus 110 may determine the subset of the plurality of persons using other criteria. For example, wearable apparatus 110 may determine the subset of the plurality of persons from the contacts of user 100 who are scheduled to attend the event. As another example, wearable apparatus 110 may determine the subset based on calendar information of user 100 indicating that user 100 is attending a concert with a female. Thus, the subset may include persons that are female contacts of user 100.

In some embodiments, wearable apparatus 110 may determine the subset based on location information associated with user 100, indicating that user 100 is located at Market Street. The subset may include contacts of user 100 who are located at or near Market Street. It is understood that mobile devices and/or wearable apparatuses carried by the contacts may transmit their location information (e.g., GPS information) to server 250 or another network device from which wearable apparatus 110 can retrieve the location information of the contacts.

In some embodiments, wearable apparatus 110 may determine the subset based on social media information associated with user 100 (e.g., a message posted by user 100 or friends/colleagues/contacts of user 100) that is available on social media websites indicating that user 100 is scheduled to attend the concert with friends/colleagues/contacts. Thus, the subset of persons may include those persons identified from the social media information.

In some embodiments, wearable apparatus 110 may determine the subset based on voice characteristics of user 100. For example, microphone 3405 may acquire voice data of user 100, such as "Honey, I like the music" uttered by user 100. Wearable apparatus 110 may analyze voice data and determine that person 3305 is one who has a close relationship with user 100. Thus, the subset of persons may include contacts of user 100 who may have a close relationship with user 100.

In some embodiments, wearable apparatus 110 may determine the subset based on hobby information of user 100 and hobby information of the contacts of user 100. For example, wearable apparatus 110 may determine from the audio data acquired by microphone 3405 that rock and roll music is being played in the environment of user 100. Wearable apparatus 110 may access hobby information (which may be stored in computing device 120 and/or server 250 or another device) associated with user 100 indicating that user 100 likes rock and roll music. Wearable apparatus 110 may also access hobby information (which may be stored in computing device 120 and/or server 250 or another device) associated with the contacts of user 100, and select those contacts who share the same hobby (rock and roll music) as user 100. Thus, the subset of persons may include those contacts who share the same hobby as user 100.

Method 3700 may include determining identification information of a person associated with the face based on the comparison (step 3740). For example, after comparing information derived from the image data captured by wearable apparatus 110 with the stored information of the plurality of persons, wearable apparatus 110 may identify a match between the compared information. Based on the matching information, wearable apparatus 110 may determine the identification information of the person associated with the face. The identification information may include an identity (e.g., a name) of the person, or an index pointing to an identity database where a name of the person can be found.

Method 3700 may include other steps or processes. For example, method 3700 may include transmitting the identification information (e.g., name) of the person associated with the face to an external device paired with the wearable apparatus for display. For example, computing device 120 or server 250 may display the name of the person associated with the face. In some embodiments, computing device 120 or server 250 may transmit an audio signal to wearable apparatus 110 to pronounce the name of the person to user 100.

The above methods (e.g., method 3600 and 3700) may further include other steps or processes disclosed herein but not presented in FIGS. 36 and 37, such as those discussed above in connection with any of the other figures in this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for analyzing information collected by a plurality of wearable camera systems, the system comprising:
   a memory storing executable instructions; and
   at least one processor programmed to execute the instructions to:
   receive information related to a product derived from first image data captured by a first wearable camera system associated with a first user and second image data captured by a second wearable camera system associated with a second user, wherein the first image data and the second image data depict a product advertisement associated with the product;
   analyze the information related to the product to identify a commonality, wherein the commonality is identified based on an analysis of at least one word depicted in the first image data and the second image data, the at least one word being associated with the product, wherein the commonality includes the product associated with the product advertisement being advertised to the first and second users, and wherein the at least one word is displayed on the product, a product label, or product packaging;

determine, based on the commonality, statistical data related to the first and second users;

select, based on the statistical data, at least one content item; and transmit the selected at least one content item to at least one of the first or second user.

2. The system of claim 1, wherein the content item comprises at least one of: a coupon or a product description.

3. The system of claim 1, wherein the commonality further comprises at least one of: a behavior or habit of the first and second users.

4. The system of claim 1, wherein the commonality further includes an event attended by the first and second users.

5. The system of claim 1, wherein the commonality further includes a demographic characteristic of the first and second users.

6. The system of claim 5, wherein the demographic characteristic comprises at least one of: an age, an income, or a geographical location.

7. The system of claim 1, further comprising a database storing profiles of the first and second users.

8. The system of claim 7, wherein the profiles of the first and second users include demographic characteristic data of the users.

9. The system of claim 1, wherein the one or more words displayed on the product are the same.

10. The system of claim 1, wherein the statistical data comprises demographic groups related to the commonality, and wherein at least the first user or the second user are associated with one of the demographic groups.

11. The system of claim 1, wherein the at least one processor is further programmed to determine a first location of the first user and a second location of the second user, and wherein the at least one content item is transmitted to the first user or the second user based on the first location and the second location.

12. A method for analyzing information collected by a plurality of wearable camera systems, the method comprising:

receiving information related to a product derived from first image data captured by a first wearable camera system associated with a first user and second image data captured by a second wearable camera system associated with a second user, wherein the first image data and the second image data depict a product advertisement associated with the product;

analyzing the information related to the product to identify a commonality, wherein the commonality is identified based on an analysis of at least one word depicted in the first image data and the second image data, the at least one word being associated with the product, wherein the commonality includes the product associated with the product advertisement being advertised to the first and second users, and wherein the at least one word is displayed on the product, a product label, or product packaging;

determining, based on the commonality, statistical data related to the first and second users;

selecting, based on the statistical data, at least one content item; and transmitting the selected at least one content item to at least one of the first or second user.

13. The method of claim 12, wherein the content item comprises at least one of: a coupon or a product description.

14. The method of claim 12, wherein the commonality further comprises at least one of: a behavior or habit of the first and second users.

15. The method of claim 12, wherein the commonality further includes an event attended by the first and second users.

16. The method of claim 12, wherein the commonality further includes a demographic characteristic of the first and second users.

17. The method of claim 16, wherein the demographic characteristic comprises at least one of: an age, an income, or a geographical location.

18. The method of claim 12, wherein a database stores profiles of the first and second users.

19. The method of claim 18, wherein the profiles of the first and second users include demographic characteristic data of the users.

20. A non-transitory computer readable medium storing computer implementable instructions for carrying out the method of claim 12.

* * * * *